US011982952B2

(12) United States Patent
Asanuma et al.

(10) Patent No.: US 11,982,952 B2
(45) Date of Patent: May 14, 2024

(54) TONER CARTRIDGE HAVING FEEDING MEMBER AND PUMP FOR DISCHARGING PUMP

(71) Applicant: CANON KABUSHIKI KAISHA, Tokyo (JP)

(72) Inventors: Naoya Asanuma, Shizuoka (JP); Takatoshi Hamada, Shizuoka (JP); Masato Tanabe, Shizuoka (JP); Tomofumi Kawamura, Shizuoka (JP); Yusuke Atsu, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/470,235

(22) Filed: Sep. 9, 2021

(65) Prior Publication Data

US 2022/0050404 A1 Feb. 17, 2022

Related U.S. Application Data

(63) Continuation of application No. PCT/JP2020/035885, filed on Sep. 15, 2020.

(30) Foreign Application Priority Data

Sep. 17, 2019 (JP) ................................ 2019-168214
May 28, 2020 (JP) ................................ 2020-093285

(51) Int. Cl.

*G03G 15/08* (2006.01)
*G03G 21/16* (2006.01)
*G03G 21/20* (2006.01)

(52) U.S. Cl.

CPC ..... *G03G 15/0865* (2013.01); *G03G 15/0875* (2013.01); *G03G 15/0877* (2013.01);
(Continued)

(58) Field of Classification Search

CPC ........... G03G 15/0865; G03G 15/0863; G03G 15/0874; G03G 15/0875; G03G 15/0877;
(Continued)

(56) References Cited

U.S. PATENT DOCUMENTS 5,559,581 A 9/1996 Sugiura et al.
5,561,496 A 10/1996 Sugiura et al.
(Continued)

FOREIGN PATENT DOCUMENTS

CN 1207511 A 2/1999
CN 102109789 A 6/2011
(Continued)

OTHER PUBLICATIONS

English translation of Chinese Patent Application Pub. No. 105182715.
(Continued)

*Primary Examiner* — Arlene Heredia
*Assistant Examiner* — Laura Roth
(74) *Attorney, Agent, or Firm* — Venable LLP

(57) ABSTRACT

A toner cartridge includes a casing, a feeding member, and a pump. The casing includes a toner accommodation chamber accommodating toner, a toner discharging chamber having a discharge opening for discharging the toner, and a communication passage for fluid communication between the toner accommodation chamber and the toner discharging chamber such that the toner can move from the toner accommodation chamber to the toner discharging chamber. A part of the feeding member is positioned inside the communication passage. In a first cross-sectional plane perpendicular to a toner feeding direction of the feeding member, a minimum cross-sectional area of the communication passage is Asmin, in a second cross-sectional plane perpendicular to the toner feeding direction, the toner discharging chamber has a cross-sectional area Bs that is larger
(Continued)

than Asmin, and in a third cross-sectional plane perpendicular to the toner feeding direction, the toner accommodation chamber has a cross-sectional area Cs that is larger than Asmin.

51 Claims, 30 Drawing Sheets

(52) U.S. Cl.
CPC ..... *G03G 15/0889* (2013.01); *G03G 21/1647* (2013.01); *G03G 21/206* (2013.01); *G03G 2221/1657* (2013.01)

(58) Field of Classification Search
CPC ........... G03G 15/0889; G03G 15/0891; G03G 21/1878; G03G 21/1647; G03G 2215/066; G03G 2221/1657; G03G 2215/085; G03G 15/0879; G03G 21/206
See application file for complete search history.

(56) References Cited

U.S. PATENT DOCUMENTS

| | | | | |
|---|---|---|---|---|
| 5,634,178 | A | 5/1997 | Sugiura et al. | |
| 6,049,685 | A * | 4/2000 | Murakami | G03G 15/0875 399/263 |
| 6,084,622 | A | 7/2000 | Sugiura et al. | |
| 6,097,903 | A * | 8/2000 | Yahata | G03G 15/0867 399/106 |
| 6,546,214 | B2 | 4/2003 | Sakai et al. | |
| 6,615,002 | B2 | 9/2003 | Saito et al. | |
| 7,715,746 | B2 | 5/2010 | Tanabe et al. | |
| 7,813,671 | B2 | 10/2010 | Nittani et al. | |
| 7,894,733 | B2 | 2/2011 | Tanabe et al. | |
| 7,953,340 | B2 | 5/2011 | Tanabe et al. | |
| 8,121,517 | B2 | 2/2012 | Asanuma et al. | |
| 8,139,972 | B2 | 3/2012 | Abe et al. | |
| 8,270,876 | B2 | 9/2012 | Morioka et al. | |
| 8,301,054 | B2 | 10/2012 | Tanabe et al. | |
| 8,369,744 | B2 | 2/2013 | Asanuma et al. | |
| 8,565,649 | B2 | 10/2013 | Murakami et al. | |
| 8,688,004 | B2 | 4/2014 | Asanuma et al. | |
| 8,768,221 | B2 | 7/2014 | Saito | |
| 9,164,424 | B2 | 10/2015 | Nakamura et al. | |
| 9,229,368 | B2 | 1/2016 | Okino et al. | |
| 9,354,550 | B2 | 5/2016 | Murakami et al. | |
| 9,354,551 | B2 | 5/2016 | Murakami et al. | |
| 9,494,890 | B2 | 11/2016 | Komatsu et al. | |
| 9,632,479 | B2 | 4/2017 | Maeshima et al. | |
| 9,753,402 | B2 | 9/2017 | Murakami et al. | |
| 9,778,616 | B2 | 10/2017 | Hiramatsu et al. | |
| 9,857,730 | B2 | 1/2018 | Kato et al. | |
| 9,880,517 | B2 | 1/2018 | Maeshima et al. | |
| 10,007,225 | B2 | 6/2018 | Nosho et al. | |
| 10,025,266 | B2 | 7/2018 | Maeshima et al. | |
| 10,037,000 | B2 | 7/2018 | Torii et al. | |
| 10,067,461 | B2 | 9/2018 | Anan et al. | |
| 10,095,180 | B2 | 10/2018 | Harada et al. | |
| 10,191,412 | B2 | 1/2019 | Okino et al. | |
| 10,203,631 | B2 | 2/2019 | Murakami et al. | |
| 10,228,635 | B2 | 3/2019 | Kato et al. | |
| 10,599,065 | B1 * | 3/2020 | Zhu | B65B 1/38 |
| 10,671,013 | B2 | 6/2020 | Uesugi et al. | |
| 10,698,361 | B2 | 6/2020 | Maeshima et al. | |
| 10,712,707 | B2 | 7/2020 | Maeshima et al. | |
| 10,732,545 | B2 | 8/2020 | Takeuchi et al. | |
| 10,754,276 | B2 | 8/2020 | Murakami et al. | |
| 10,928,751 | B2 | 2/2021 | Akiba et al. | |
| 10,928,769 | B2 | 2/2021 | Anan et al. | |
| 10,948,849 | B2 | 3/2021 | Okino et al. | |
| 11,016,440 | B2 | 5/2021 | Kawamura et al. | |
| 11,067,942 | B2 | 7/2021 | Uesugi et al. | |
| 11,073,787 | B2 | 7/2021 | Maeshima et al. | |
| 11,112,753 | B2 | 9/2021 | Kawakami et al. | |
| 2002/0018658 | A1 | 2/2002 | Sakai et al. | |
| 2002/0041767 | A1 | 4/2002 | Saito et al. | |
| 2004/0052545 | A1 | 3/2004 | Satoh | |
| 2005/0008398 | A1 | 1/2005 | Hattori | |
| 2006/0029433 | A1 | 2/2006 | Saito et al. | |
| 2007/0147902 | A1 | 6/2007 | Taguchi et al. | |
| 2007/0177886 | A1 | 8/2007 | Taguchi et al. | |
| 2008/0159774 | A1 | 7/2008 | Tanabe et al. | |
| 2008/0253803 | A1 | 10/2008 | Nittani et al. | |
| 2009/0317131 | A1 | 12/2009 | Morioka et al. | |
| 2009/0317132 | A1 | 12/2009 | Asanuma et al. | |
| 2010/0028039 | A1 | 2/2010 | Abe et al. | |
| 2010/0142996 | A1 | 6/2010 | Tanabe et al. | |
| 2010/0158563 | A1 | 6/2010 | Tanabe et al. | |
| 2011/0262189 | A1 | 1/2011 | Saito | |
| 2011/0158669 | A1 | 6/2011 | Kayahara | |
| 2011/0158699 | A1 | 6/2011 | Kikuchi et al. | |
| 2012/0014713 | A1 | 1/2012 | Murakami et al. | |
| 2012/0014722 | A1 | 1/2012 | Okino et al. | |
| 2013/0209134 | A1 * | 8/2013 | Okino | G03G 15/0875 399/258 |
| 2013/0209140 | A1 | 8/2013 | Murakami et al. | |
| 2013/0223853 | A1 | 8/2013 | Chadani et al. | |
| 2014/0016967 | A1 | 1/2014 | Murakami et al. | |
| 2014/0112686 | A1 | 4/2014 | Asanuma et al. | |
| 2014/0153974 | A1 * | 6/2014 | Jimba | G03G 15/0879 399/262 |
| 2014/0169829 | A1 | 6/2014 | Maeshima et al. | |
| 2014/0169836 | A1 * | 6/2014 | Nagashima | G03G 15/0879 399/258 |
| 2014/0233986 | A1 | 8/2014 | Murakami et al. | |
| 2014/0369719 | A1 * | 12/2014 | Leemhuis | G03G 15/0865 399/262 |
| 2015/0277285 | A1 | 10/2015 | Okino et al. | |
| 2015/0338774 | A1 * | 11/2015 | Leemhuis | G03G 15/0877 399/262 |
| 2016/0004184 | A1 | 1/2016 | Kikuchi et al. | |
| 2016/0004185 | A1 | 1/2016 | Enokuchi et al. | |
| 2016/0131993 | A1 | 5/2016 | Okino et al. | |
| 2016/0131994 | A1 | 5/2016 | Murakami et al. | |
| 2016/0246250 | A1 | 8/2016 | Kamoshida et al. | |
| 2017/0060027 | A1 | 3/2017 | Yomoda et al. | |
| 2017/0139372 | A1 | 5/2017 | Kashiide et al. | |
| 2017/0248869 | A1 | 8/2017 | Matsumoto et al. | |
| 2017/0285521 | A1 | 10/2017 | Murakami et al. | |
| 2017/0343925 | A1 * | 11/2017 | Saito | G03G 15/0868 |
| 2018/0307158 | A1 | 10/2018 | Murakami et al. | |
| 2019/0137905 | A1 | 5/2019 | Okino et al. | |
| 2019/0250532 | A1 | 8/2019 | Murakami et al. | |
| 2020/0004177 | A1 | 1/2020 | Okino et al. | |
| 2020/0073288 | A1 | 3/2020 | Nakamura et al. | |
| 2020/0348616 | A1 | 11/2020 | Murakami et al. | |
| 2021/0109478 | A1 | 4/2021 | Maeshima et al. | |
| 2021/0141332 | A1 | 5/2021 | Anan et al. | |
| 2021/0165345 | A1 | 6/2021 | Okino et al. | |
| 2021/0286312 | A1 | 9/2021 | Uesugi et al. | |
| 2021/0325801 | A1 * | 10/2021 | Chen | G03G 15/0896 |
| 2021/0364983 | A1 | 11/2021 | Kawakami et al. | |
| 2021/0373460 | A1 * | 12/2021 | Kawamura | G03G 15/0887 |

FOREIGN PATENT DOCUMENTS

| | | | |
|---|---|---|---|
| CN | 103959176 | A | 7/2014 |
| CN | 105182715 | A | 12/2015 |
| EP | 1 220 050 | A | 3/2002 |
| EP | 2 889 695 | A | 7/2015 |
| JP | H11-102109 | A | 4/1999 |
| JP | 2002-258595 | A | 9/2002 |
| JP | 2011-232436 | A | 11/2011 |
| JP | 2012-168558 | A | 9/2012 |
| JP | 2014-074871 | A | 4/2014 |
| JP | 5511471 | B | 6/2014 |
| JP | 5623109 | B | 11/2014 |
| JP | 2015-200911 | A | 11/2015 |
| JP | 2017-211561 | A | 11/2017 |
| JP | 2019-066859 | A | 4/2019 |
| KR | 10-2019-0060001 | A | 5/2019 |

(56) References Cited

FOREIGN PATENT DOCUMENTS

| | | | | |
|---|---|---|---|---|
| TW | 200732870 A | | 9/2007 | |
| TW | 201137543 A | | 11/2011 | |
| TW | 201818164 A | | 5/2018 | |
| TW | 201839527 A | | 11/2018 | |
| TW | 201921184 A | | 6/2019 | |
| TW | 201923493 A | | 6/2019 | |
| TW | 201933005 A | | 8/2019 | |
| WO | WO-2021054482 A1 | * | 3/2021 | ......... G03G 15/0868 |

OTHER PUBLICATIONS

English translation of Japanese Patent Application Pub. No. 2012-168558.

Mar. 3, 2022 Extended Search Report in European Patent Application No. 21199766.

Mar. 3, 2022 Extended Search Report in European Patent Application No. 21199765.

Mar. 3, 2022 Extended Search Report in European Patent Application No. 2 1199768.

International Search Report and Written Opinion for International Patent Application No. PCT/JP2020/035885, dated Sep. 15, 2020.

Sep. 1, 2022 Office Action in Indian Patent Application No. 202147041848.

Sep. 2, 2022 Examination Report in Australian Patent Application Pub. 2020349274.

Mar. 3, 2022 Extended Search Report in European Patent Application No. 21199766.3.

Mar. 3, 2022 Extended Search Report in European Patent Application No. 21199765.5.

Mar. 3, 2022 Extended Search Report in European Patent Application No. 21199768.9.

Dec. 16, 2022 Extended Search Report in European Patent Application No. 20 866 225.4.

Jul. 31, 2023 Office Action in Chilean Patent Application No. 2021-003203 (with English translation).

Aug. 29, 2023 Notice of Acceptance in Australian Patent Application No. 2020349274.

Nov. 20, 2023 Office Action in Indonesian Patent Application No. P00202109572 (with English translation).

Dec. 22, 2023 Office Action in Chinese Patent Application Pub. No. 202080032818.5 (with English translation).

Jan. 26, 2024 Office Action in Chilean Patent Application Pub. No. 202103203 (with English translation).

Feb. 21, 2024 Office Action in Korean Patent Application No. 10-2021-7036096 (with English translation).

Mar. 13, 2024 Office Action in Singapore Patent Application Pub. No. 11202110156W.

Jan. 23, 2024 Office Action in Colombian Patent Application No. NC2021/0017687 (with English translation).

* cited by examiner (a)

(b)

(a)

(b)

TONER CARTRIDGE HAVING FEEDING MEMBER AND PUMP FOR DISCHARGING PUMP

FIELD OF THE INVENTION

The present invention relates to an image forming apparatus usable to form an image on a recording material and a toner cartridge usable with the image forming apparatus.

BACKGROUND ART

Conventionally, in an image forming apparatus using an electrophotographic method, a developer supplying container containing toner is dismountably provided in the image forming apparatus main assembly, in order to supply the toner (developer) in response to consumption of the toner by image forming operation.

Japanese Patent No. 5623109 discloses a method in which a pump is provided in a developer supplying container, and the toner is supplied from the developer supplying container into the image forming apparatus main assembly by using the pump.

In addition, there is Japanese Patent No. 5511471 which discloses methods for appropriately operating the pump arranged in the developer supplying container.

SUMMARY OF THE INVENTION

Problem to be Solved

The present invention provides a further development of the conventional structure.

Means for Solving the Problem

A typical structure disclosed in the present application is a toner cartridge comprising:

(i) a casing including (i-i) a toner accommodation chamber accommodating toner, (i-ii) a discharge opening capable of discharging toner, and (i-iii) a communication port for fluid communication between the toner accommodation chamber and the toner discharging chamber;

(ii) a feeding member movable relative to the casing and configured to feed the toner from the toner accommodation chamber through the communication port into the toner discharging chamber;

(iii) a pump configured to discharge the toner through the discharge opening by using air, wherein at least a part of the feeding member is in the communication port, and wherein in a cross-sectional plane perpendicular to the toner feeding direction of the feeding member, a minimum cross-sectional area of the communication port is Asmin, the toner discharging chamber has a cross-sectional area Bs larger than Asmin, and the toner accommodation chamber has a cross-sectional area Cs larger than Asmin.

Another typical structure disclosed in the present application is a toner cartridge comprising:

(i) a casing including (i-i) a toner accommodation chamber accommodating toner, and (i-ii) a discharge opening capable of discharging the toner;

(ii) a first engaging portion forming an opening;

(iii) a second engaging portion forming an opening;

(iv) a feeding member movable relative to the casing and configured to feed the toner in the toner accommodation chamber toward the discharge opening;

(v) a pump configured to discharge the toner through the discharge opening by using air; and (vi) a storing element provided with an electrical contact, wherein the pump is provided with a connecting portion connected with the casing, and wherein as viewed in a feeding direction of the toner by the feeding member, the electrical contact of the storing element and the connecting portion of the pump are in opposite sides from each other with respect to a line connecting the first engaging portion and the second engaging portion.

A further typical structure disclosed in the present application is a toner cartridge comprising:

(i) a casing including (i-i) toner accommodation chamber accommodating toner, and (i-ii) a discharge opening capable of discharging the toner;

(ii) a first engaging portion forming an opening;

(iii) a second engaging portion forming an opening;

(iv) a pump configured to discharge the toner through the discharge opening by using air;

(v) a coupling member operatively connected with the pump and configured to receive a rotational force for driving the pump;

(vi) a storing element provided with an electrical contact, wherein the pump is provided with a connecting portion connected with the casing, wherein is viewed in a direction of an axis of the coupling member, the electrical contact of the storing element and the connecting portion of the pump are disposed in opposite sides with respect to a line connecting the first engaging portion and the second engaging portion.

A further typical structure disclosed in the present application is a toner cartridge comprising:

(i) a casing including (i-i) a toner accommodation chamber accommodating toner, and (i-ii) a discharge opening capable of discharging the toner;

(ii) a pump including a movable portion and configured to discharge the toner through the discharge opening by recitation of the movable portion;

(iii) a rotatable member;

(iv) a reciprocation member configured to engage with the rotatable member to be reciprocated by rotation of the rotatable member and configured to reciprocate the movable portion of the pump;

wherein when the rotatable member and the reciprocation member are engaged with each other, they are contacted at an engagement point, and a timing at which the engagement point is at a position in the movable portion of the pump exists in driving of the pump, in a coordinate in a moving direction of the movable portion of the pump.

A further typical structure disclosed in the present application is a toner cartridge comprising:

(i) a casing including (i-i) a toner accommodation chamber accommodating toner, and (i-ii) a discharge opening capable of discharging the toner;

(ii) a pump including a movable portion and configured to discharge toner through the discharge opening by reciprocating motion of the movable portion; and (iii) a drive input member configured to receive a rotational force for reciprocating the movable portion of the pump, wherein a range in which the movable portion of the pump is movable and a range in which the drive input member is provided overlap with each other at least partly, in a coordinate in a moving direction of the movable portion of the pump.

A further typical structure disclosed in the present application is a toner cartridge comprising:

(i) a casing including (i-i) a toner accommodation chamber accommodating toner, and (i-ii) a discharge opening capable of discharging the toner;

(ii) a pump including a movable portion and configured to discharge the toner through the discharge opening by recitation of the movable portion;

(iii) a rotatable member;

(iv) a reciprocation member configured to engage with the rotatable member to be reciprocated by rotation of the rotatable member and configured to reciprocate the movable portion of the pump;

wherein when the rotatable member and the reciprocation member are engaged with each other, they are contacted at an engagement point, and a timing at which the engagement point is at a position in the movable portion of the pump exists in driving of the pump, in a coordinate in a moving direction of the movable portion of the pump.

A further typical structure disclosed in the present application is a toner cartridge comprising:

(i) a casing including (i-i) a toner accommodation chamber accommodating toner, and (i-ii) a discharge opening capable of discharging the toner;

(ii) a pump including a movable portion and configured to discharge toner through the discharge opening by reciprocating motion of the movable portion; and (iii) a drive input member configured to receive a rotational force for reciprocating the movable portion of the pump, wherein a range in which the movable portion of the pump is movable and a range in which the drive input member is provided overlap with each other at least partly, in a coordinate in a moving direction of the movable portion of the pump.

A further typical structure disclosed in the present application is a toner cartridge comprising:

(i) a casing including (i-i) toner accommodation chamber accommodating toner, and (i-ii) a discharge opening capable of discharging the toner;

(ii) a pump including (ii-i) a movable portion and a (ii-i) a connecting portion mounted on the casing, the pump being configured to discharge the toner through the discharge opening by reciprocation of movable portion;

(iii) a drive input member for receiving a rotational force for driving the pump; and (iv) a rotatable member rotatable about an axis thereof and configured to reciprocate the movable portion of the pump by rotation thereof, the rotatable member including (iv-i) a gear portion configured to receive a rotational force from the drive input member, wherein the movable portion of the pump effects reciprocating motion in a direction of the axis of the rotatable member, wherein the gear portion of the rotatable member surrounds the connecting portion of the pump, and wherein as viewed in the direction of the axis of the rotatable member, the gear portion of the rotatable member and the movable portion of the pump at least partly overlap with each other.

A further typical structure disclosed in the present application is a toner cartridge comprising:

(i) a casing including (i-i) a toner accommodation chamber accommodating toner, and (i-ii) a discharge opening capable of discharging the toner;

(ii) a first feeding member movable relative to the casing and configured to feed the toner accommodated in the toner accommodation chamber to the discharge opening;

(iii) a second feeding member movable relative to the casing and configured to feed the toner accommodated in the toner accommodation chamber to the first feeding member;

(iv) a pump configured to discharge the toner through the discharge opening by using air; and (v) a drive input member configured to receive a rotational force for driving the first feeding member, the second feeding member and the pump, wherein a toner feeding direction by the first feeding member and a toner feeding direction by the second feeding member are different from each other.

A further typical structure disclosed in the present application is a toner cartridge comprising:

(i) a casing including (i-i) toner accommodation chamber accommodating toner, and (i-ii) a discharge opening capable of discharging the toner;

(ii) a pump including (ii-i) a movable portion and a (ii-ii) a connecting portion mounted on the casing, the pump being configured to discharge the toner through the discharge opening by reciprocation of movable portion;

(iii) a drive input member for receiving a rotational force for driving the pump; and (iv) a rotatable member rotatable about an axis thereof and configured to reciprocate the movable portion of the pump by rotation thereof, the rotatable member including (iv-i) a gear portion configured to receive a rotational force from the drive input member, wherein the movable portion of the pump effects reciprocating motion in a direction of the axis of the rotatable member, wherein the gear portion of the rotatable member surrounds the connecting portion of the pump, and wherein as viewed in the direction of the axis of the rotatable member, the gear portion of the rotatable member and the movable portion of the pump at least partly overlap with each other.

A further typical structure disclosed in the present application is a toner cartridge comprising:

a casing including an accommodation chamber accommodating toner and a discharge opening capable of discharging the toner;

a pump configured to discharge the toner through the discharge opening by using air; and a coupling member configured to receive a rotational force for driving the pump, wherein as viewed along an axis of the coupling member in a state that the toner cartridge takes an attitude in which the discharge opening directed downward, the discharge opening is on a first side with respect to a center of the pump in a horizontal direction, and an axis of the coupling member is on a second side which is opposite from the first side, with respect to the center of the pump in the horizontal direction.

A further typical structure disclosed in the present application is a toner cartridge comprising:

a casing including an accommodation chamber accommodating toner and a discharge opening capable of discharging the toner;

a pump provided with a connecting portion connected with the casing and configured to discharge the toner through the discharge opening by using air; and a coupling member configured to receive a rotational force for driving the pump, wherein as viewed along an axis of the coupling member in a state that the toner cartridge takes an attitude in which the discharge opening is directed downward, the discharge opening is on a first side with respect to the connecting portion of the pump in the horizontal direction, and the axis of the coupling member is on a second side which is opposite from the first side, with respect to the connecting portion of the pump in the horizontal direction.

Even further typical structure disclosed in the present application is an image forming apparatus including an apparatus main assembly and any one of the above-mentioned toner cartridges.

Effect of the Invention

As described above, according to the structure disclosed in the present application, the prior art can be developed.

Figure 12:
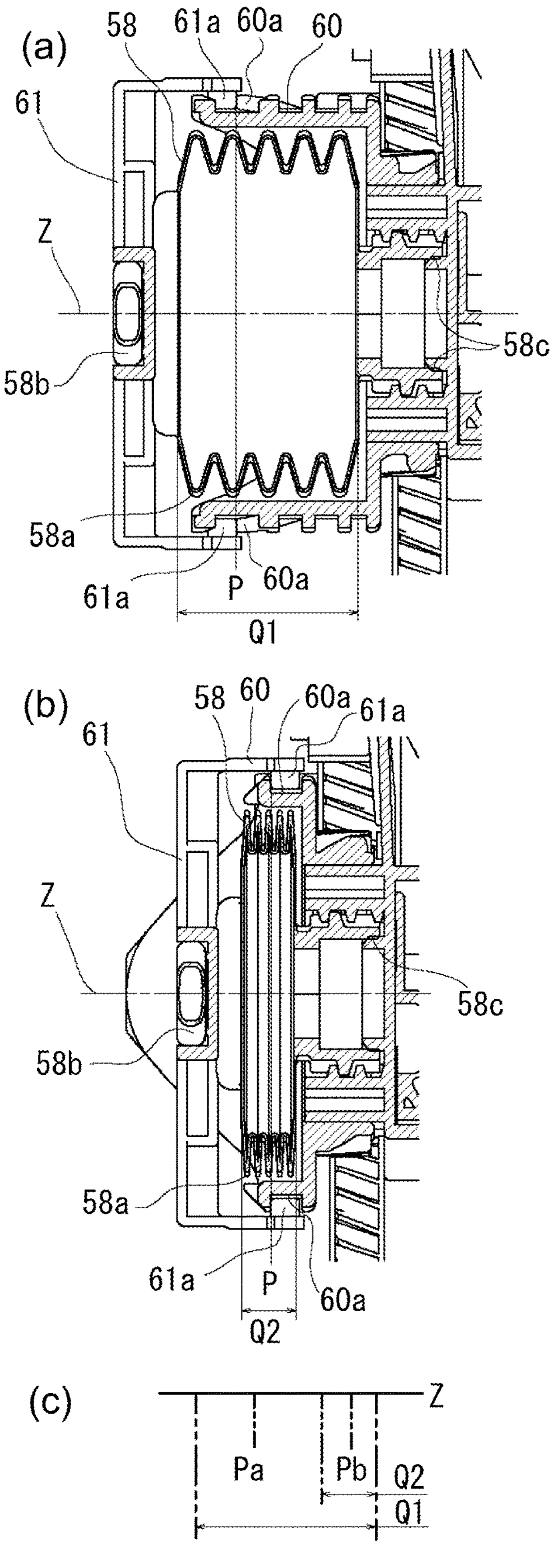

Part (a) of FIG. 12 and part (b) of FIG. 12 are partial sectional views of the developer supplying container, and part (c) of FIG. 12 is an illustration of the positions of the pump and the engagement point.

Figure 13:
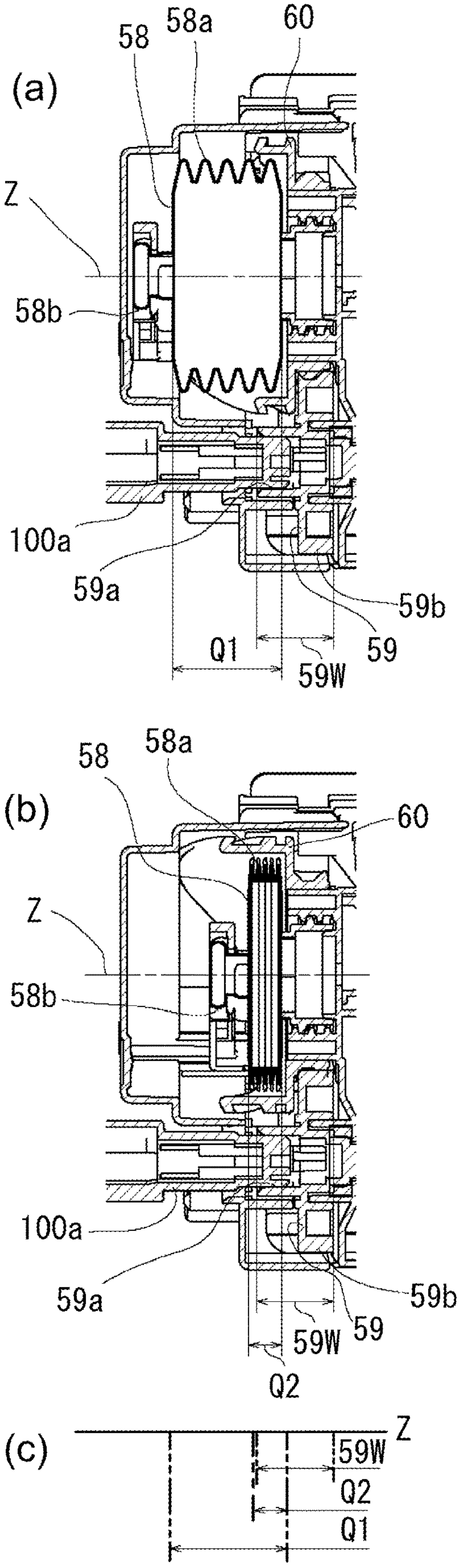

Part (a) of FIG. 13 and part (b) of FIG. 13 are partial sectional views of the developer supplying container, and part (c) of FIG. 13 is an illustration of the positions of the pump and the drive input condition.

Figure 14:
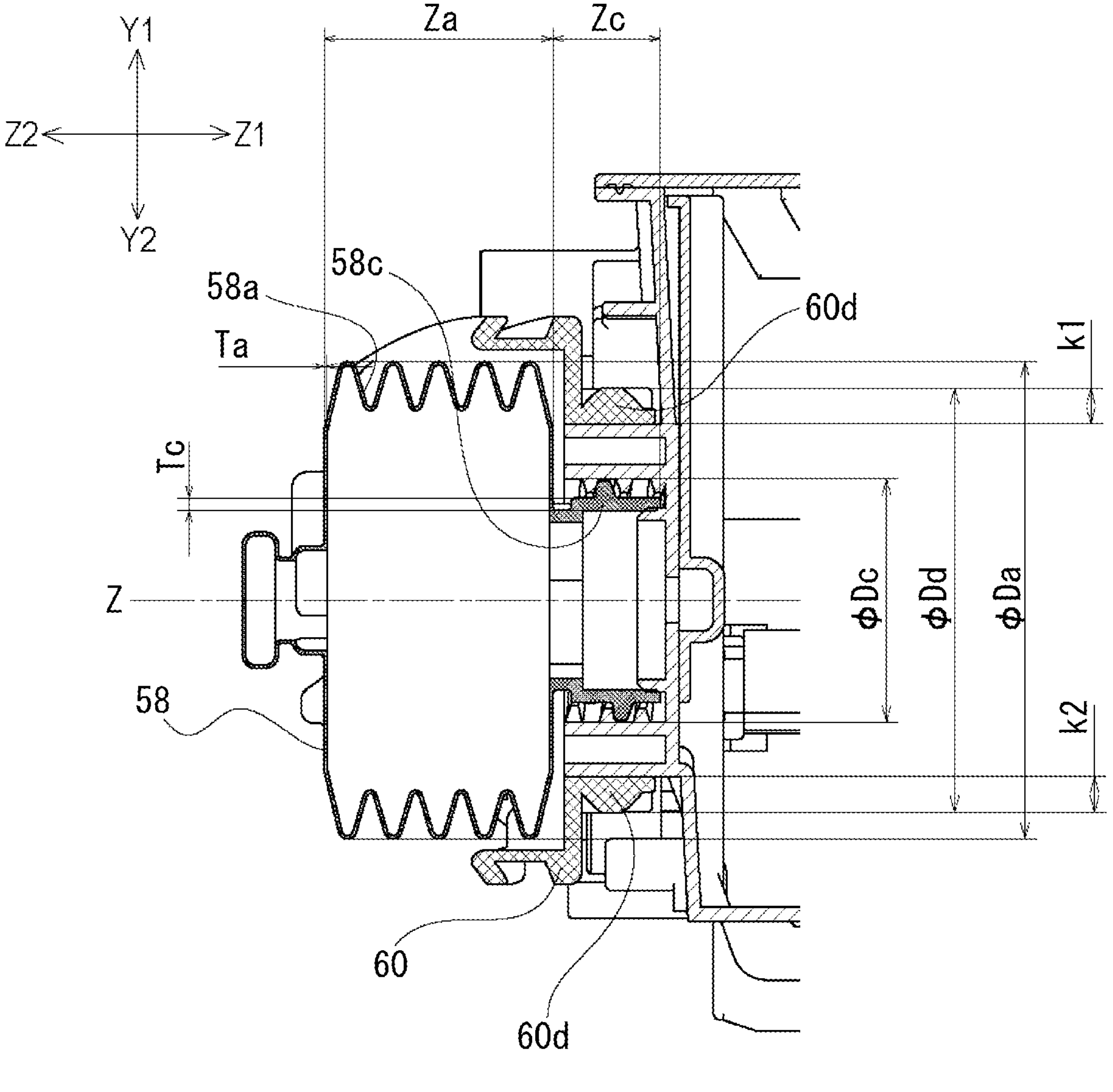

FIG. 14 is a sectional view around the pump.

Figure 15:
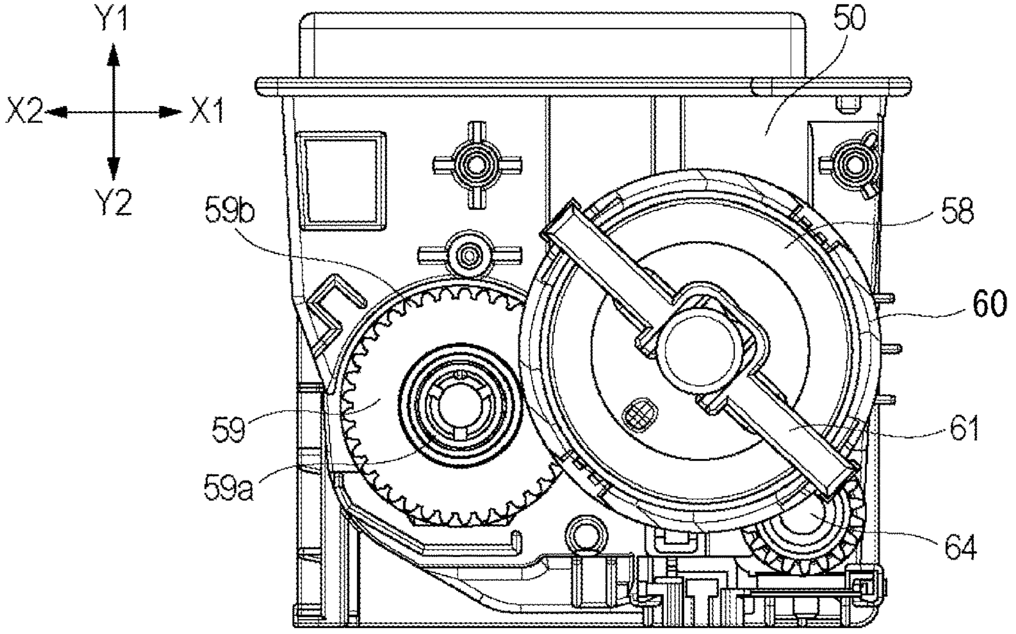
Figure 15:
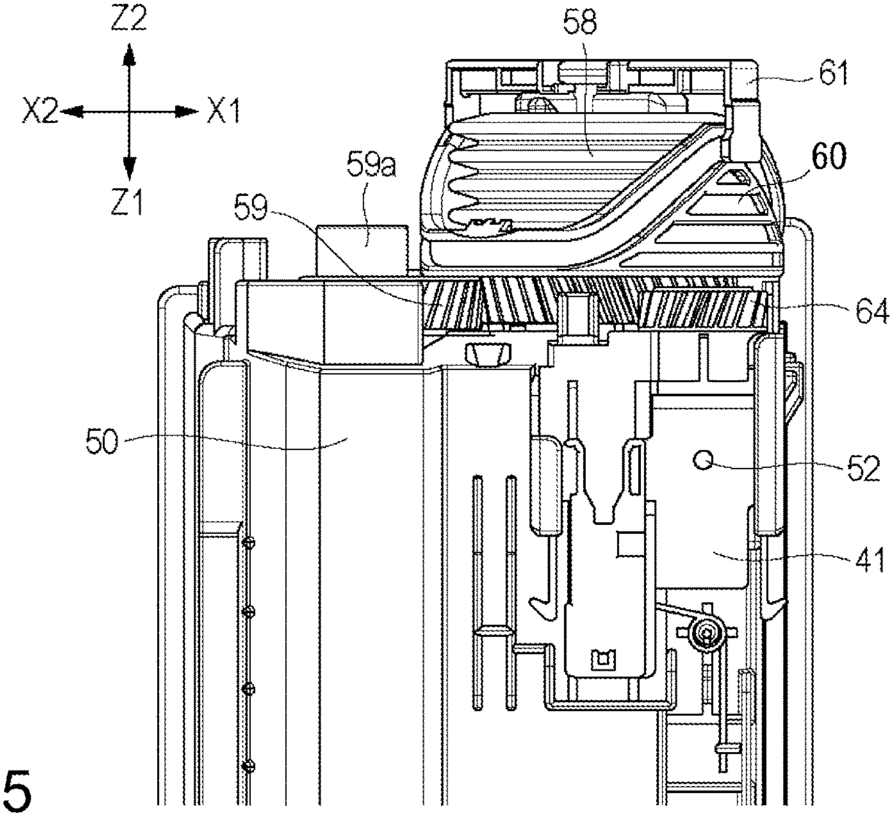

FIG. 15 is a schematic cross-sectional view illustrating the surroundings of the pump.

Figure 16:
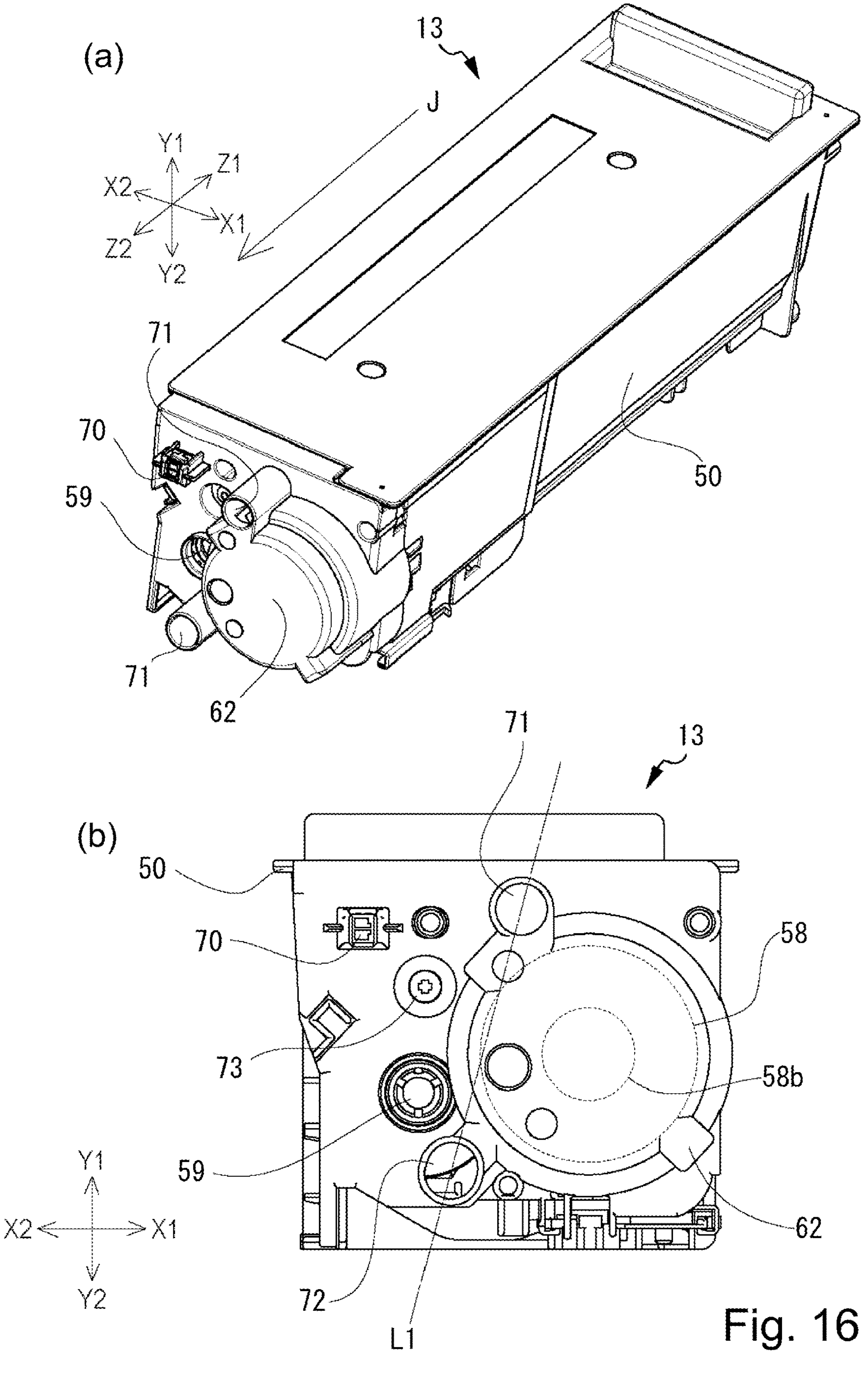

Part (a) of FIG. 16 is a perspective view as seen from the rear of the developer supplying container, and part (b) of FIG. 16 is a rear view of the developer supplying container.

Figure 17:
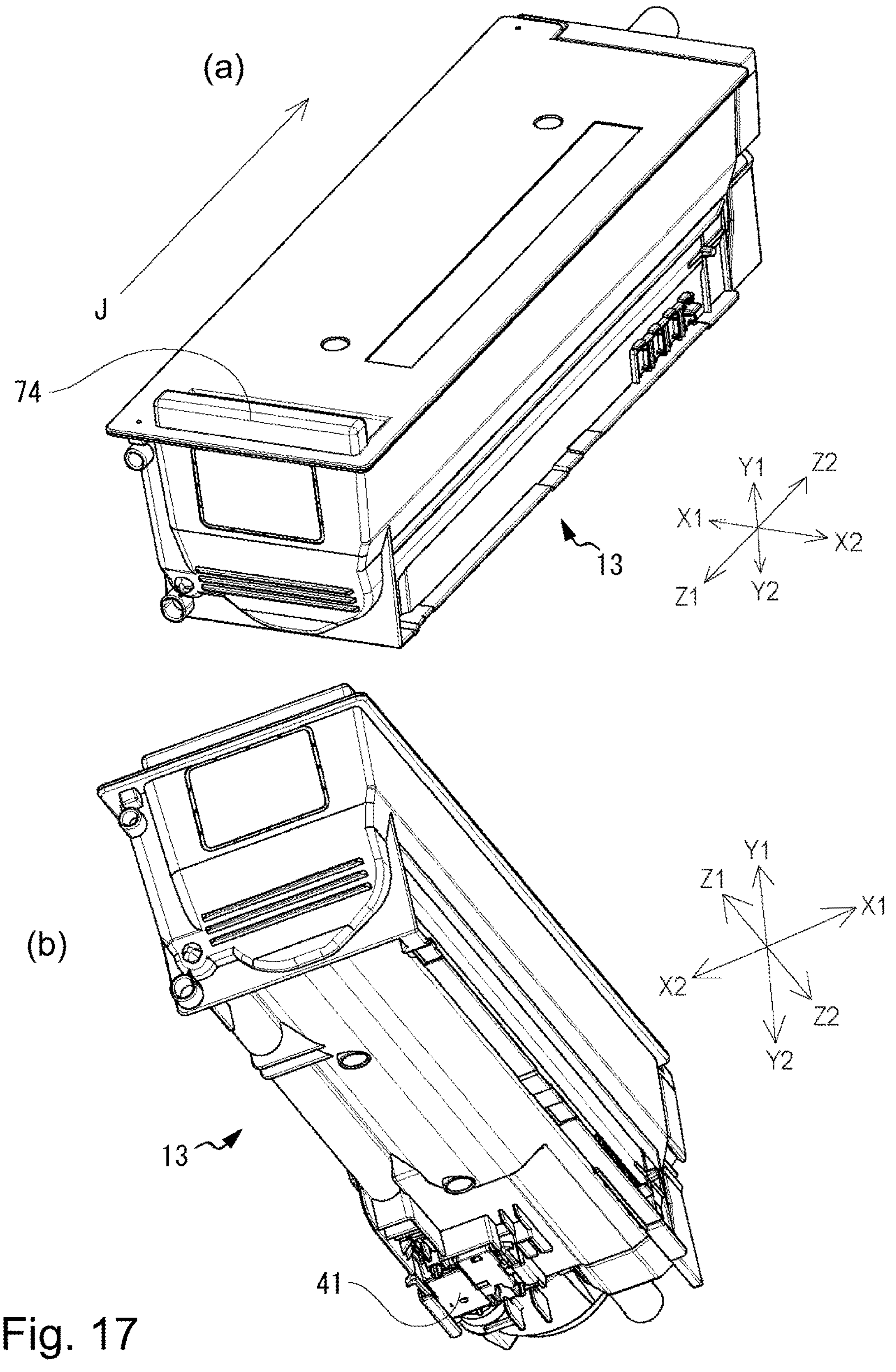

FIG. 17 is a perspective view as seen from the front side of the developer supplying container.

Figure 18:
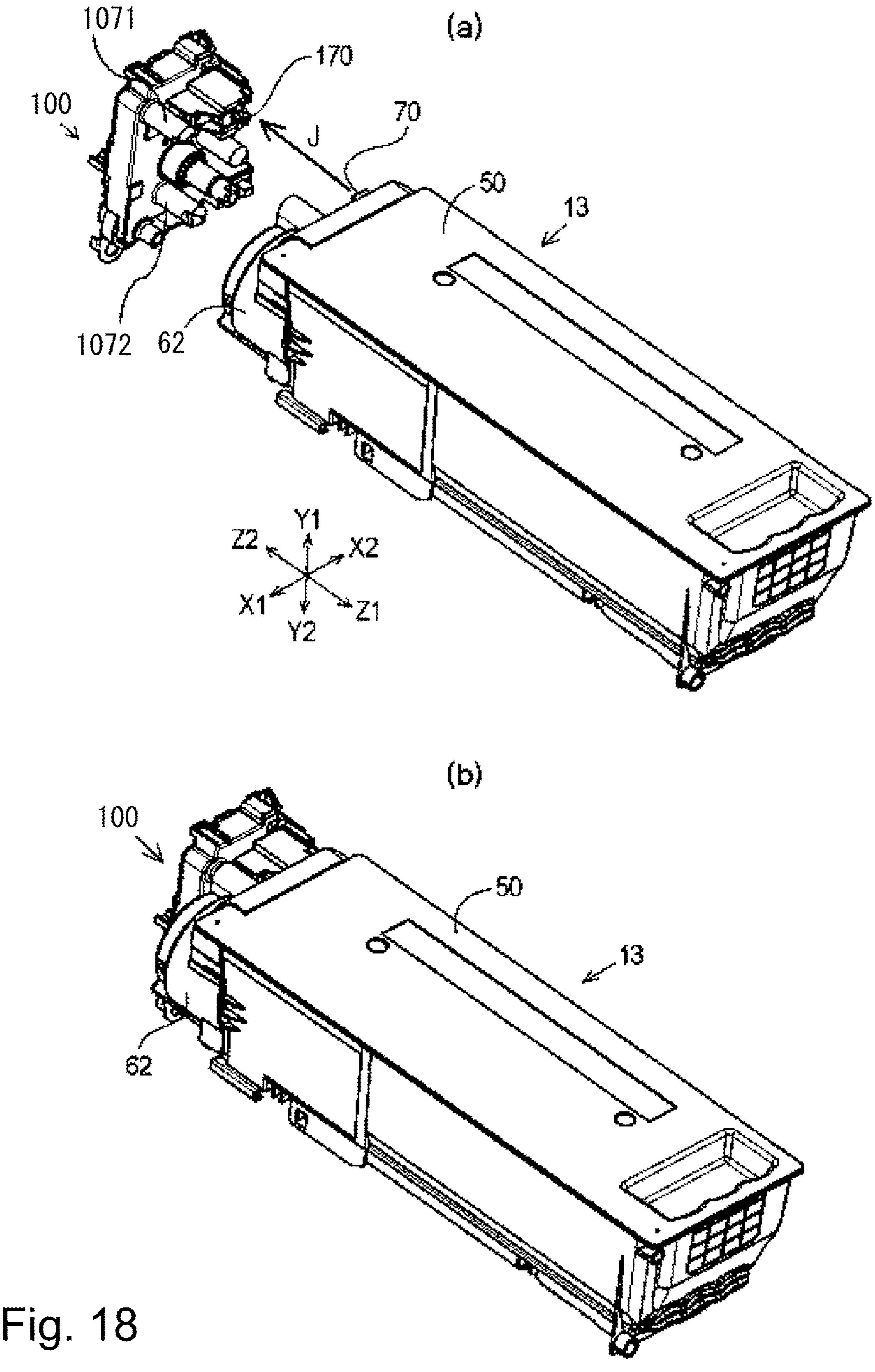

FIG. 18 is an overall perspective view when the cartridge is mounted in the image forming apparatus.

Figure 19:
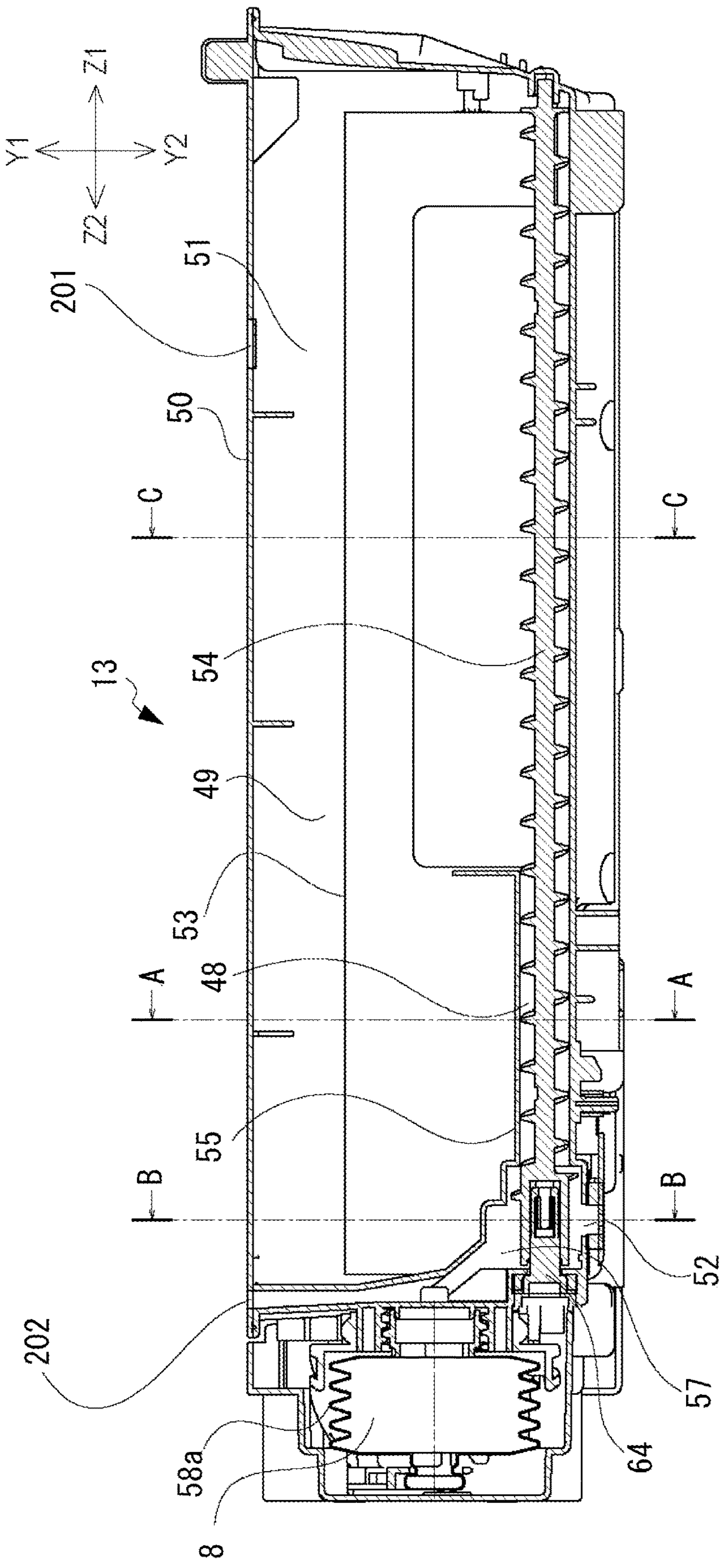

FIG. 19 is a schematic sectional view of the developer supplying container.

Figure 20:
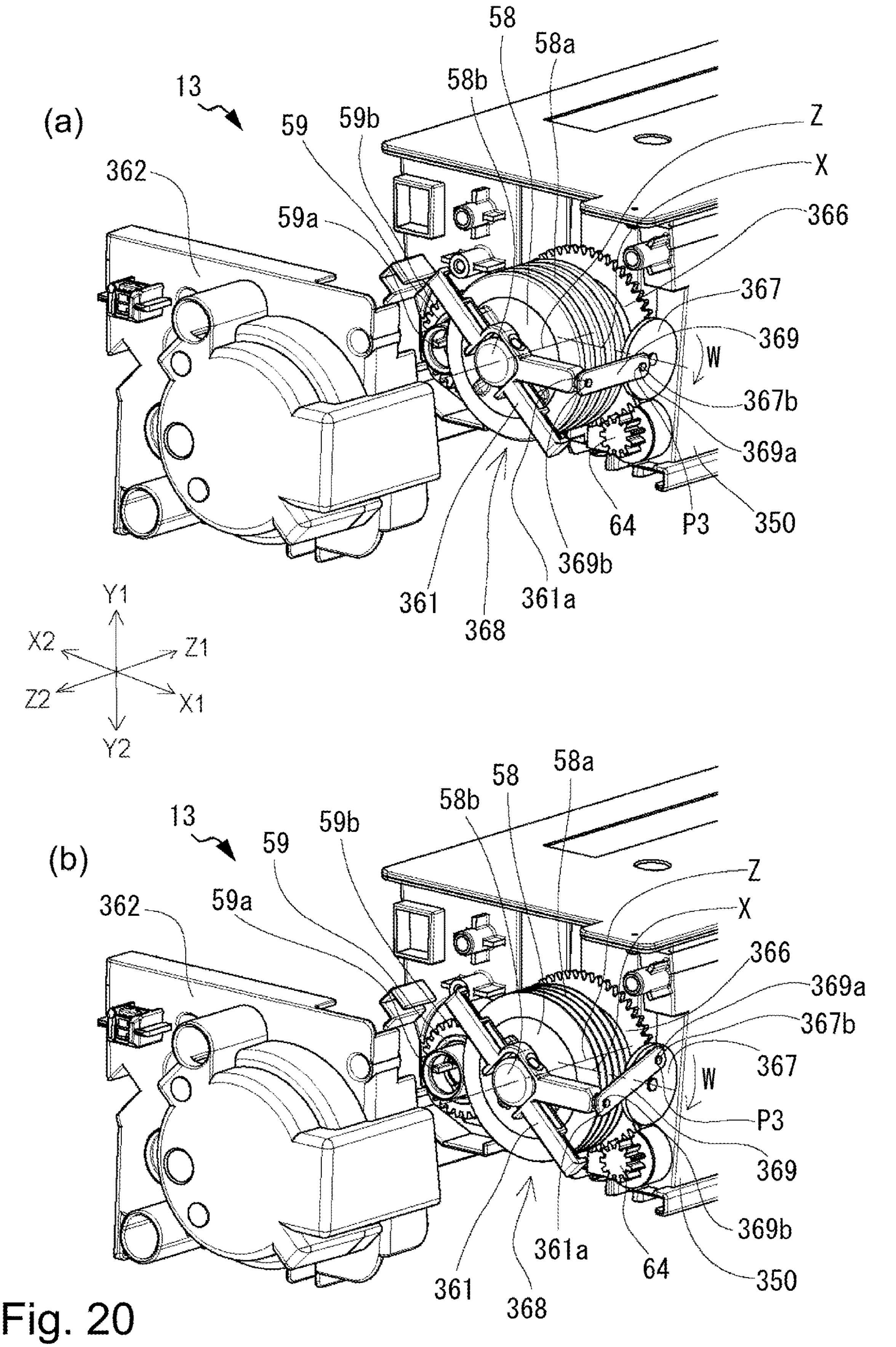

FIG. 20 is a partial perspective view of the rear end portion of the developer supplying container.

Figure 21:
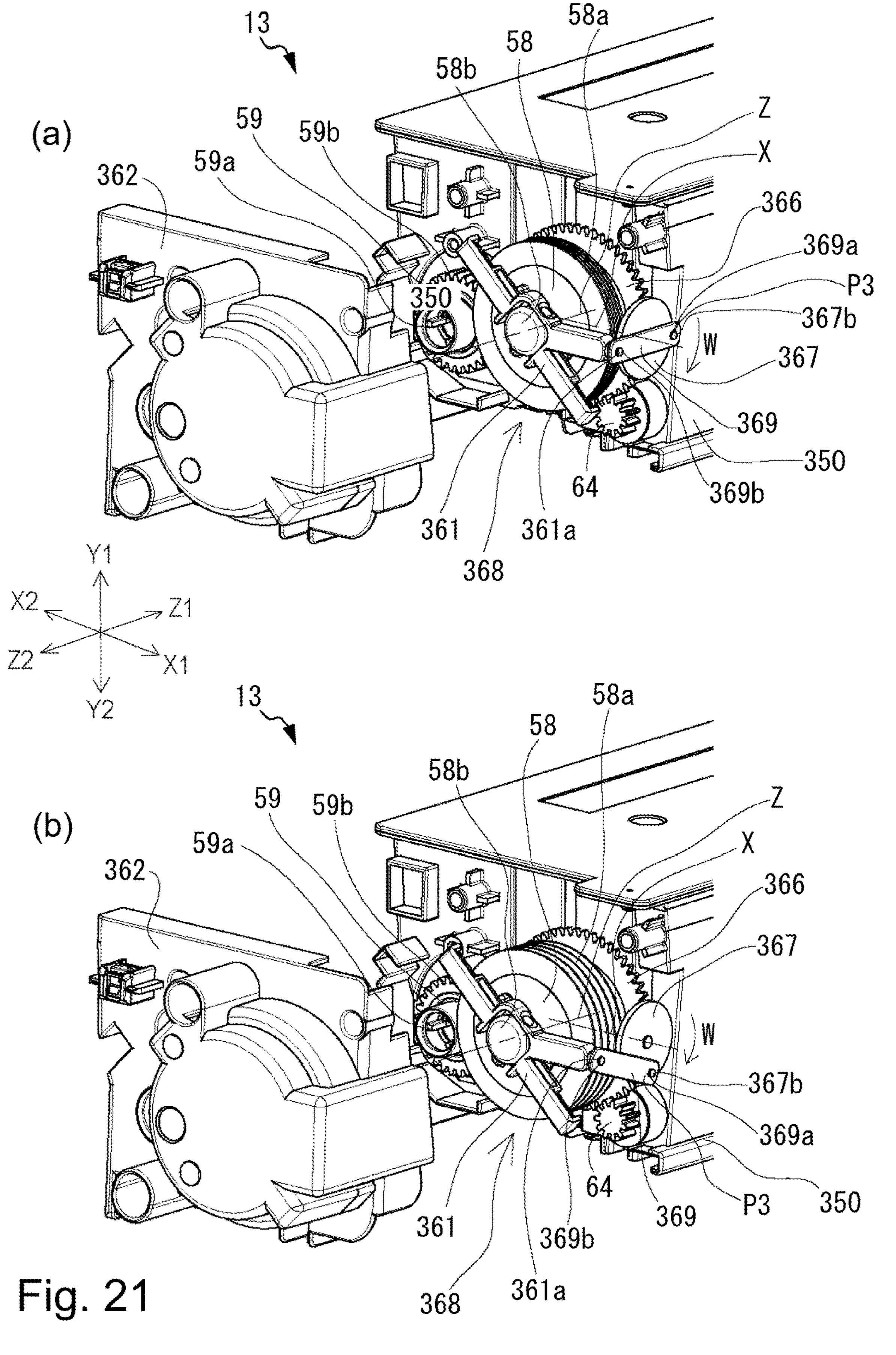

FIG. 21 is a partial perspective view of the rear end portion of the developer supplying container.

Figure 22:
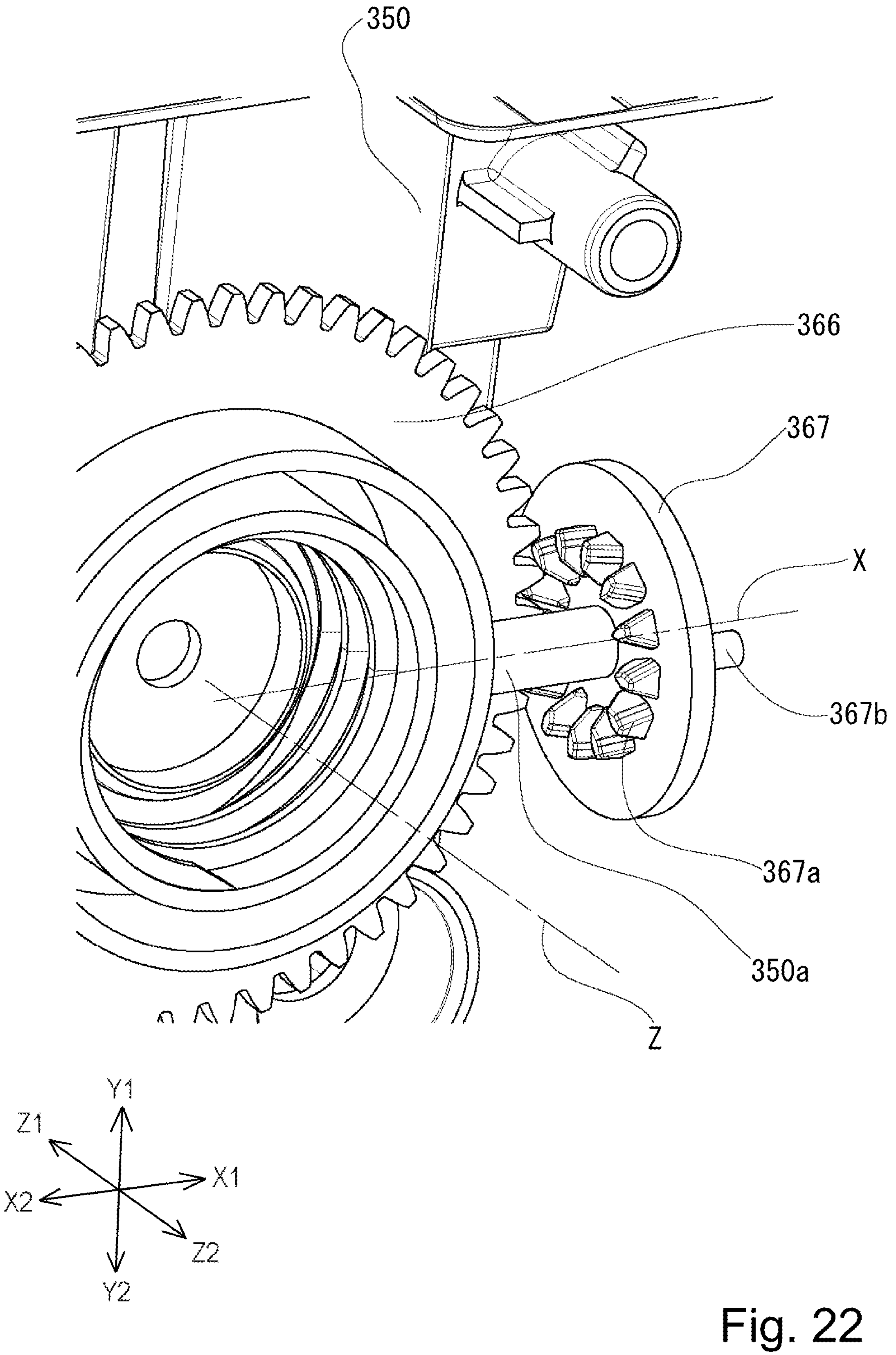

FIG. 22 is a detailed perspective view around a crank gear.

Figure 23:
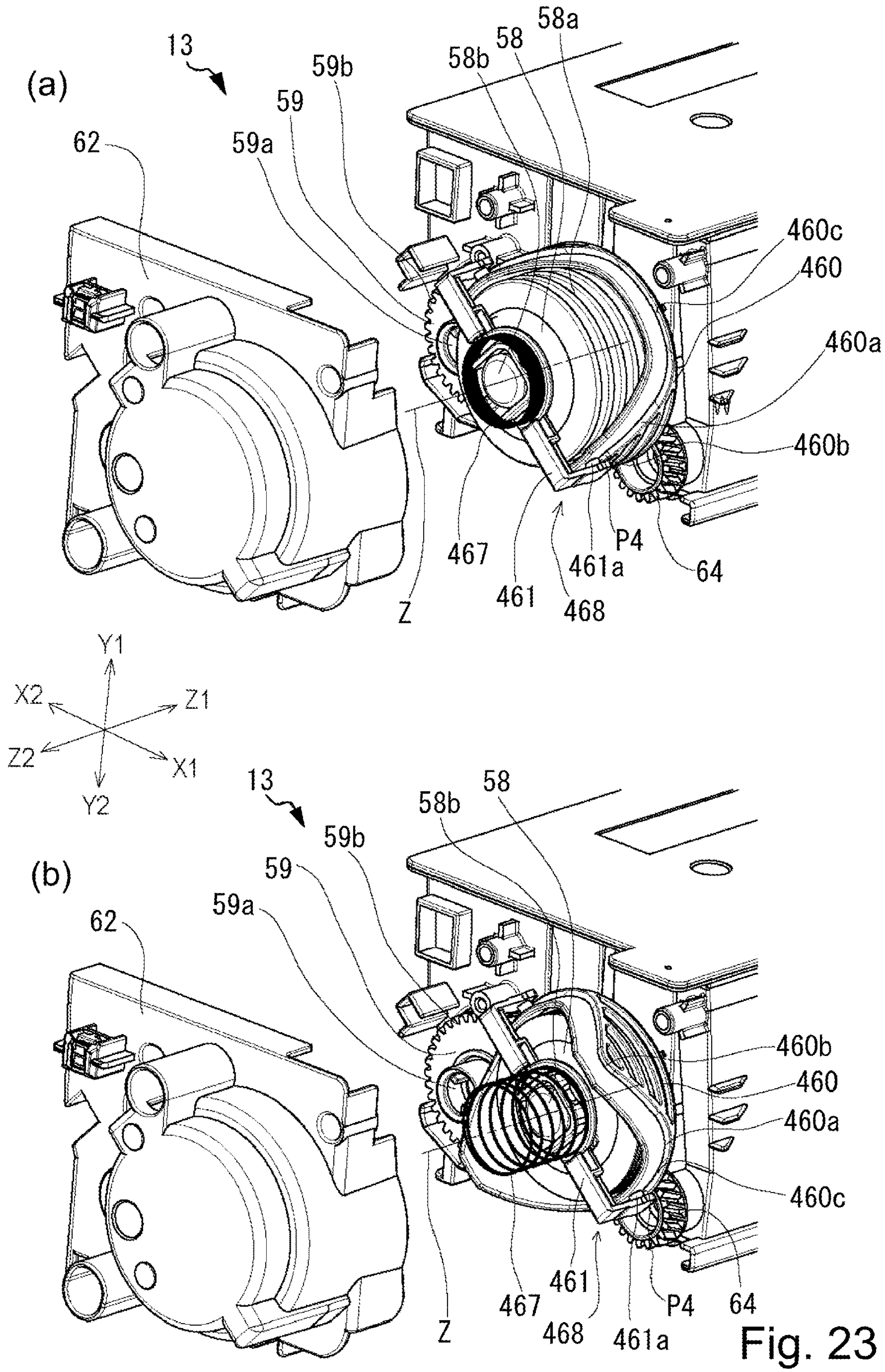

FIG. 23 is a partial perspective view of the rear end portion of the developer supplying container.

Figure 24:
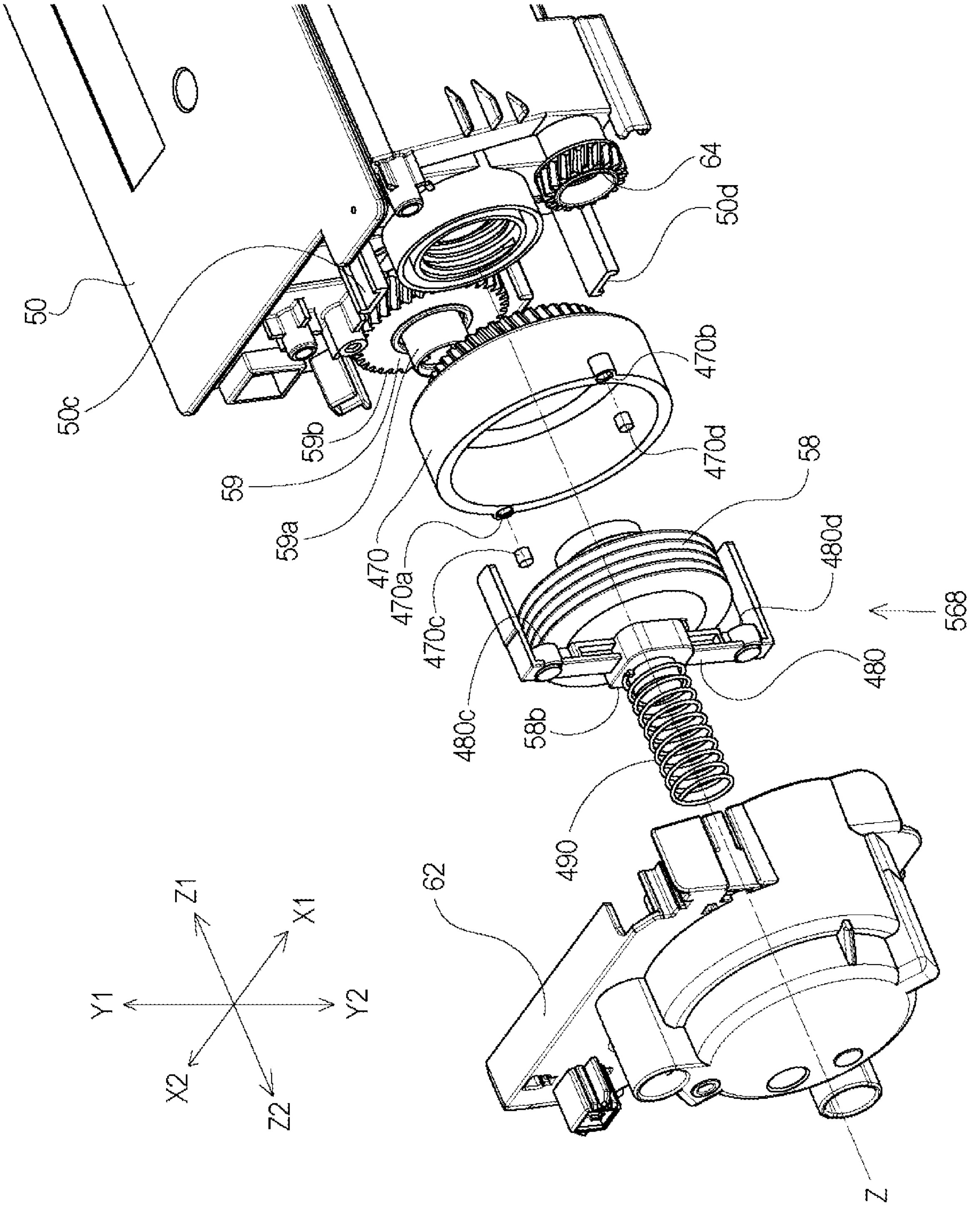

FIG. 24 is a partial perspective view of the rear end portion of the developer supplying container.

Figure 25:
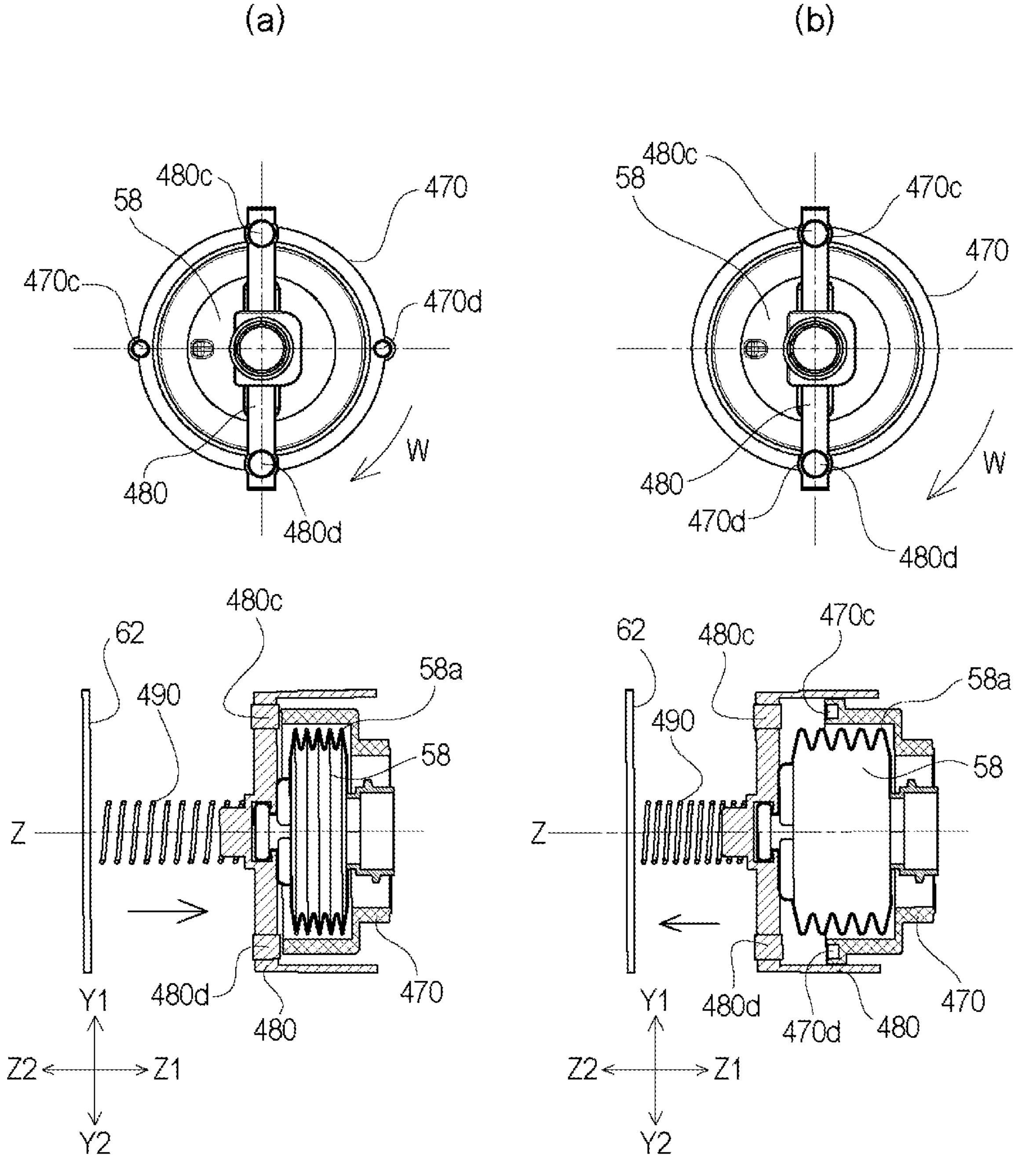

FIG. 25 is a simplified illustration of expansion and contraction of the pump.

Figure 26:
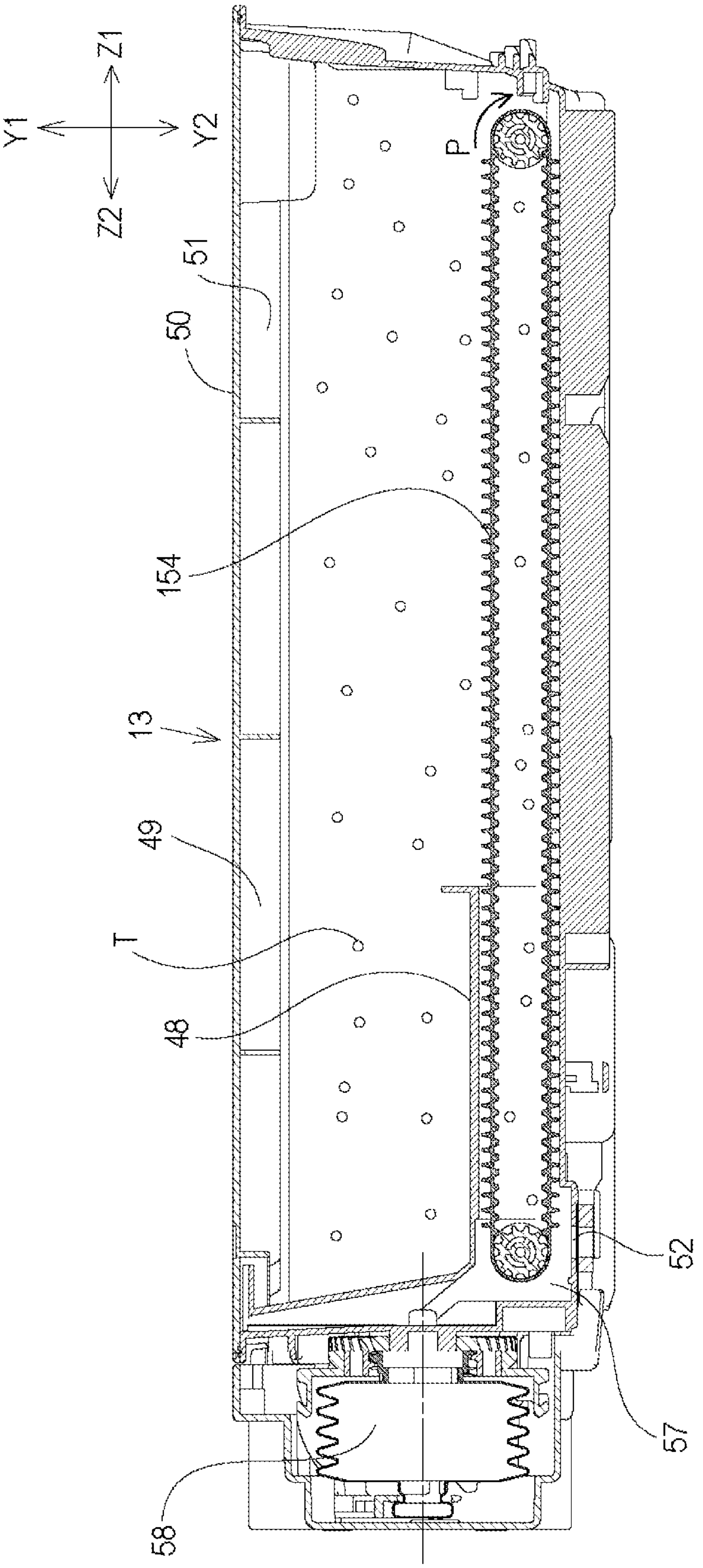

FIG. 26 is a sectional view of the neighborhood of the supply toner feed belt as viewed from the short side.

Figure 27:
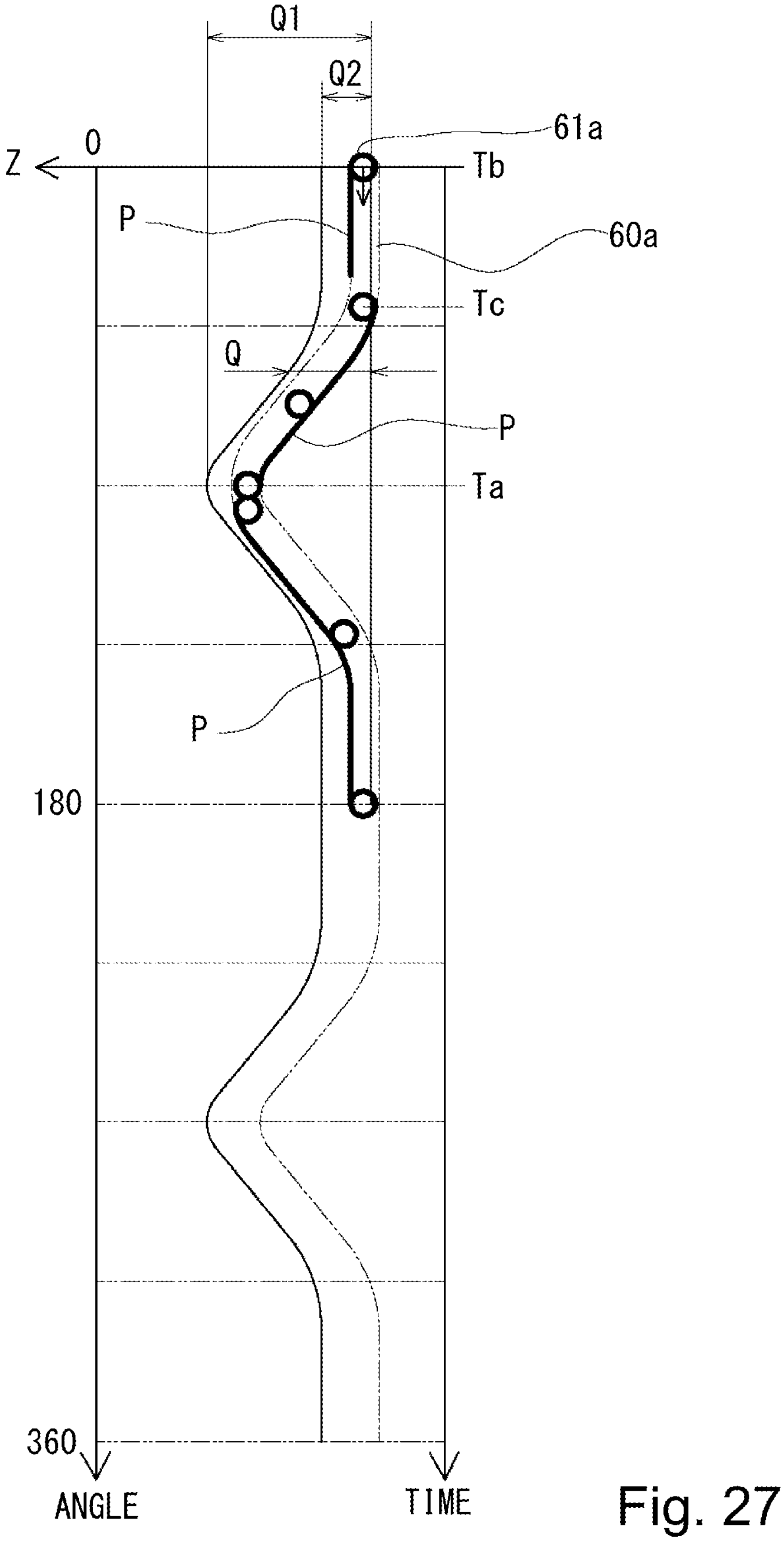

FIG. 27 is a graph showing change, with time, of the positional relationship between the engagement point and the bellows portion in the operating process of the pump of the developer supplying container.

Figure 28:
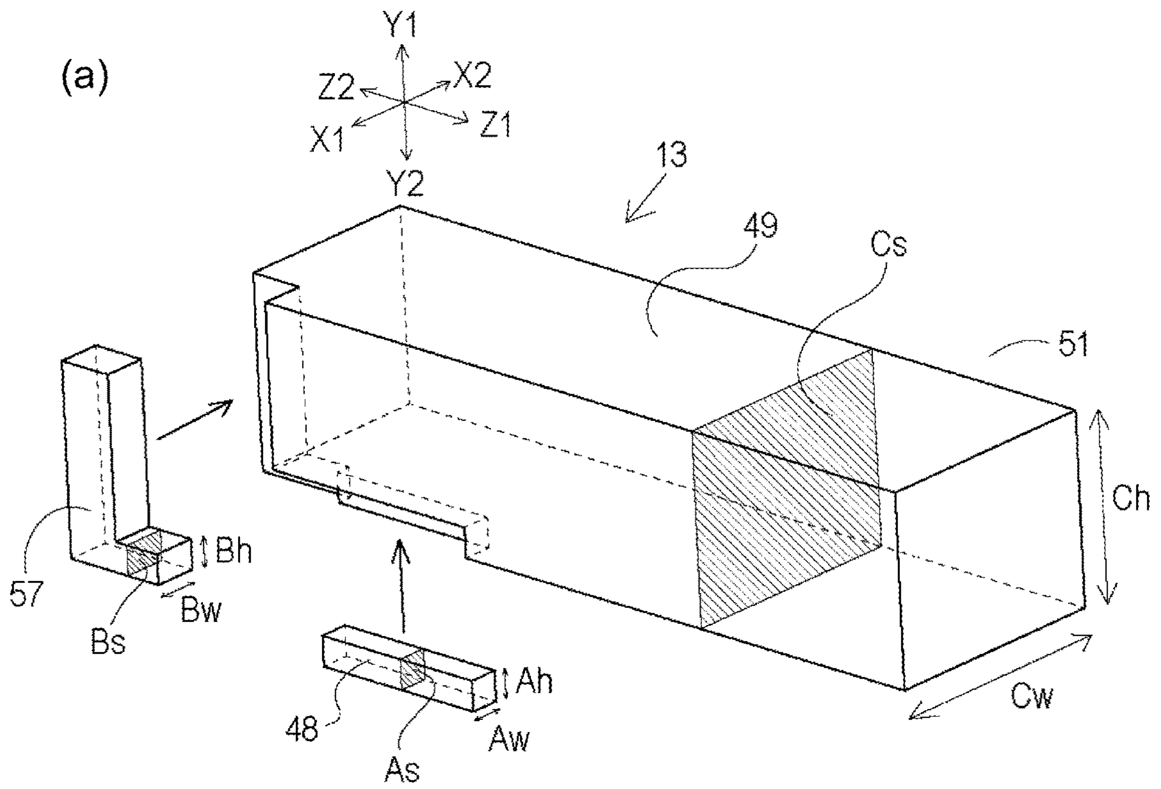
Figure 28:
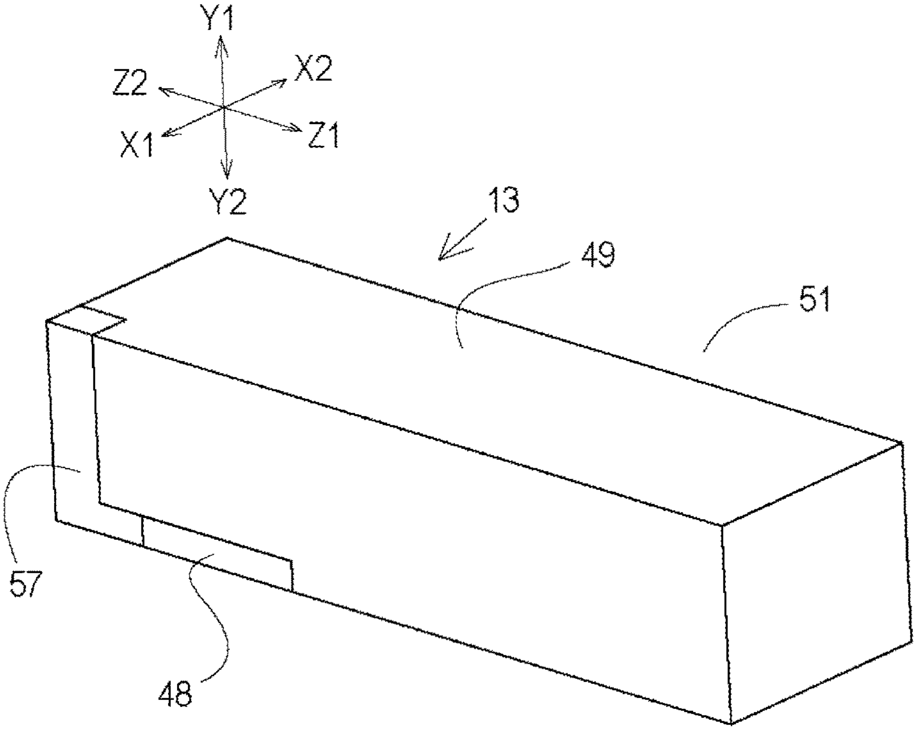

FIG. 28 is a simplified illustration of an internal space.

Figure 29:
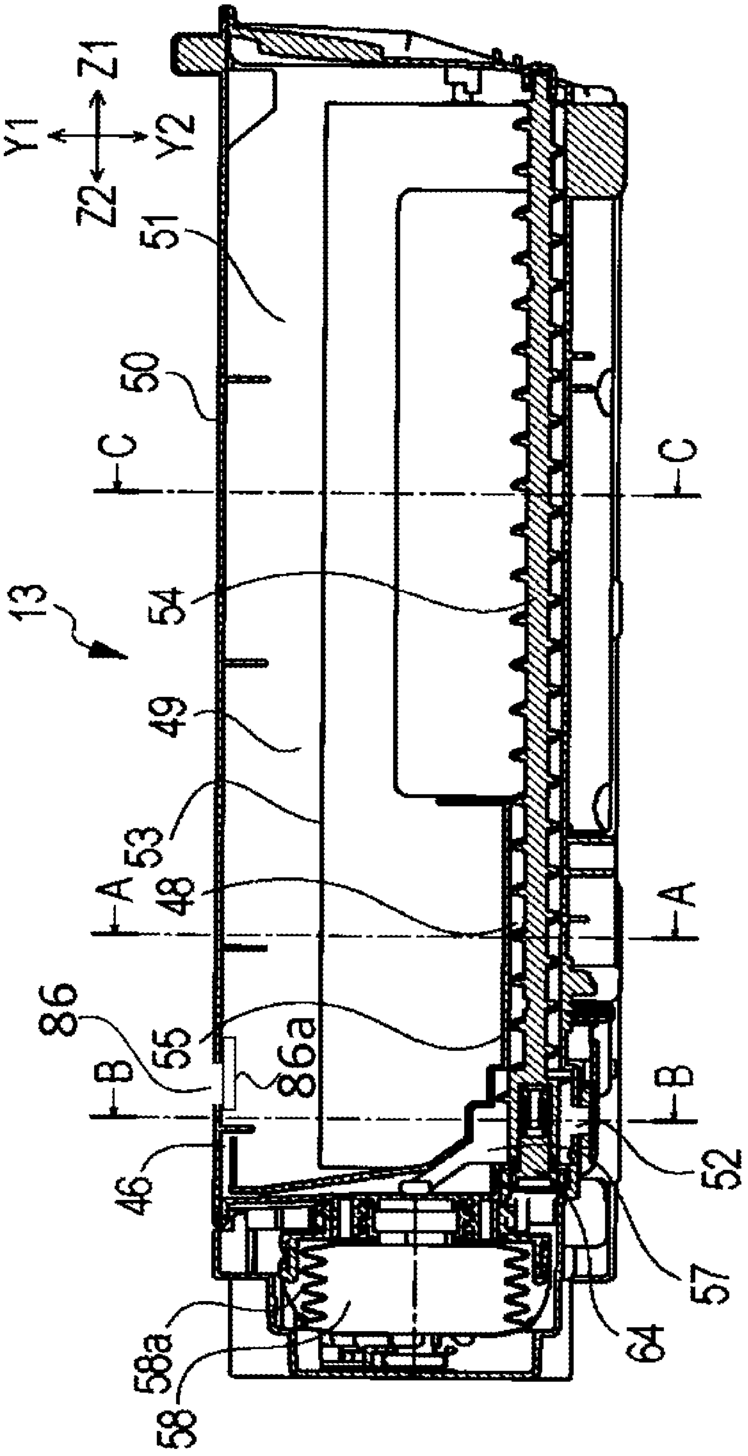

FIG. 29 is a schematic view of a toner cartridge including an inlet port.

Figure 30:
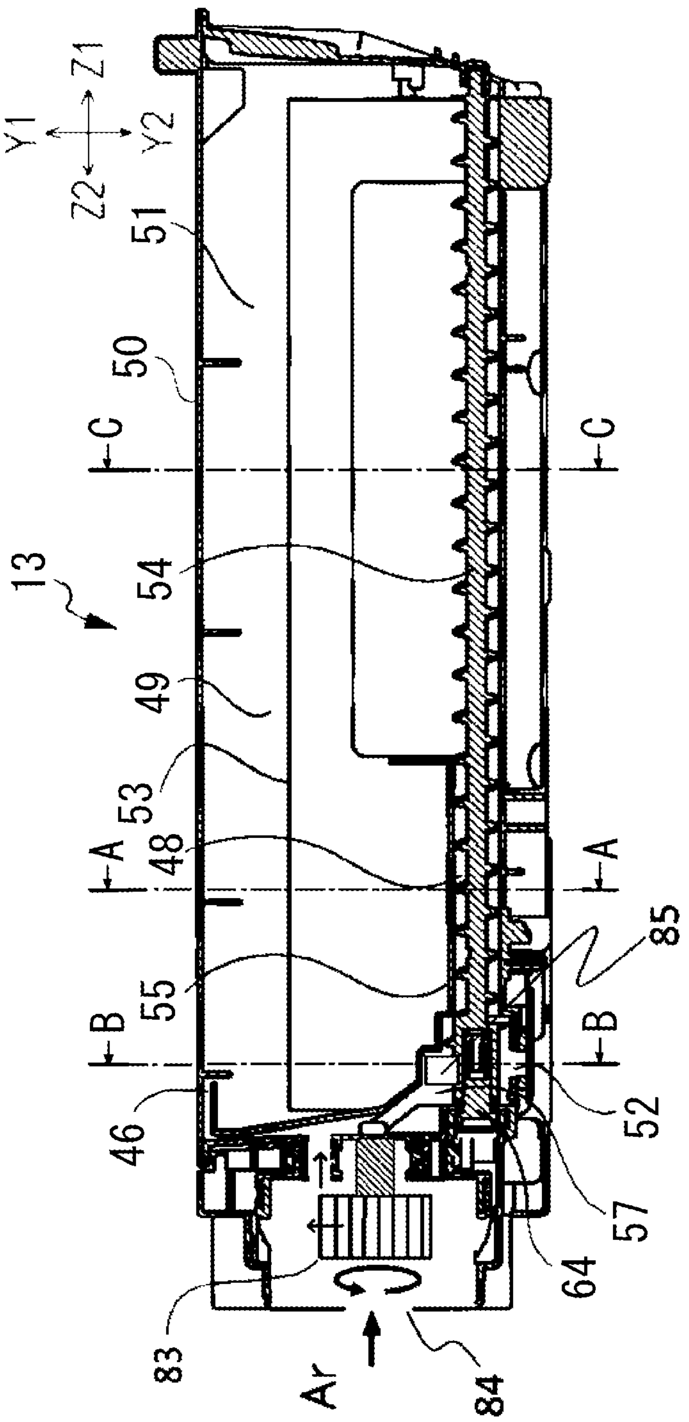

FIG. 30 is a schematic view of a toner cartridge including a centrifugal pump.

EMBODIMENTS

Embodiment 1

Embodiment 1 (Example 1) will be described in the following with reference to the accompanying drawings. Here, the dimensions, materials, shapes, and relative arrangements of the components described in the embodiments may be appropriately changed depending on the structure of the apparatus to which the invention is applied, various conditions, and the like. It is not intended to limit the scope to the following embodiments.

<Overall Structure of Image Forming Apparatus 100>

Figure 2:
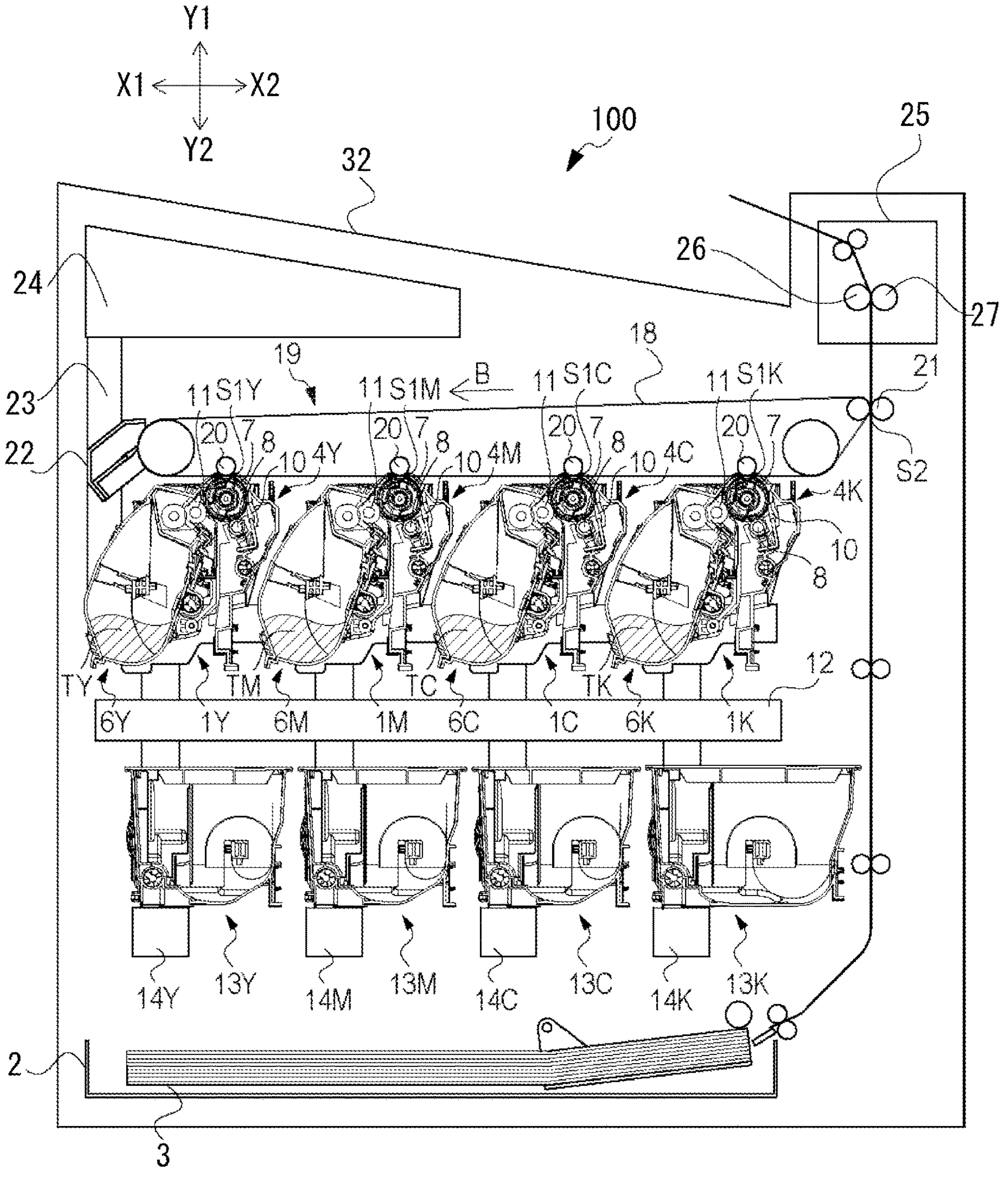
FIG. 2 is a schematic cross-sectional view of an electrophotographic image forming apparatus.
Figure 3:
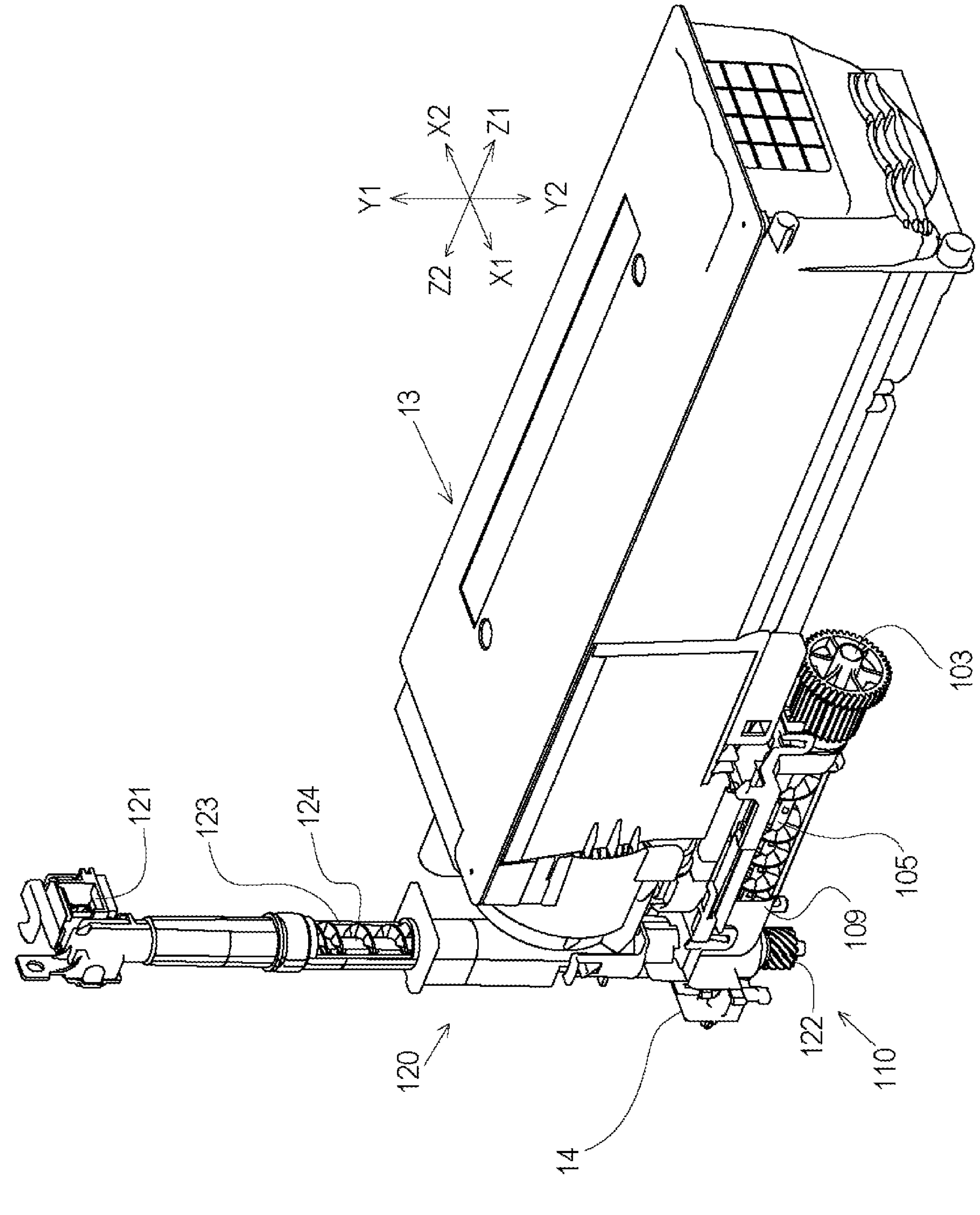
FIG. 3 is a schematic structure illustration of a toner feeding device provided in the image forming device.

Referring to FIG. 3, The overall structure of the electrophotographic image forming apparatus 100 (hereinafter, image forming apparatus 100) according to this embodiment will be described. FIG. 2 is a schematic view of the image forming apparatus 100 according to this embodiment. In this embodiment, the process cartridge 1 and the developer supplying container (toner cartridge, developer cartridge) 13 is detachably mountable to the main assembly of the image forming apparatus 100. The portion of the image forming apparatus 100 excluding the cartridges (1, 13) may be referred to as the main assembly of the image forming apparatus 100 (apparatus main assembly, image forming apparatus main assembly).

In this embodiment, the structures and operations of the first to fourth image forming portions are substantially the same except that the colors of the formed images are different. Therefore, in the following, if no particular distinction is necessary, the subscripts Y to K will be omitted for general explanation.

The first to fourth process cartridges 1 are juxtaposed in the horizontal direction. Each process cartridge 1 comprises a cleaning unit 4 and a developing unit 6. The cleaning unit 4 includes a photosensitive drum 7 as an image bearing member, a charging roller 8 as a charging means for uniformly charging the surface of the photosensitive drum 7, and a cleaning blade 10 as a cleaning means. The developing unit 6 contains a developing roller 11 and a developer T (hereinafter referred to as toner), and includes a developing means for developing an electrostatic latent image on the photosensitive drum 7. The cleaning unit 4 and the developing unit 6 are supported so as to be swingable relative to each other. The first process cartridge 1Y contains yellow (Y) toner in the developing unit 6. Similarly, the second process cartridge 1M contains magenta (M) toner, the third process cartridge 1C contains cyan (C) toner, and the fourth process cartridge 1K contains black (K) toner.

The process cartridge 1 can be mounted to and dismounted from the main assembly of the image forming apparatus 100 by way of mounting means such as a mounting guide (not shown) and a positioning member (not shown) provided in the main assembly of the image forming apparatus 100. Further, a scanner unit 12 for forming an electrostatic latent image is provided below the process cartridge 1. Further, in the image forming apparatus, the waste toner transfer unit 23 is provided behind the process cartridge 1 (downstream of the process cartridge 1 in the inserting direction of the process cartridge 1).

The first to fourth developer supplying containers 13 are arranged horizontally below the process cartridge 1 in an order corresponding to the colors of the toners contained in the respective process cartridges 1. In the following description, the developer supplying container (toner cartridge, developer cartridge) 13 may be simply referred to as a cartridge 13.

The first cartridge 13Y contains yellow (Y) toner, similarly, the second cartridge 13M contains magenta (M) toner, the third cartridge 13C contains cyan (C) to toner, and the fourth cartridge 13K contains black toner (K). Then, each cartridge 13 supplies the toner to the process cartridge 1 containing the toner of the same color.

The toner replenishing operation (supplying operation) by the cartridge 13 is performed when the remaining amount detecting portion (not shown) provided in the apparatus main assembly of the image forming apparatus 100 detects the insufficient remaining amount of the toner in the process cartridge 1. The cartridge 13 can be mounted to and dismounted from the image forming apparatus 100 by way of that mounting means such as the mounting guide (not shown) and the positioning member (not shown) provided in the main assembly of the image forming apparatus 100.

Here, when the toner cartridge 13 and the process cartridge 1 are referred to distinctively from each other, one of the two may be referred to as a first cartridge, the other may be referred to as a second cartridge, or the like. A detailed description of the process cartridge 1 and the cartridge 13 will be made hereinafter.

Inside the main assembly of the image forming apparatus 100, the first to fourth toner feeding devices 14 are arranged below the first to fourth cartridges 13 correspondingly to the respective cartridges 13.

Above the process cartridge 1, an intermediary transfer unit 19 as an intermediary transfer member is provided. The intermediary transfer unit 19 is provided substantially horizontally with the primary transfer portion (S1) side facing down. The intermediary transfer belt 18 facing each photosensitive drum 7 is a rotatable endless belt, and is stretched around a plurality of tension rollers. To the inner surface of the intermediary transfer belt 18, a primary transfer roller 20 is provided as a primary transfer member at a position for forming and a primary transfer portion S1 in cooperation with each photosensitive drum 7, interposing the intermediary transfer belt 18 therebetween. Further, a secondary transfer roller 21, which is a secondary transfer member, Is in contact with the intermediary transfer belt 18 and forms a secondary transfer portion S2 in cooperation with the roller on the opposite side, interposing the intermediary transfer belt 18. Further, the intermediary transfer belt cleaning unit 4 is disposed on the side opposite from the secondary transfer portion S2, in the left-right direction (the direction in which the secondary transfer unit S2 and the intermediary transfer belt are extended).

A fixing unit 25 is provided above the intermediary transfer unit 19. The fixing unit includes a heating unit 26 and a pressure roller 27 which press-contacts the heating unit. A discharge tray 32 is provided at the upper surface of the main assembly of the apparatus, and a waste toner collection container 24 is provided between the discharge tray 32 and the intermediary transfer unit. Further, a sheet feed tray 2 for accommodating the recording material 3 is provided at the lowermost portion of the main assembly of the apparatus.

FIG. 3 shows a general structure of the toner feeding device 14 mounted in the image forming apparatus.

In FIG. 3, a portion of the shape is cut out to show the internal structure of the toner feeding device 14.

The toner feeding device 14 is roughly divided into an upstream side feeding portion 110 and a downstream side feeding portion 120.

A supply opening (reception port: not shown) is provided on the upper side of the upstream side feeding portion 110. The toner received from the toner cartridge 13 (that is, the toner discharged from a discharge opening 52 shown in FIG. 8 which will be described hereinafter) is supplied through the supply port to a storage container 109 inside the upstream side feeding portion 110.

The supplied toner is transported to an upstream screw 105 which is provided so as to be covered with the storage container 109 inside the upstream side feeding portion 110. The upstream screw 105 is rotationally driven by an upstream drive gear 103, and the upstream screw 105 transports the toner toward the downstream feeding portion 120.

Inside the downstream side feeding portion 120, a downstream screw 124 is provided so as to be covered with a downstream side wall surface 123 inside the downstream side feeding portion 120. The upstreammost portion of the downstream feeding portion 120 is connected to the downstreammost portion of the upstream side feeding portion 110, and the toner fed by the upstream side feeding portion 110 is fed to the downstream screw 124.

The downstream screw 124 is rotationally driven by a downstream drive gear 122, and the downstream screw 124 conveys the toner in the direction against the gravity. The downstream screw 124 is structured to supply the toner fed in the direction opposite to gravity into the process cartridge 1 shown in FIG. 2 through the main assembly discharge opening 121.

To explain in detail, the toner discharged from the main assembly discharge opening 121 is supplied into the developing unit 6 through the receiving opening 40 provided in the developing unit 6 of the process cartridge 1 shown in FIG. 6, which will be described hereinafter.

In this manner, the apparatus main assembly of the image forming apparatus once receives the toner discharged from the toner cartridge 13 in the storage container 109, and then supplies the toner into the process cartridge 1 by using the upstream screw 105 and the downstream screw 124. By this, the toner is transferred between the different cartridges 13 and 1.

<Image Formation Process>

Figure 4:
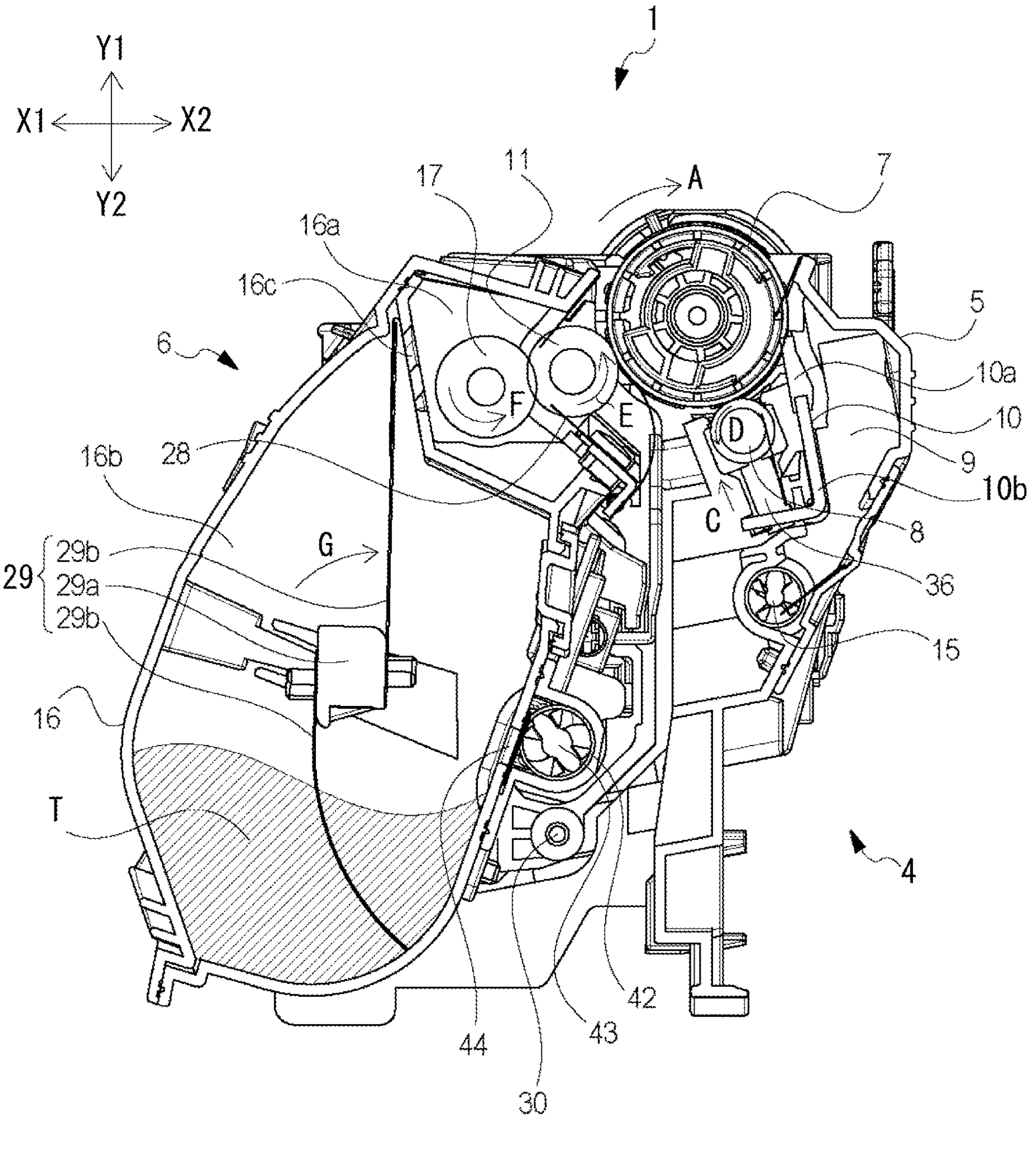
FIG. 4 is a main cross-sectional view of a process cartridge.

Next, referring to FIGS. 2 and 4, the image forming operation in the image forming apparatus 100 will be described. During the image forming operation, the photosensitive drum 7 is rotationally driven at a predetermined speed in the direction of arrow A in FIG. 4. The intermediary transfer belt 18 is rotationally driven in the direction of arrow B (forward in the direction of rotation of the photosensitive drum 7).

First, the surface of the photosensitive drum 1 is uniformly charged by the charging roller 8. Next, the surface of the photosensitive drum 1 is scanned and exposed by the laser beam emitted from the scanner unit 12, so that an electrostatic latent image based on the image information is formed on the photosensitive drum 1. The electrostatic latent image formed on the photosensitive drum 1 is developed as a toner image by the developing unit 6. At this time, the developing unit 6 is pressed by a developing pressure unit (not shown) provided in the main assembly of the image forming apparatus 100. Then, the toner image formed on the photosensitive drum 1 is primarily transferred onto the intermediary transfer belt 18 by the primary transfer roller 20.

For example, at the time of forming a full-color image, the toner images of respective colors are sequentially superimposed on the intermediary transfer belt 18 by sequentially performing the above-mentioned processes in the image forming units S1Y to S1K which are the primary transfer portions 1 to 4.

On the other hand, the recording material 3 housed in the sheet feed tray 2 is fed at a predetermined control timing, and is fed to the secondary transfer unit S2 in synchronization with the movement of the intermediary transfer belt 18. Then, the four-color toner images on the intermediary transfer belt 18 are collectively secondarily transferred onto the recording material 3 by the secondary transfer roller 21 which is in contact with the intermediary transfer belt 18 with the recording material 3 therebetween.

Thereafter, the recording material 3 onto which the toner image is transferred is fed to the fixing unit 25. The toner image is fixed on the recording material 3 by heating and pressing the recording material 3 in the fixing unit 25. Thereafter, the fixed recording material 3 is fed to the discharge tray 32 to complete the image forming operation.

Further, the primary untransferred residual toner (waste toner) remaining on the photosensitive drum 1 after the primary transfer step is removed by the cleaning blade 10. The secondary untransferred residual toner (waste toner) remaining on the intermediary transfer belt 18 after the secondary transfer step is removed by an intermediary transfer belt cleaning unit 22. The waste toner removed by the cleaning blade 10 and the intermediary transfer belt cleaning unit 22 is fed by the waste toner feeding unit 23 provided in the main assembly of the apparatus and is accumulated in the waste toner collection container 24. The image forming apparatus 100 can also form a monochromatic or multicolor image by using only a desired single or some (but not all) image forming portions.

<Process Cartridge>

Figure 5:
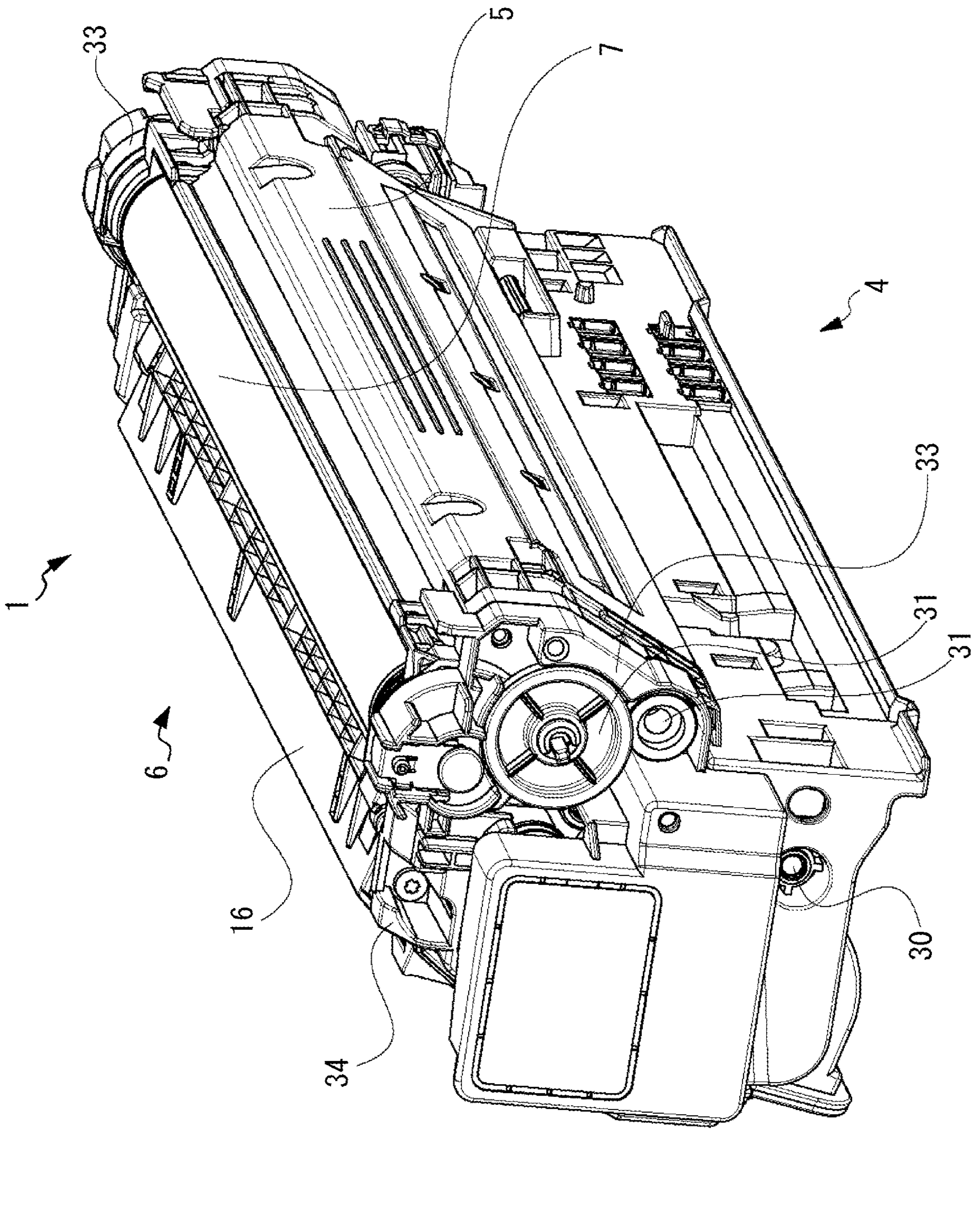
FIG. 5 is an overall perspective view of the process cartridge as viewed from a front side.

Next, referring to FIGS. 4, 5 and 6, the overall structure of the process cartridge 1 mountable to the main assembly of the image forming apparatus 100 according to this embodiment will be described. FIG. 4 is a cross-sectional view of the process cartridge 1 according to this embodiment. FIG. 5 is a perspective view of the process cartridge 1 as viewed from the upstream side in the process cartridge mounting direction. FIG. 6 is a perspective view of the process cartridge 1 as viewed from the downstream side in the process cartridge mounting direction.

The process cartridge 1 comprises a cleaning unit 4 and a developing unit 6. The cleaning unit 4 and the developing unit 6 are swingably coupled around the rotation support pin 30.

The cleaning unit 4 has a cleaning frame 5 which supports various members in the cleaning unit 4. Further, in the cleaning unit 4, a waste toner screw 15 extending in a direction parallel to the rotation axis direction of the photosensitive drum 7 is provided, in addition to the photosensitive drum 7, the charging roller 8, and the cleaning blade 10. The cleaning frame 5 includes cleaning bearings 33 provided with a cleaning gear train 31 for rotatably supporting the photosensitive drum 7 and transmitting drive from the photosensitive drum to the waste toner screw 15, and is provided, at each of opposite longitudinal end portions of the cleaning unit 4.

The charging roller provided in the cleaning unit 4 is urged in the direction of arrow C by the charging roller pressing springs 36 arranged at each of the opposite end portions toward the photosensitive drum 7. The charging roller is provided so as to be driven by the photosensitive drum, and when the photosensitive drum 7 is rotationally driven in the direction of arrow A during image formation, the charging roller is driven in the direction of arrow D (codirectional with the rotational movement of the photosensitive drum 7).

The cleaning blade 10 provided in the cleaning unit 4 comprises an elastic member **10*a* for removing untransferred residual toner (waste toner) remaining on the surface of the photosensitive drum 1 after the primary transfer, and includes a support member 10*b* for supporting the elastic member 10*a*. The waste toner removed from the surface of the photosensitive drum 1 by the cleaning blade 10 is accommodated in the waste toner accommodation chamber 9 formed by the cleaning blade 10 and the cleaning frame 5. The waste toner stored in the waste toner accommodation chamber 9 is fed toward the rear of the image forming apparatus 100 (downstream in the mounting/dismounting direction of the process cartridge 1) by the waste toner feeding screw 15 provided in the waste toner accommodation chamber 9. The fed waste toner is discharged from the waste toner discharge portion 35, and is delivered to the waste toner feeding unit 23 provided in the main assembly of the image forming apparatus 100**.

The developing unit 6 has a developing frame 16 which supports various members in the developing unit 6. The developing frame 16 is divided into a developing chamber **16*a* in which a developing roller 11 and a supply roller 17 are provided therein, and a toner accommodation chamber 16*b* in which the toner is stored therein and a stirring member 29** is provided therein.

The developing chamber **16*a* is provided with the developing roller 11, the supply roller 17, and a developing blade 28. The developing roller 11 carries the toner, and when forming an image, it rotates in the direction of arrow E and feeds the toner to the photosensitive drum 1 by contacting the photosensitive drum 1. Further, the developing roller 11 is rotatably supported by the developing frame 16 by the development bearing unit 34 at the opposite end portions in the longitudinal direction (rotational axis direction). The supply roller 17 is rotatably supported by the developing frame 16 by the development bearing unit 34 while being in contact with the developing roller 11, and rotates in the direction of arrow F during image formation. Further, the developing blade 28 as a layer thickness regulating member which regulates the thickness of the toner layer formed on the developing roller 11 is provided in contact with the surface of the developing roller 11**.

The toner accommodation chamber **16*b* is provided with the stirring member 29 for stirring the stored toner T and for transporting the toner to the supply roller 17 through the developing chamber communication opening 16***c*. The stirring member 29 includes a rotating shaft 29*a* extending in parallel to the rotation axis direction of the developing roller 11 and a stirring sheet 29*b* as a feeding member which is a flexible sheet. One end of the stirring sheet 29*b* is mounted to the rotating shaft 29*a*, and the other end of the stirring sheet 29*b* is a free end, and the rotating shaft 29*a* rotates to rotate the stirring sheet 29*b* in the direction of arrow G, by which the stirring sheet 29*b* stirs the toner.

The developing unit 6 is provided with the developing chamber communication opening 16*c* which communicates the developing chamber 16*a* and the toner accommodation chamber 16*b* with each other. In this embodiment, the developing chamber 16*a* is placed above the toner accommodation chamber 16*b* in the attitude in which the developing unit 6 is normally used (the attitude at the time of use). The toner in the toner accommodation chamber 16*b* dipped up by the stirring member 29 is supplied to the developing chamber 16*a* through the developing chamber communication opening 16*c*.

Further, the developing unit 6 is provided with a receiving opening 40 at one end which is downstream in the inserting direction of the cartridge 1. A receiving seal member 45 and a receiving opening shutter 41 which is movable in the front-rear direction are provided above the toner receiving opening 40. The toner receiving opening 40 is closed by the receiving opening shutter 41 when the process cartridge 1 is not mounted on the main assembly of the image forming apparatus 100. The receiving shutter 41 is structured to be urged and opened by the main assembly of the image forming apparatus 100 in interrelation with the mounting/dismounting operation of the process cartridge 1.

A receiving feed path 42 is provided in communicate with the toner receiving opening 40, and a receiving feed screw 43 is provided therein. Further, an accommodation chamber communication opening 44 for supplying the toner into the toner accommodation chamber 16*b* is provided in the neighborhood of the longitudinally central portion of the developing unit 6 to communicate the receiving feed path 42 and the toner accommodation chamber 16*b* with each other. The receiving feed screw extends parallel to the rotation axis direction of the developing roller 11 and the supply roller 17, and feeds the toner received from the toner receiving opening 40 to the toner accommodation chamber 16*b* through the accommodation chamber communication opening 44.

In this embodiment, The process cartridge 1 has both a photosensitive drum 7 and a developing roller 11, but the structure is not necessarily limited to this. For example, the cleaning unit 4 including the photosensitive drum 7 and the developing unit including the developing roller 11 may not be connected, and they may be separate cartridges. In such a case, the cartridge including the cleaning unit 4 may be called a drum cartridge, and the cartridge including the developing unit 6 may be called a developing cartridge. In such a case, the toner is supplied from the cartridge 13 to the developing cartridge of the developing unit 6.

<Developer Supply Cartridge (Toner Cartridge)>

Next, referring to FIGS. 1, 7, 8 and 9, the overall structure of the cartridge 13 functioning as the developer supplying container mounted on the image forming apparatus 100 according to the present embodiment will be described.

Figure 1:
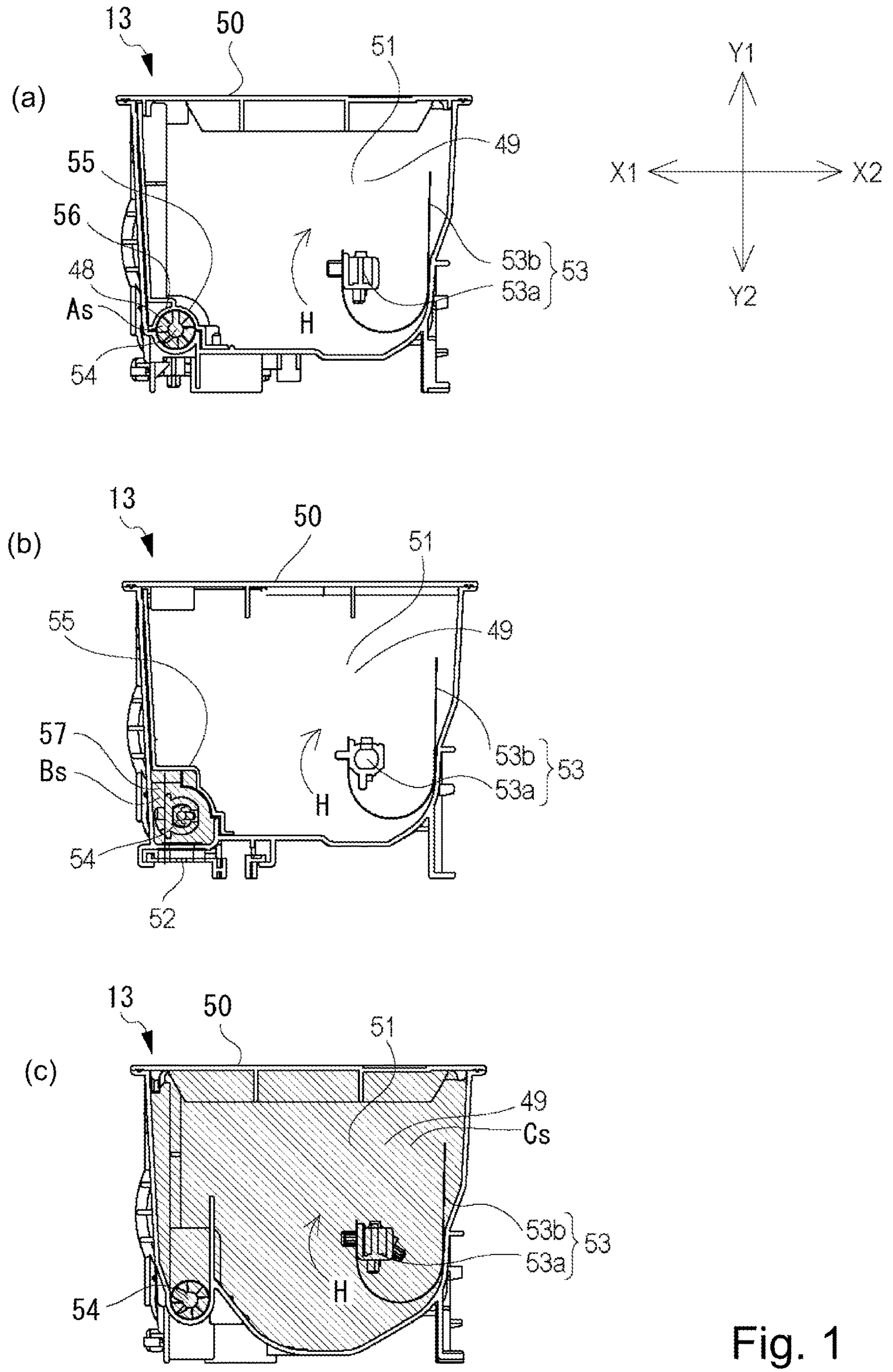
FIG. 1 is a schematic cross-sectional view of a developer supplying container.
Figure 7:
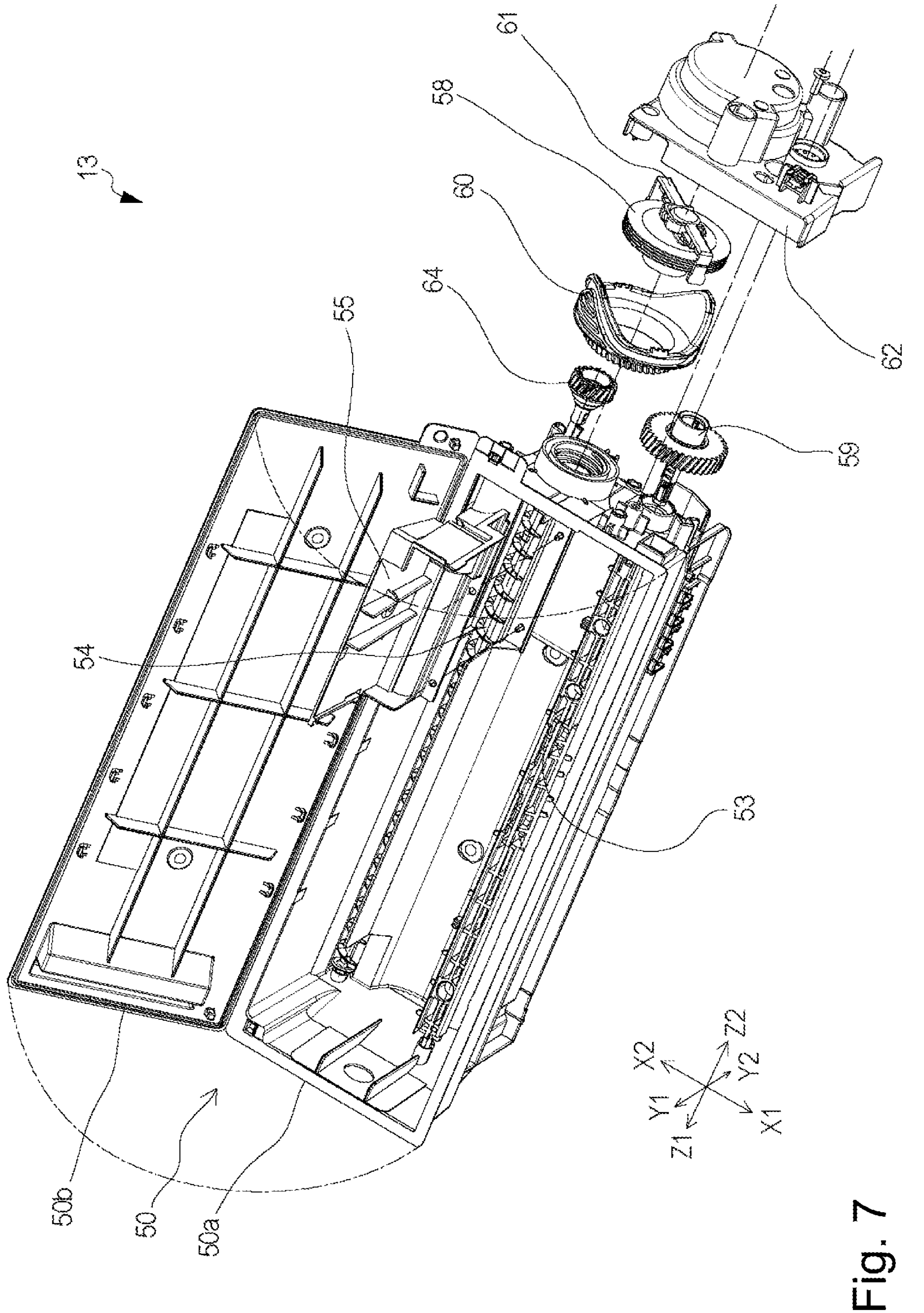
FIG. 7 is an exploded perspective view of the developer supplying container.
Figure 8:
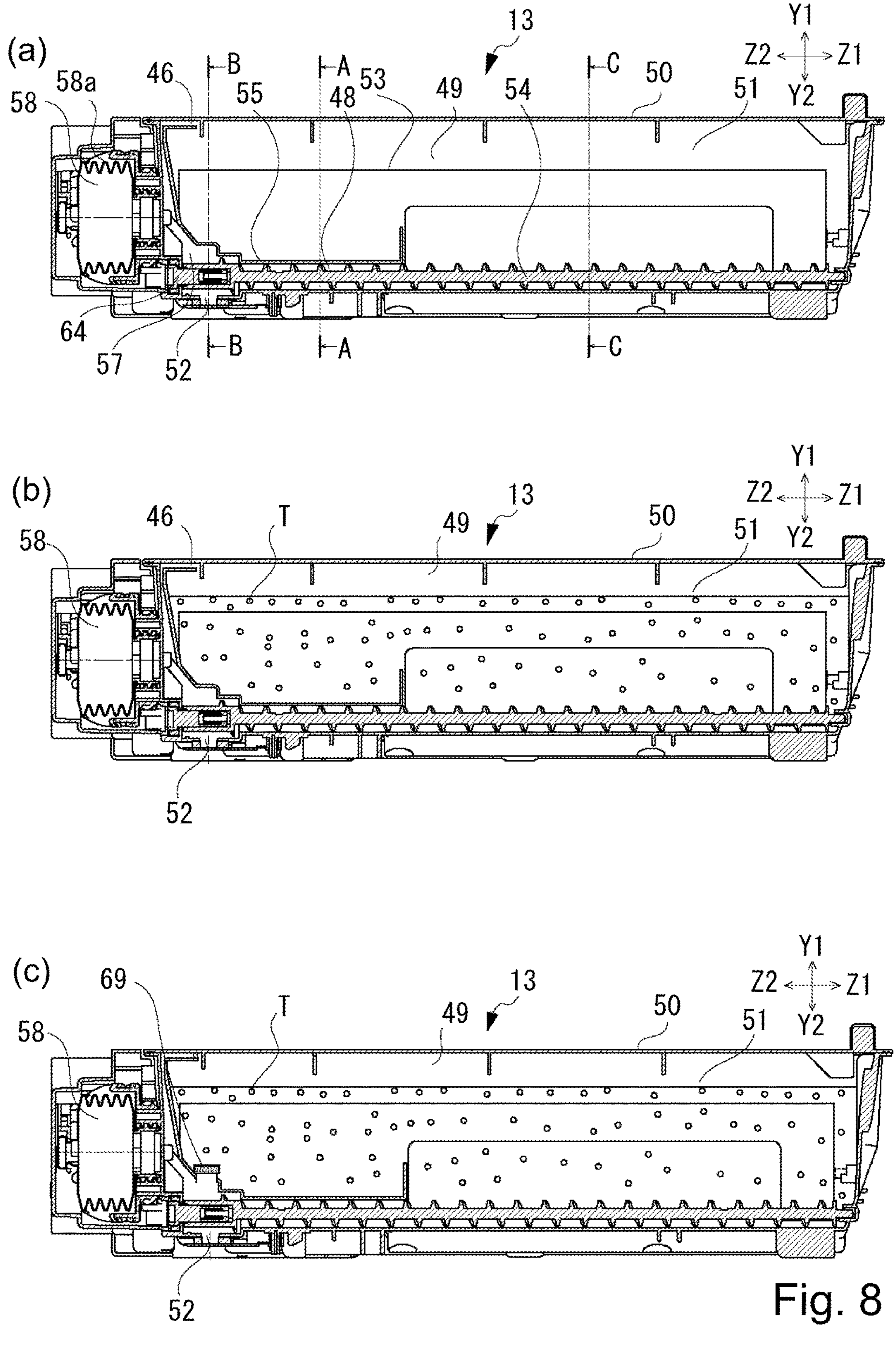
FIG. 8 is a sectional view of the developer supplying container.
Figure 9:
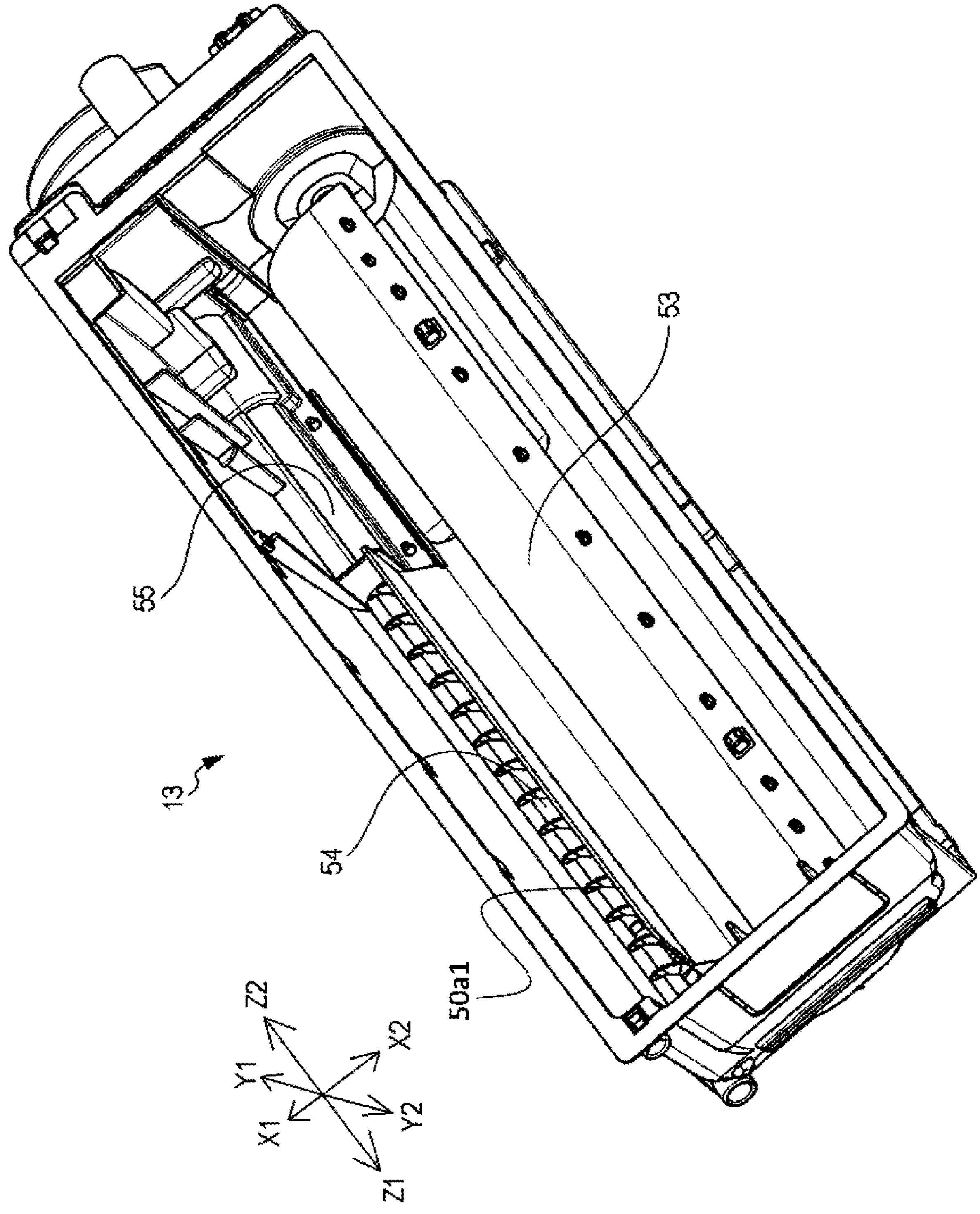
FIG. 9 is an exploded perspective view of the developer supplying container.

FIG. 1 is a cross-sectional view of the toner accommodation chamber 49, the communication passage 48, and the toner discharge chamber 57 of the cartridges (13Y, 13M, 13C) according to the present embodiment as viewed in the longitudinal direction. FIG. 7 is an exploded perspective view of the cartridges (13Y, 13M, 13C) according to this embodiment. FIG. 8 is a sectional view of the neighborhood of the supply toner feeding screw 54 of the cartridge (13Y, 13M, 13C) according to this embodiment as viewed along the lateral direction. That is, FIG. 7 is a sectional view parallel to the YZ plane. FIG. 9 is an exploded perspective view illustrating an internal space of the cartridges (13Y, 13M, 13C) which contains the toner, according to this embodiment.

The cartridge 13 accommodates the toner (developer) in an internal space 51 thereof, and is mounted to the main assembly of the image forming apparatus 100 in order to supply (supplement) the toner to the main assembly of the image forming apparatus 100.

In the explanation of the carriage 13, unless otherwise specified, the cartridge 13 takes a normal attitude, that is, an attitude when the cartridge 13 is mounted inside the main assembly of the apparatus, and the directions (X1, X2, Y1, Y2, Z1, Z2) are defined as follows.

The vertical direction is indicated by a Y axis. The arrow Y1 indicates an upward direction, and the arrow Y2 indicates a downward direction. The surface of the cartridge 13 provided at the end in the Y1 direction is referred to as a top surface (upper surface), and the surface thereof at the end in the Y2 direction is referred to as a bottom surface (bottom, lower portion, lower end). The top surface of the cartridge 13 faces upward (Y1 direction), and the bottom surface faces downward (Y2 direction). The Y1 direction and the Y2 direction may be collectively referred to as the vertical direction, the height direction, the vertical direction, the gravity direction, or the Y direction and the Y axis direction.

The front-rear direction is indicated by the Z-axis. As the cartridge 13 is mounted to the main assembly of the image forming apparatus 100, the direction toward the upstream is indicated by the arrow Z1 in the mounting direction, and the direction toward the downstream side of the mounting direction is referred to as Z2 direction. For convenience of explanation, the Z1 direction is the front and the Z2 direction is the back. That is, the surface provided at the end of the cartridge 13 in the Z1 direction is referred to as the front surface (front portion, front end) of the cartridge 13, and the surface provided at the end in the Z2 direction is referred to as the rear surface (back surface, rear end, rear portion).

The front surface of the cartridge 13 faces the front (Z1 direction), and the rear surface faces the rear (Z2 direction). The cartridge 13 has a longitudinal direction that extends from the front side to the rear side (extension in the Z-axis direction). The Z1 direction and the Z2 direction may be collectively referred to as the front-rear direction, the longitudinal direction, the vertical direction, the Z direction, or the Z-axis direction.

Further, the left-right direction is indicated by the X-axis. For convenience of explanation, the direction to the left when viewed along the mounting direction (that is, the Z2 direction) when the cartridge 13 is mounted to the main assembly of the image forming apparatus 100 is indicated by an arrow X1, and the direction to the right is indicated by an arrow X2. The surface provided at the end of the cartridge 13 in the X1 direction is referred to as a left side surface (left surface, left end, left end), and the surface provided at the end in the X2 direction is referred to as a right side surface (right surface, right portion, right end). The left side surface of the cartridge 13 faces the left direction (X1 direction), and the right side surface faces the right direction (X2 direction). The direction from the left side surface to the right side surface (that is, the extension in the X-axis) of the cartridges 13 is referred to as a widthwise direction. The X1 direction and the X2 direction are collectively referred to as a left-right direction, a horizontal direction, a widthwise direction, a lateral direction, an X direction, an X-axis direction, or the like.

Thus, a distance between the front surface and the rear surface of the cartridge 13 is longer than a distance between the right side surface and the left side surface, and is longer than a distance between the upper surface and the bottom surface. Further, the distance between the right side surface and the left side surface is shorter than the distance between the upper surface and the bottom surface. However, it is not limited to such a structure. For example, the distance between the right side surface and the left side surface of the cartridge 13 may be made the longest, or the distance between the top surface and the bottom surface may be made the longest. The distance between the top surface and the bottom surface may be made the shortest.

The X-axis, Y-axis, and Z-axis are perpendicular to each other. For example, the X-axis is perpendicular to the Y-axis and also perpendicular to the Z-axis. Further, a plane perpendicular to the X-axis may be referred to as a YZ plane, a plane perpendicular to the Y-axis may be referred to as a ZX plane, and a plane perpendicular to the Z-axis may be referred to as an XY plane. For example, the ZX plane is a horizontal plane.

In the description of this embodiment, the first to third cartridges (13Y, 13M, 13C) containing the toners of yellow (Y), magenta (M) and cyan (C) colors other than black are taken as an example.

The fourth cartridge (13K) containing the black (K) toner has a larger toner capacity than the first to third cartridges (13Y, 13M, 13C), and in the other respects, it is substantially the same as the other cartridges other than that. Therefore, the description of the fourth cartridge 13K will be omitted.

The developer supplied to the main assembly of the image forming apparatus 100 from the cartridge 13 is supplied to the process cartridge 1 by the toner feeding device 14 as described above. That is, the cartridge 13 contains the toner to be supplied (replenished) into the process cartridge 1.

As shown in FIG. 7, it comprises a supply frame (casing, frame) 50 of the cartridges (13Y, 13M, 13C) of this embodiment. The supply frame 50 includes a container portion 50*a* and a lid portion 50*b*, and is provided by mounting the lid portion 50*b* to the container portion 50*a*. Further, the container portion 50*a* and the lid portion 50*b* form an internal space 51 inside the supply frame 50. The lid portion 50*b* is located at the end of the cartridge in the direction Y1 and provides the top surface of the cartridge 13 (the top surface of the supply frame 50).

The supply frame 50 includes a partition member (partition) 55 placed in the internal space 51 thereof. The partition member 55 further divides the internal space 51 into a plurality of regions. That is, as shown in FIGS. 1, 7 and 9, the internal space 51 is divided into a plurality of chambers such as a toner accommodation chamber 49, a communication passage 48, and a toner discharge chamber 57 by a partition member 55. The partition member (partition) 55 can be regarded as a part of the supply frame 50, or the partition member 55 can be actually formed integrally with the supply frame 50.

Further, in the neighborhood of the end portions (rear end, rear surface) on the downstream side, in the Z2 direction, of the supply frame 50, a drive train including a drive input gear 59, a cam gear 60, and a screw gear 64, a pump 58, and the like are mounted. A side cover 62 is mounted from the outside to cover the gear train, the pump 58, and the like. In particular, the cam gear 60 is restricted from moving in the Z1 direction and the Z2 direction by the side cover 62 and the supply frame 50.

As shown in FIG. 9, the cartridge 13 has an internal space 51 containing the toner therein, and the internal space 51 is divided into the toner accommodation chamber 49, the communication passage 48, and the toner discharging chamber 57 described above by the partition member 55.

The stirring member 53 and the screw 54 are extended from the upstream side (that is, the downstream side in the Z1 direction) of the cartridge 13 in the mounting direction to the downstream side (that is, the downstream side in the Z2 direction) of the mounting direction.

The screw 54 is partially covered with a partition member 55, at a part which is extend from the upstream side in the mounting direction (the downstream side in the Z1 direction) to the downstream side in the mounting direction (the downstream side in the Z2 direction). By covering the screw 54 with the partition member 55, a tunnel-like space is formed inside the partition member 55, and it serves as a communication passage (communication port) 48.

Each chamber formed in the internal space 51 of the supply frame 50 will be described in detail in the following.

(Toner Accommodation Chamber)

The toner accommodating chamber (developer accommodating chamber) 49 has a space for accommodating the toner (developer). A supply stirring member 53 (hereinafter, simply referred to as a stirring member 53) is provided in the toner accommodation chamber 49.

The stirring member 53 is arranged parallel to the longitudinal direction of the cartridge 13 and is rotatably supported by the supply frame 50. Further, the stirring member 53 includes a rotating shaft 53*a* and a supplying stirring sheet 53*b* as a feed member which is a flexible sheet. The stirring member 53 is a movable member which is movable relative to the supply frame 50.

One end of the supply stirring sheet 53*b* is mounted on the rotating shaft 53*a*, and the other end of the supply stirring sheet 53*b* is a free end. By the rotating shaft 53*a* rotating to rotate the supply stirring sheet 53*b* in the direction of the arrow H, the toner is stirred by the supply stirring sheet 53*b*, and the toner is fed to the toner feed screw (hereinafter, simply referred to as a screw) 54.

The screw 54 is a feed member which feeds the toner along the rotation axis thereof to the communication passage 49 and the toner discharge chamber 57, which will be described hereinafter. The rotation axis of the screw 54 and the rotation axis of the stirring member 53 are substantially parallel with each other.

Inside the toner accommodation chamber 49, there is provided a wall 50*a*1 between the screw 54 and the stirring member 53. The wall 50*a*1 is a wall-shaped or plate-shaped projection (rib) projecting upwardly from the floor surface of the toner accommodation chamber 49. The walls 50*b* are juxtaposed in parallel adjacent to the feed screw 54 and extend along the axial direction of the feed screw 54, that is, the toner feeding direction. By being sandwiched between the wall 50*a*1 and the side surface of the toner accommodation chamber 49, the screw 54 can stably feed the toner around itself. On the downstream side of the toner accommodation chamber 49 in the toner feed direction, the wall 50*a*1 is not provided between the screw 54 and the stirring member 53. This is in order that in the portion on the downstream side of the screw 54, the amount of the toner received from the stirring member 53 is increased. The upper portion of the screw 54 is also open, and therefore, some toner moves from the stirring member 53 to the screw 54 beyond the upper portion of the wall 50*a*1.

(Communication Passage)

The communication passage (toner passage, tunnel) 48 is a space and an opening which communicate the toner accommodation chamber 49 and the toner discharge chamber 57 with each other, which will be described hereinafter, and is a passage through which the toner moves. The communication passage 48 is constituted by a partition member 55 and a supply frame 50. At least a part of the screw 54 as a feed member is placed in the communication passage 48.

The screw 54 is a movable member which is movable relative to the supply frame 50, and more specifically, it is rotatably supported by the supply frame 50. A part of the screw 54 is exposed to the toner accommodation chamber 49, and the rotation feeds the toner in the toner accommodation chamber 49 along the rotation axis direction of the screw 54.

As described above, the communication passage 48 is constituted by the partition member 55 and the supply frame 50, extends along the toner feeding direction by the screw 54, and has a tunnel shape. Further, the partition member 55 covers a part of the screw 54 so that the screw 54 is placed inside the communication passage 48. The tunnel shape of the communication passage 48 is formed corresponding to the outer shape of the screw 54. That is, the communication passage 48 has a function of cutting off the toner fed by the screw 54 and feeding the toner in a constant quantity.

A part of the toner fed by the screw 54 can enter the inside of the communication passage 48 and move to the toner discharge chamber 57, but the rest of the toner cannot enter the communication passage 48*sp* that it remains in the toner accommodation chamber 49. The amount of the toner entering the inside of the communication passage 48 can be appropriately determined by appropriately setting the ratio between the size of the opening of the tunnel formed by the communication passage 48 and the size of the screw 54. That is, by passing the screw 54 through the inside of the communication passage 48, only a desired amount of the toner can be supplied to the toner discharge chamber 57.

The screw conveys the toner in the direction (Z2 direction) from the front surface (front end) to the rear surface (rear end) of the cartridge 13. That is, in this embodiment, the longitudinal direction of the screw 54, that is, the toner feed direction is the same as the longitudinal direction (Z direction, front-rear direction) of the cartridge 13. The structure of the cartridge 13 can be appropriately changed depending on the structure of the image forming apparatus 100.

(Toner Discharge Chamber)

The toner discharge chamber (developer discharge chamber) 57 is a space formed by the partition member 55 and the supply frame 50, and it is placed downstream of the communication passage 48 in the feed direction in which the screw 54 feeds the toner.

In the neighborhood of the toner discharge chamber 57, that is, in the neighborhood of the rear surface (end in the Z2 direction) of the supply frame 50, the screw gear 64 for receiving a rotational force for rotating the screw 54 is provided. Further, the toner discharge chamber 57 is provided with a discharge opening 52 for discharging the toner (developer) from the internal space 51 of the supply frame 50 to the outside. The discharge opening 52 is an opening to permit the toner to be discharged by communicating the inside and outside of the supply frame 50.

The discharge opening 52 is formed on the bottom side of the cartridge 13 (that is, the bottom surface of the supply frame 50) and is directed to the bottom of the cartridge. That is, the toner is discharged downwardly from the discharge opening 52. The discharge opening 52 is placed on the downstream side of the cartridge 13 in the feed direction of the screw 54. That is, the distance between the discharge opening 52 and the rear surface of the cartridge 13 (the downstream end in the Z2 direction) is shorter than the distance between the discharge opening 52 and the front surface (downstream end in the Z1 direction) of the cartridge 13.

Further, the pump 58 is provided adjacent to the rear surface (downstream end portion in the arrow Z2 direction) of the cartridge 13. The pump 58 includes a bellows portion 58*a* which can be expanded and contracted, that is, which is reciprocable. The bellows portion 58*a* has a flexibility and can be deformed by expanding and contracting (reciprocation). The bellows portion 58*a* is a region having a volume variable by expanding and contracting and deforming. The inside of the pump 58 and the inside of the toner discharge chamber 57 communicate with each other through a communication opening provided in the toner discharge chamber 57.

In the pump 58, the bellows portion (movable portion, variable portion) 58*a* is reciprocated, that is, is expanded and contracted by the drive train and the drive conversion portion (drive conversion mechanism, pump drive mechanism) 68 which will be described hereinafter, so that the internal volume of the bellows portion (movable portion) 58*a* can be changed. Thus, the pump 58 can act on the toner discharge chamber 57.

As the pump 58 expands and contracts, the internal pressure (internal air pressure) of the toner discharge chamber 57 changes periodically, and a difference is produced between the external air pressure of the cartridge 13 and the internal air pressure of the toner discharge chamber 57. The discharge opening 52 effects suction and discharge by this pressure difference, and by using the flow of air (gas) at this time for stirring and discharging the toner, the toner can be discharged stably.

When the pump 58 expands and its volume increases, the air pressure inside the pump 58 and the toner discharge chamber 57 decreases, so that the air enters the inside of the toner discharge chamber 57 through the discharge opening 52. The inward flow of air loosens the toner in the toner discharge chamber 57, and the fluidity of the toner can be increased. Thereafter, when the pump 58 contracts and the volume thereof decreases, the air pressure inside the pump 58 and the toner discharge chamber 57 increases, so that the toner is discharged through the discharge opening 52 from the inside of the toner discharge chamber 57 to the outside together with the air. By repeating this process, the toner is intermittently and periodically discharged from the inside of the cartridge 13 to the outside thereof through the discharge opening 52.

With the structure in which the toner is fed together with the air, it is easy to feed the toner in a narrow passage or to carry the toner discharged from the toner discharge opening 52 on the air flow and move it to a distant position. This is suitable for increasing the feed efficiency of the toner discharged from the toner cartridge 13. Further, the toner can be discharged even if the toner discharge opening 52 is made small, and therefore, it is possible to constrain the toner from being unintentionally scattered from the toner discharge opening 52 to the outside of the cartridge 13.

In this embodiment, the toner can be stirred by driving the pump 58 to periodically change the air pressure inside the toner discharge chamber 57. Particularly, in this embodiment, since suction and exhaust are performed through the discharge opening 52, the moving direction of the air passing through the discharge opening 52, that is, the direction of the air flow is periodically changed by the drive of the pump 58. Therefore, it is easy to stir the toner in the neighborhood of the discharge opening 52, which is suitable for increasing the fluidity of the toner and efficiently feeding the toner.

Although it is possible to dispose the pump 58 away from the toner discharge chamber 57, the pump 58 directly connected to the toner discharge chamber 57 as in this embodiment, is preferable because the pump 58 can act directly on the toner discharge chamber 57.

When the pump 58 is driven, the smaller the pressure difference between the toner accommodation chamber 49 and the toner discharging chamber 57, the more stable the toner can be discharged. Therefore, in the normally used attitude (attitude during use), the communication opening (vent passage) 46 for venting the toner discharge chamber 57 and the toner accommodation chamber is placed above the discharge opening 52 and the pump 58.

That is, when the pump 58 is driven, the pump 58 expands and contracts, so that the air pressure (internal pressure) inside the toner discharge chamber 57 periodically decreases and increases. Further, by the toner moving from the toner accommodation chamber 49 toward the toner discharging chamber 57, the air pressure (internal pressure) inside the toner accommodation chamber 49 decreases. If a large pressure difference is produced between the toner accommodation chamber 49 and the toner discharge chamber 57 as a result of these changes in air pressure, the amount of the toner passing through the communication passage 48 may vary, or the toner may flow back through the communication passage 48, with the result that the amount of the toner supplied to the toner discharge chamber 57 may change. If this occurs, the amount of the toner discharged from the discharge opening 52 may become unstable.

Therefore, in this embodiment, by disposing the vent 46 at a position different from the communication passage 48, the toner accommodation chamber 49 and the toner discharge chamber are communicated with each other, and the air flow between the toner accommodation chamber 49 and the toner discharge chamber 57 is assured. By this, it is possible to prevent a high pressure difference between the toner accommodation chamber 49 and the toner discharging chamber 57.

That is, the provision of the vent 46 are effective to establish (i) the internal pressure of the toner discharge chamber 57 is increased and decreased by the pump 58 to stably discharge the developer from the discharge opening 52, and (ii) the pressure difference between the toner accommodation chamber 49 and the toner discharge chamber 57 is prevented from increasing.

The vent 46 may be structured so as to permit the toner as well as the air to pass therethrough. However, in such a case, it is desirable that the amount of the toner which enters and exits the toner discharge chamber through the vent 46 is sufficiently smaller than the amount of the toner which passes through the communication passage 48 and which is supplied to the toner discharge chamber 57. By doing so, even if some toner passes through the vent 46, the amount of the toner inside the toner discharge chamber 57 does not vary significantly. For this reason, the influence on the amount of the toner discharged from the discharge opening 52 can be suppressed or eliminated.

In view of this, it is desirable to dispose the vent 46 at a position where the toner does not easily pass through, that is, at a position where the toner does not present therearound. For example, it is conceivable to provide the vent 46 at a position as high as possible inside the toner discharge chamber 57 or the toner accommodation chamber. By doing so, the amount of the toner passing through the vent 46 can be reduced. Further, it is possible to prevent the vent from being clogged by the toner. That is, the movement of air through the vent 46 is not hindered by the toner.

From this point of view, inside the toner accommodation chamber 49, the lower end of the vent 46 is located above the upper end of the communication passage 48 and above the screw 54. This is because the amount of the toner passing through the vent 46 is made smaller as compared with the amount of the toner passing through the inside of the communication passage 48 by the screw 54. Furthermore, in the state that the toner is stored in the toner accommodation chamber 49, the lower end of the vent 46 inside the toner accommodation chamber 49 is positioned higher than the upper level of the toner (see part (b) of FIG. 7. Conversely, the amount of the toner stored in the toner accommodation chamber 49 is limited so that the upper level of the toner is lower than the lower end of the vent 46. By doing so, the toner inside the toner accommodation chamber 49 does not easily reach the vent 46.

Here, the upper love of the toner in the toner accommodation chamber 49 is the upper level of the toner before the user starts to use the cartridge 13, that is, in a state where the toner contained in the cartridge 13 is not yet used. When determining the height of the upper level of the toner, the cartridge 13 is in the normal attitude. In this embodiment, it is the attitude in which the discharge opening 52 is directed downward, that is, it is the attitude in which the side on which the discharge opening 52 is provided is a bottom side. Then, the upper level of the toner is made parallel to the horizontal plane so that the toner is uniformly contained inside the toner accommodation chamber 49. Subsequently, after waiting a certain period of time until the state of the toner stabilizes, the height of the upper level of the toner is checked (see part (b) of FIG. 8).

By disposing the vent 46 inside the toner accommodation chamber 49 and setting the toner accommodating amount appropriately in this manner, it is possible to constrain the toner from moving from the toner accommodation chamber 49 to the toner discharging chamber 57 through the vent 46. In addition, it is accomplished to constrain the vent 46 from being clogged by the toner in the toner accommodation chamber 49.

Further, in the state that the toner is not used yet (that is, the toner cartridge 13 is unused and fresh), the upper level of the toner inside the toner accommodation chamber 49 is above the upper end of the pump 58. That is, in this embodiment, the upper level of the toner is placed at a position higher than the pump 58 in order to accommodate a sufficient amount of the toner in the toner accommodation chamber 49, and the vent 46 is placed further above the upper level of the toner. Both securing the toner amount capacity and assuring the function of the vent 46 are accomplished.

Of the parts and members which are compared in the vertical relationship (height) in the foregoing, the communication opening 46, the communication passage 48, and the toner discharge chamber are provided straddling the toner accommodation chamber 49 and the toner discharge chamber 57, and they have certain widths in the Z-axis direction. Therefore, if the communication opening 46, the screw 54, and the communication passage 48 are slanted at an angle relative to the Z axis or the horizontal plane, the heights of the members on the toner accommodation chamber 49 side and on the toner discharging chamber 57 side may differ from each other. When the vertical relationship between the communication opening 46, the screw 54, and the communication passage 48 is mentioned in the foregoing, these heights inside the toner accommodation chamber 49 are compared. That is, in the above description, the heights of the respective members on the toner accommodation chamber 49 side are compared.

However, in this embodiment, the communication opening 46, the communication passage 48, and the screw 54 are all arranged parallel to the Z axis, that is, horizontally, and the height of each member is constant regardless of the position. Therefore, in this embodiment, the above-mentioned height relationship is established regardless of whether it is inside the toner accommodation chamber 49 or in the toner discharge chamber 57. That is, the above-mentioned vertical relationship regarding the communication opening 46, the screw 54, and the communication passage 48 is established regardless of the coordinates of the Z axis.

Similarly, not only the lower end of the vent 46 in the toner accommodation chamber 49, but also the lower end of the vent 46 inside the toner accommodation chamber 57 is placed above the upper end of the pump 58. The vent 46 is placed also at a high position inside the toner discharge chamber 57 in order to prevent the toner from returning from the toner discharge chamber 57 to the toner accommodation chamber 49 through the vent 46.

As another method of suppressing the amount of the toner passing through the vent 46, there is a method of covering the vent 46 with a filter. As such an example, part (c) of FIG. 8 shows the structure of the cartridge 13 as a modified example in which the vent 69 including a filter is provided instead of the vent 46.

The filter 69*a* provided in the communication opening 69 is a member which suppresses the passage of the toner while permitting passage of air. In part (c) of FIG. 8, the filter 69*a* (hatched portion) is emphasized for explanation.

When the vent 69 including the filter 69*a* is used in this manner, the passage of the toner can be suppressed, even if the toner exists around the vent 69. Particularly, the filter is effective when the vent is provided below the upper level of the toner. Of course, the vent 46 in part (b) of FIG. 8 may be provided with a filter in the same manner as with the vent 69.

Further, in part (b) of FIG. 8, the vent 46 is formed by utilizing the gap formed between the partition member 55 and the supply frame 50, but a vent may be provided by forming an opening in the partition member 55 is formed like the vent 69 shown in part (c) of FIG. 8.

Since the vent 46 and the communication passage 48 are both communication passages (communication openings and paths) which communicate the toner discharge chamber 57 and the toner accommodation chamber 49 with each other, one of them may be called a first communication passage (or the first communication opening and the first path), and the other may be called a second communication passage (or a second communication opening, a second path) or the like. However, the vent 46 is a communication passage for the purpose of passing air, and therefore, unlike the communication passage 48 which is a toner path, the vent opening 46 may have a structure in which the toner cannot pass, as described above.

Next, the description will be made as to the relationship between the sizes of the toner accommodation chamber 49, the communication passage 48, and the toner discharge chamber 57. Area As is the area of the cross-section of the communication passage 48 on a cutting plane A-A in part (a) of FIG. 8. The area of the region shown by hatching in part (a) of FIG. 1 is As.

Further, an area of the cross-section of the toner discharge chamber 57 on a cutting plane B-B of part (a) of FIG. 8 on the downstream side (downstream side in the Z2 direction) of the communication passage 48 is Bs. The area of the region shown by hatching in part (b) of FIG. 1 is Bs.

Further, the area of the cross-section of the toner accommodation chamber 49 on a plane C-C in part (a) of FIG. 8 on the upstream side (downstream side in the Z1 direction) of the communication passage 48 is Cs. The area of the region shown by hatching in part (a) of FIG. 1 is Cs.

The three cross-sections taken along the A-A line, the B-B line and the C-C line are all cross sections taken by the planes perpendicular to the Z axis. In other words, they are cross-sections taken along the planes perpendicular to the toner feed direction by the screw 54, perpendicular to the longitudinal direction of the cartridge 13, and parallel to the XY plane.

At this time, the areas of the cross-sections of the communication passage 48, the toner discharge chamber 57, and the toner accommodation chamber 49 satisfy the following relationship $$As<Bs, \text{ and}$$

$$As<Cs.$$

That is, the cross-section of the communication passage 48 is smaller than the cross-section of the toner discharge chamber 57 and the cross-section of the toner accommodation chamber 49.

The area Bs of the cross-section of the toner discharge chamber 57 and the area Cs of the cross-section of the toner accommodation chamber 49 are different along the Z-axis coordinates (depending on the position in the toner feed direction). Further, in this embodiment, the area As of the cross-section of the communication passage 48 is substantially constant regardless of the coordinates of the Z axis (position in the toner feed direction), but the area As of the cross-section of the communication passage 48 may be made different depending on the coordinates of the Z axis. Even in such a case, the cross-sections satisfying the above-described magnitude relationship can be found in the communication passage 48, the toner discharge chamber 57 and the toner accommodation chamber 49, respectively.

For example, suppose As is the area of the smallest cross-section of the communication passage 48. In this case, at least one cross-section having the area Cs larger than the area As is provided in the toner accommodation chamber 49, and at least one cross-section having the area Bs larger than the area As is provided in the toner discharge chamber 57.

It can be said as follows. When the area of the largest cross-section of the toner accommodation chamber 49 is Cs, and the area of the largest cross-section of the toner discharge chamber 57 is Bs, the communication passage 48 has at least one cross-section having an area As which is smaller than Cs and Bs.

By making the cross-sectional area Cs of the toner accommodation chamber 49 larger as compared with the cross-section As of the communication passage 48, a sufficient amount of the toner can be stored inside the toner accommodation chamber 49, and the toner can also be efficiently stirred by the stirring member 53 inside the toner accommodation chamber 49. The stirring member 53 stirs the toner to prevent the toner from aggregating. That is, the stirring member 53 can increase the fluidity by loosening the toner.

On the other hand, the toner can be metered by passing the toner through the communication passage 48 having a small cross-section. That is, in order to limit the amount of the toner which moves from the toner accommodation chamber 49 to the toner discharge chamber 57, the cross-sectional area As of the communication passage 48 is made smaller than the cross-sectional area Cs of the toner accommodation chamber 49. By this, when the screw travels through the communication passage 48, the amount of the toner fed can be reduced and controlled to a desired level (constant level).

Further, since the toner discharge chamber 57 has a cross-section larger than the cross portion of the communication passage 48, the toner can be loosened inside the toner discharge chamber 57. That is, the toner discharge chamber 57 needs to increase the fluidity of the toner inside the toner discharge chamber 57 when the air is sucked through the discharge opening 52. Therefore, the toner discharge chamber 57 needs a certain volume to mix the air and the toner when the air flows thereinto through the discharge opening 52. In order to assure the volume, the cross-sectional area Bs of the toner discharge chamber 57 is made larger than the cross-sectional area As of the communication passage 48.

As shown in part (a) of FIG. 8, the B-B cross-section of the toner discharge chamber 57 described above is a cross-section take along a plane which passes through the toner discharge opening 52, but when determining the area Bs of the cross-section of the toner discharge chamber 57 it is not necessary to use a cross-section that passes through the toner discharge opening 52. That is, it is preferable that there is at least one cross-section having an area Bs satisfying "As<Bs" inside the toner discharge chamber 57.

However, if the cross-section of the toner discharge chamber 57 at the position of the discharge opening 52, that is, the cross-section of the toner discharge chamber 57 taken along a plane passing through the discharge opening 52 satisfies "As<Bs", it is more suitable from the standpoint of increasing the fluidity around the discharge opening 52.

Further, in the case that the cross-sectional area As of the communication passage 48 is made smaller than the cross-sectional area Bs of the toner discharge chamber 57, it is possible to prevent the toner from flowing back through the communication passage 48. When the pump 58 contracts, the air pressure in the toner discharge chamber 57 increases, so that the toner and air are discharged through the discharge opening 52. At this time, some air and toner may tend to move to the toner accommodation chamber 49 through the communication passage 48. However, in this embodiment, the toner movement path is narrowed in the communication passage 48, and therefore, it is possible to constrain the toner and the air in the toner discharge chamber 57 from moving back to the toner accommodation chamber 49 through the communication passage 48. Further, in this embodiment, not only the area As of the communication passage 48 is reduced, but also the screw 54 is provided inside the communication passage 48, so that the screw 54 also functions to suppress the movement of the toner flowing back through the communication passage 48.

By the provision of the communication passage 48 in this manner, it is possible to suppress the movement of the toner and the air from the toner discharge chamber 57 to the toner accommodation chamber 49. The toner can be stably discharged to the outside of the toner cartridge 13 through the discharge opening 52 of the toner discharge chamber 57.

In this embodiment, the communication passage 48 has substantially the same cross-sectional area As in a certain range (substantially the entire area in this embodiment). When the communication passage 48 has a region having the same cross-sectional size over a certain range, it is easy to stabilize the amount of the toner passing through the communication passage 48. However, as described above, the size of the cross-section of the communication passage 48 may be changed depending on the position. If the toner flow path is narrowed anywhere between the toner discharge chamber 57 and the toner accommodation chamber 49, at least such a portion can be regarded as the communication passage 48.

If the cross-sectional area of the communication passage 48 differs depending on the position, the smallest cross-section As (Asmin) of the communication passage 48, the largest cross-section Bsmax of the toner discharge chamber 57, and the largest cross-section Csmax of the toner accommodation chamber 49 are compared. In this embodiment, "Asmin<Bsmax<Csmax" are satisfied. In order to increase the capacity of the toner stored in the toner accommodation chamber 49, it is preferable that the cross-section of the toner accommodation chamber 49 is larger than the cross-section of the communication passage 48 and than the cross-section of the toner discharge chamber 57.

Here, min in the subscript means the minimum value, and max means the maximum value.

Further, when the area Bs of the cross-section of the toner discharge chamber 57 is determined at the position of the discharge opening 52, "Asmin<Bs<Csmax" can be satisfied.

In the internal space 51 of the supply frame 50, a screw 54 and a stirring member 53 are provided as movable feed members relative to the development frame 50. Unless otherwise specified, when these feed members (53, 54) are provided in the communication passage 48, the toner accommodation chamber 49, and the toner discharge chamber 47, the areas As, Bs, and Cs include the cross-sectional area of the feed members (53, 54) as well. In other words, the cross-sectional areas of the spaces formed inside the communication passage 48, the toner accommodation chamber 49, and the toner discharge chamber 47 in the state that the screw 54 and the stirring member 53 is removed from the supply frame 50 are the areas As, Bs, and Cs. By this, the presence/absence and sizes of the screw 54 and the stirring member 53 do not affect the values of the areas As, Bs, and Cs.

However, in this embodiment, when the areas As, Bs, and Cs of the communication passage 48, the toner discharge chamber 47, and the toner accommodation chamber 49 are determined, even if the cross-sectional areas of the screw 54 and the cross-sectional area of the stirring member 53 are excluded, each of the above-mentioned area relationships is satisfied. That is, in the AA cross-section of part (a) of FIG. 1, an area of the part excluding the region of the screw 54 from the hatched region is redefined as As; in the BB cross-section of Figure (b) an area of the part excluding the region of the screw 54 from the hatched region is redefined as Bs; and an area of the part excluding the region of the screw 54 and the stirring member 53 from the hatched region in the CC cross-section of part (c) of FIG. 1 is redefined as Cs. Even if As, Bs, and Cs are redefined in this manner, a cross-section satisfying the above-mentioned relationship of As, Bs, and Cs exists in the communication passage 48, the toner discharge chamber 47, and the toner accommodation chamber 49.

In this embodiment, the volume of the communication passage 48 is the smallest, and the volume of the toner accommodation chamber 49 is the largest. The volume of the toner discharge chamber 57 is larger than the volume of the communication passage 48 and is smaller than the volume of the toner accommodation chamber 49. The amount of the toner stored in the cartridge 13 can be easily changed by changing the cross-sectional area Cs of the toner accommodation chamber 49 without changing the shapes of the communication passage 48 and the toner discharge chamber 57.

Referring to FIG. 28, the relationship of the internal space 51 will be described. FIG. 28 is a simplified view illustrating the internal space, wherein part (a) of FIG. 28 shows the toner accommodation chamber 49, the communication passage 48, and the toner discharge chamber 57 separately in a schematic manner, and part (b) of FIG. 28 shows that the internal space 51 is formed by combining them. As explained above, the relationship between the areas As, Bs, and Cs satisfies "As<Bs<Cs".

In FIG. 28, the shape of the space occupied by each of the toner accommodation chamber 49, the communication passage 48, and the toner discharge chamber 57 is simplified and shown as a combination of cubes. Therefore, the cross-section of each space is also simplified and illustrated so that the shape thereof is a quadrangle.

In this case, the cross-sectional area As is the product of the width Aw measured in the X direction of the communication passage 48 and the height Ah measured in the Y direction, that is, As=Aw×Ah. Similarly, Bs=Bw×Bh and Cs=Cw×Ch.

In FIG. 28, the cross-sectional area Cs is obtained at the position where the cross-sectional area of the toner accommodation chamber 49 is the largest. The maximum value Csmax of such a cross-sectional area Cs is larger than the cross-sectional area As of the communication passage 48 as described above.

Preferably, Csmax is greater than 5 times As. More preferably, Csmax is made larger than 10 times Asmax, so that the digits of Csmax is larger than that of Asmax.

In particular, in the large-capacity toner cartridge 13 as in this embodiment, it is further preferable to make Csmax larger than 25 times As. For example, the area Cs of the cross-section satisfying 5Aw<Cw and 5Ah<Aw satisfies such a relationship.

In summary, $$5\times As<Cs\text{max},$$

$$10\times As<Cs\text{max},$$

$$25\times As<Cs\text{max}$$

are satisfied.

In this embodiment, the cross-sectional area of the communication passage 48 is constant regardless of the position. The above relationship is satisfied regardless of the position where the area As of the cross-section of the communication passage 48 is measured.

However, if the size of the area of the communication passage 48 differ significantly depending on the position, the area Asmin of the cross-section of the smallest communication passage can be compared with the maximum value Csmax of Cs. Then, the relationships are $$5\times As\text{min}<Cs\text{max},$$

$$10\times As\text{min}<Cs\text{max},$$

$$25\times As\text{min}<Cs\text{max}.$$

The same applies to the case where the size of As differs depending on the position. If the area As of the cross-section of the communication passage 48 is constant regardless of the position, it can be considered that "As=Asin" is satisfied regardless of the position.

In this embodiment, in the yellow, cyan, and magenta toner cartridges, the maximum value Csmax of Cs is selected to exceed 60 times the area As of the communication passage, that is, $$60\times As<Cs\text{max},$$

$$60\times As\text{min}<Cs\text{max}.$$

In the black toner cartridge, the maximum value Csmax of Cs is selected to exceed 80 times the minimum value of the area As of the communication passage, that is, $$80\times As<Cs\text{max},$$

$$80\times As\text{min}<Cs\text{max}.$$

From the standpoint of maintaining the constantness of the amount of the toner passing through the communication passage 48 while increasing the volume of the toner accommodation chamber 49, it is preferable that, the area Cs is increased with respect to the area As, or conversely it is preferable that the area As is reduced with respect to the area Cs.

In this embodiment, Csmax is less than 100 times that of Asmin regardless of any of the yellow, cyan, magenta, and black cartridges 13. 100×As<Csmax, 100×Asmin<Csmax.

However, there is no particular upper limit for Cs in principle, and therefore, in order to secure the volume of the toner accommodation chamber, the maximum value of Cs may be larger than that of this embodiment so as to exceed 100 times that of As.

On the other hand, from the standpoint of securing the volume for mounting the cartridge 13 inside the main assembly of the image forming apparatus, it is usually preferable that the maximum value of Cs is smaller than 1000 times As. More generally, it is preferable that the maximum value of Cs is smaller than 500 times that of As, that is, $$1000\times As>Cs\text{max},$$

$$1000\times As\text{min}>Cs\text{max},$$

$$500\times As>Cs\text{max},$$

$$500\times As\text{min}>Cs\text{max}.$$

Further, in FIG. 28, the cross-sectional area Bs of the toner discharge chamber 57 is measured at the position where the toner discharge opening 52 (see part (a) of FIG. 8 and the like) is placed.

At this time, the cross-sectional area Bs can be calculated by Bs=Bw×Bh, and the relationships are $$Bs>As \text{ and}$$

$$Bs>As\text{min}.$$

In particular, it is preferable that the relationship is such that Bw>Aw or Bh>Ah, and the area Bs is larger than the area As.

In this embodiment, when the area Bs is obtained at the position of the toner discharge opening 52, the area Bs is selected to exceed 1. 5 times the area As of the cross-section of the communication passage, and more specifically, at the position of the exit 52, the area Bs is more than three times the area As, that is, $$1.5\times As<Bs,$$

$$1.5\times As\min<Bs,$$

$$3\times As<Bs, \text{ and}$$

$$3\times As\min<Bs$$

Further, regardless of any of the yellow, cyan, magenta, and black cartridges 13, the area Bs at the position of the toner discharge opening 52 is smaller than the area Csmax.

More specifically, the area Bs at the position of the toner discharge opening 52 is selected to be smaller than half of the area Csmax, and is actually smaller than one tenth of the area Csmax, that is, $$2\times Bs<Cs\max$$

$$10\times Bs<Cs\max.$$

Particularly, in the black cartridge, the area Bs at the position of the toner discharge opening 52 is smaller than 1/20 of the area Csmax, that is, $$20\times Bs<Cs\max.$$

If the position for obtaining the cross-sectional area of the toner discharge chamber is other than the position of the discharge opening 52, the value of Bs may change. In that case, the maximum value Csmax of Cs is larger than the maximum value Bsmax of Bs, that is, $$Bs\max<Cs\max.$$

This is to increase the volume of the toner accommodating chamber, thus increasing the toner capacity.

In this embodiment particularly, Bsmax is smaller than half of Csmax, that is, $$2\times Bs\max<Cs\max.$$

The ratio between As, Bs, and Cs described above may change beyond the above range. This is because these ratios vary depending on the position and performance of the pump 58, the amount of the toner stored in the cartridge, the volume that can be used in the image forming apparatus main assembly for mounting the toner cartridge 13, the arrangement of the internal space of the toner cartridge 13, and the like.

As shown in part (b) of FIG. 28, a part of the toner accommodation chamber 49 and the communication passage 48 are arranged side by side in the Y-axis direction, that is, in the up-down direction (vertical direction). The toner accommodation chamber 49 is placed on the downstream side in the Y1 direction, that is, above the communication passage 48. Therefore, when the communication passage 48 and the toner accommodation chamber 49 are projected along the Y-axis direction onto the projection plane (ZX plane) perpendicular to the Y-axis, the projection areas of the communication passage 48 and the toner accommodation chamber 49 at least partially overlap with each other.

Further, another part of the toner accommodation chamber 49 and the communication passage 48 are arranged side by side in the X-axis direction, that is, in the left-right direction. A part of the toner accommodation chamber 49 is placed on the downstream side in the X2 direction with respect to the communication passage 48, that is, on the right side. Therefore, when the communication passage 48 and the toner accommodation chamber 49 are projected along the X-axis direction onto the projection plane perpendicular to the X-axis, that is, onto the YZ plane, the projection areas of the communication passage 48 and the toner accommodation chamber 49 at least partially overlap with each other.

Further, another part of the toner accommodation chamber 49 and the communication passage 48 are arranged side by side in the Z-axis direction, that is, in the front-rear direction. A part of the toner accommodation chamber 49 is on downstream side in the Z1 direction, that is, in front of the communication passage 48. Therefore, when the communication passage 48 and the toner accommodation chamber 49 are projected along the Z-axis direction onto the projection plane perpendicular to the Z axis, that is, the XY plane, the projection areas of the communication passage 48 and the toner accommodation chamber 49 are at least partially overlapped with each other.

As described above, the toner accommodation chamber 49 is arranged so as to be juxtaposed with the communication passage 48 in the Y-axis direction, the X-axis direction, and the Z-axis direction perpendicular to each other. With such an arrangement and layout, the volume of the toner accommodation chamber 49 can be increased to increase the capacity of the toner cartridge.

Further, the communication passage 48 and the toner discharge chamber 57 are arranged along the Z-axis direction, that is, the front-rear direction. The toner discharge chamber 57 is placed on the downstream side in the Z2 direction, that is, on the rear side with respect to the communication passage 48. Therefore, when the communication passage 48 and the toner discharge chamber 57 are projected along the Z-axis direction onto the projection plane perpendicular to the Z axis, that is, the XY plane, the projection area of the communication passage 48 and the toner discharge chamber 57 overlap with each other.

Similarly, the toner discharge chamber 57 and the toner accommodation chamber 49 are arranged along the X-axis direction, that is, in the left-right direction. The toner accommodation chamber 49 is located on the downstream side in the X2 direction with respect to the toner discharge chamber 57, that is, on the right side. Therefore, when the toner discharge chamber 57 and the toner accommodation chamber 49 are projected along the X-axis direction onto the projection plane (YZ plane) perpendicular to the X-axis, the toner discharge chamber 57 and the toner accommodation chamber 49 at least partially overlap with each other. With such an arrangement relationship and layout, the volume of the toner accommodation chamber 49 can be increased.

By arranging spaces having particular functions (57, 49, 48) adjacent to each other so that such spaces overlap each other in the projection plane, efficient internal arrangement of space 51 without futile space can be provided. A toner cartridge 13 which stores toner quantitatively conveys it, and quantitatively discharges it can be accomplished while keeping the size of the internal space 51 constant.

In the image forming apparatus 100, the black toner tends to be consumed more than the toners of other colors, and therefore, in the fourth developer supplying container (13K), the cross-sectional area Cs of the black toner accommodation chamber 49 is made larger than the other cartridge (13Y, 13M, 13K). By this, the volume of the toner accommodation chamber 49 in the fourth developer supplying container (13K) is made larger than the volume of the toner accommodation chamber of the first to third developer supplying containers (13Y, 13M, 13C). A large amount of the toner is contained in the fourth developer supplying container (13K).

By appropriately changing the cross-sectional area Cs of each cartridge (13Y, 13M, 13C, 13K), the amount of the toner contained in each cartridge can be appropriately set without significantly changing the other parts of each cartridge.

Further, although the four toner cartridges 13 of this embodiment are used with the image forming apparatus 100 for forming a four-color image, one toner cartridge 13 can be used for a monochromatic image forming apparatus for forming a monochromatic image. Further, two of the toner cartridges 13 may be used for an image forming apparatus for forming an image of two colors. That is, there is no limit to the number of the toner cartridges which can be used simultaneously in one image forming apparatus 100.

In this embodiment, a part of the screw 54 exists substantially directly above the discharge opening 52 of the toner discharge chamber 57. That is, a part of the screw 54 is placed inside the toner accommodation chamber 49, another part is placed inside the communication passage 48, and a further part is placed inside the toner discharge chamber 57.

By this, the screw 54 can reliably feed the toner from the toner accommodation chamber 49 through the communication passage 48 toward the discharge opening 52 of the toner discharge chamber 57.

However, the structure of the developer feed member (screw 54) is not limited to this example. It is conceivable that the feed member is not provided in a part or parts of the toner accommodation chamber 49, the communication passage 48, and/or the toner discharge chamber 57. For example, inside a part, it is conceivable that the screw 54 is not formed with spiral blades and only the shaft of the screw having no toner transporting ability is provided.

(Expansion and Contraction, and Reciprocation of Pump)

Next, referring to FIGS. 10 and 11, 400 the expansion/contraction motion and the reciprocating motion of the pump 58 will be described.

Figure 10:
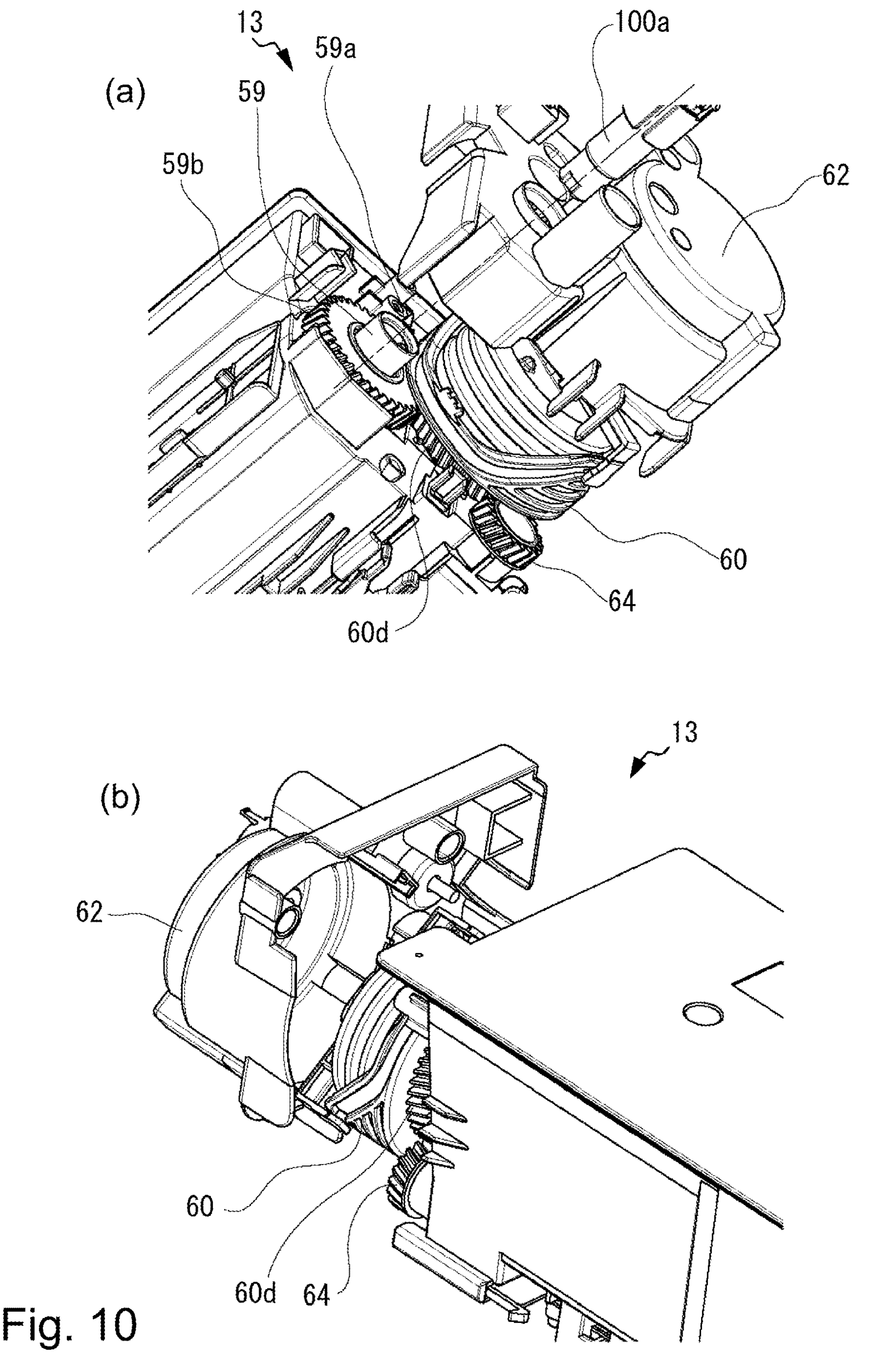
FIG. 10 is a partial perspective view of the developer supplying container.

FIG. 10 is a partial perspective view of the rear end portion of the cartridge 13 as viewed from below, in a state that the side cover 62 is shifted rearward to show the transmission path of the rotational drive.

Figure 11:
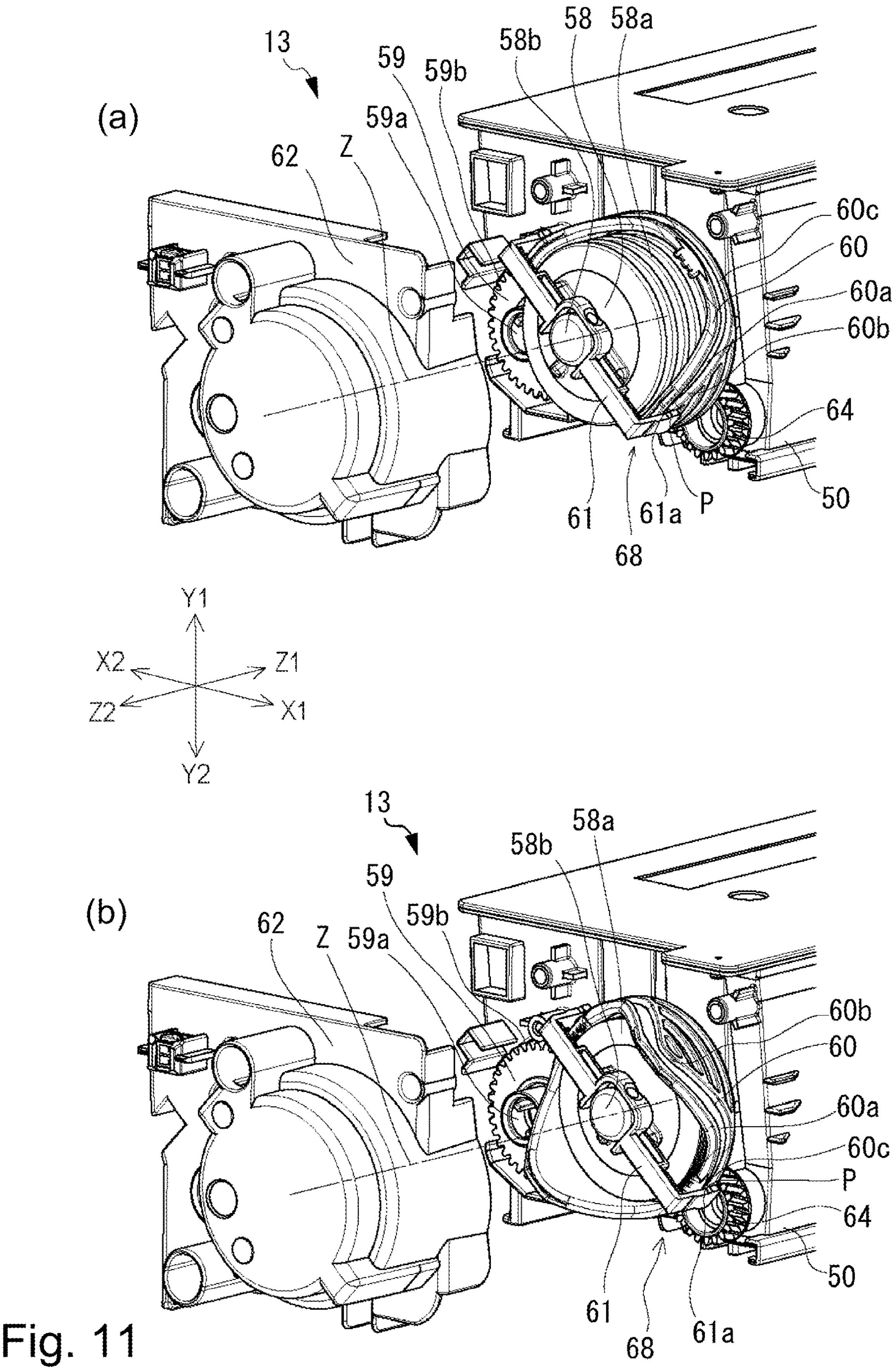
FIG. 11 is a partial perspective view of a rear end portion of the developer supplying container.

FIG. 11 is a partial perspective view of the rear end portion of the cartridge 13, in a state that the side cover 62 is shifted rearward in order to illustrate the expansion/contraction operation of the pump 58. Part (a) of FIG. 11 shows a state in which the pump 58 is expanded, and part (b) of FIG. 11 shows a state in which the pump 58 is contracted.

As shown in FIG. 11, a drive train is provided on the rear side of the cartridge 13, that is, in the neighborhood of the rear surface. The drive train of this embodiment includes a drive input gear (drive input member, coupling member) 59, a cam gear 60 as a rotating member, and a screw gear 64. The drive input gear 59 includes a drive receiving unit (drive input unit, coupling portion) 59*a* and a gear portion 59*b*. The cam gear 60 is provided with a cam groove 60*a*. In the cam gear 60, a cylindrical portion on which the cam groove 60*a* is formed may be referred to as a cam portion. The cam groove 60*a* is extended snakingly, and has a peak portion 60*b* at the rear side and a valley portion 60*c* at the front side.

The direction of the axis of the cam gear 60 is parallel to the Z axis.

A link member 61 as the reciprocating member has a cam projection 61*a*, and the cam projection 61*a* is in engagement with the cam groove 60*a*. Further, the link member 61 is supported by the side cover 62 so as to be movable in the front-rear direction (Z-axis direction) while the movement in the rotational direction about the axis Z which is the central axis of the pump 58 is restricted. That is, the link member 61 can reciprocate in the direction of the axis of the cam gear 60.

The side cover 62 is a cover member (protective member) for covering the pump 58 to protect the pump 58, it is provided at an end portion of the cartridge 13 in the Z2 direction, and provides a rear surface (rear end) of the cartridge 13. The side cover 62 may be regarded as a part of the frame (casing) of the cartridge 13 together with the supply frame 50. In such a case, the supply frame 50 may be particularly referred to as a frame body (casing body) or the like.

The pump 58 described above is provided with a coupling portion 58*b*, by means of which the link member and the pump 58 are connected with each other. In this embodiment, the cam gear 60 and the link member 61 are included in the drive conversion unit (drive conversion mechanism, pump drive mechanism) 68.

The rotation drive transmission path will be described. As shown in FIG. 10, rotational drive is inputted from the drive output member (coupling member on the main assembly side) 100*a* provided in the main assembly of the image forming apparatus 100, to the cartridge 13. That is, by connecting (coupling) the drive receiving portion (coupling portion) 59*a* of the drive input gear 59 provided on the cartridge with the drive output member 100*a*, the driving force receiving portion 59*a* receives the rotational force (driving force). As a result, the drive input gear 59 rotates, and the drive force is transmitted from the drive input gear 59 to respective members of the cartridge 13.

The drive input gear 59 is connected to the shaft portion 53*a* of the stirring member 53 as shown in FIG. 7, and therefore, the stirring member 53 is rotated by the rotation of the drive input gear 59. The gear portion 59*b* of the drive input gear 59 is engaged with the gear portion 60*d* of the cam gear 60, and transmits the rotational drive to the cam gear 60. Further, the gear portion 60*d* of the cam gear 60 is engaged with the screw gear 64 to rotate the screw gear 64. A screw 54 (see FIG. 1) is connected with the screw gear 64, and the screw 54 is driven by the transmitted rotational drive.

The diameter of the gear portion 60*d* of the cam gear 60 is smaller than the diameter of the cylindrical portion (cam portion) on which the cam groove 60*a* of the cam gear 60 is formed.

Thus, the drive input gear 59 is a drive input member to which a driving force (rotational force) is inputted from the outside of the cartridge 13 (that is, the main assembly of the image forming apparatus 100). In other words, the drive input gear 59 is a cartridge-side coupling member structured to be able to couple with the drive output member (main assembly-side coupling member) 100*a*.

Further, the drive input gear 59 also functions as a drive transmission member (gear member) for transmitting the driving force to each member of the cartridge. That is, the drive input gear 59 includes both the coupling portion (driving force receiving portion 59*a*) to which the driving force is inputted and the gear portion 59*b* for outputting the driving force to another member of the toner cartridge 13. The gear portion 59*b* is arranged on the outer peripheral surface of the drive input gear 59.

The rotational force (driving force) inputted to the drive input gear 59 is used not only to drive the screw 54 and the stirring member 53, but also to drive the pump 58.

Therefore, referring to FIG. 12, the description will next be made as to a drive conversion portion 68 for converting the rotational force (driving force) received by the drive input gear 59 into the reciprocating motion to expand/contract and reciprocate the pump 58 will be described.

The drive conversion portion 68 in this embodiment is a cam (cam mechanism), and includes the cam gear (rotating member) 60 and the link member (reciprocating member) 61. The link member 61 is restricted in movement in the rotational direction around the axis Z. Therefore, when the cam gear 60 is rotated by receiving the rotational drive, the cam projection 61*a* of the link member 61 alternately passes through the peaks 60*b* and the valleys 60*c* of the cam groove 60*a* of the cam gear 60, so that the link member 61 reciprocates in the front-rear direction.

That is, the state of part (a) of FIG. 12 and the state of part (b) of FIG. 12 are alternately repeated. At this time, the point where the projection 61*a* which is each engaging portion, and the cam groove 60*a* come into contact with each other in order for the cam gear 60 as the rotating member to reciprocate the link member 61 as the reciprocating member is referred to as the engaging point P.

In interrelation with the reciprocating motion of the link member 61, the coupling portion 58*b* connected to the link member 61 also reciprocates. Then, the reciprocating motion of the coupling portion 58*b* causes the bellows portion 58*a* of the pump 58 to expand and contract, so that the internal volume of the pump 58 changes periodically. The connecting portion 58*b* is a force receiving portion (expansion/contracting force receiving portion, pump driving force receiving portion) which receives the force for expanding/contracting the pump 58 from the link member 61.

As described above, the drive conversion portion 68 (link member 61, cam gear 60) converts the rotational force received by the drive input gear 59 to the force to expand and contract the bellows portion 58*a* of the pump 58 (the force for driving the pump to change the volume of the pump), thus driving the pump 58.

At this time, the pump 58 is placed inside the rotating cam gear 60 in the radial direction. That is, the pump 58 is inside the cam gear 60 and is surrounded by the cam gear 60.

Further, the bellows portion 58*a* of the pump 58 and the engagement point P are set so that they overlap in the expansion/contraction direction (moving direction of the pump) of the pump 58, at some phase. With such an arrangement relationship, the space required for expansion and contraction of the pump 58 and the space required for movement of the engagement point P can be shared, and the expansion and contraction amount (movement amount) of the pump 58 can be made larger in the limited space.

Referring to FIGS. 12 and 27, the specific positional relationship between the engagement point P and the bellows portion 58*a* will be described. Part (a) of FIG. 12 and part (b) of FIG. 12 are sectional views of the pump, part (a) of FIG. 12 shows a state in which the pump is expanded, and part (b) of FIG. 12 shows a state in which the pump is contracted. FIG. 27 is a graph showing change, with the time, of the positional relationship between the engagement point P and the bellows portion 58*a* in the operation of the pump.

In part (a) of FIG. 12, the bellows portion 58*a* of the pump 58 is in an expanded state and occupies the range indicated by the arrow Q1 in the Z-axis direction. At this time, the engagement point P is placed so as to overlap the range Q1 in the Z-axis direction.

Further, in part (b) of FIG. 12, the bellows portion 58*a* of the pump 58 is in a contracted state and occupies the range indicated by the arrow Q2 in the Z-axis direction. At this time, the engagement point P overlaps the range Q2 in the Z-axis direction.

Part (c) of FIG. 12 is an illustration when the bellows portion 58*a* and the engagement point are projected on a line (Z axis) extending in the expansion/contraction direction (movement direction) of the pump 58. The position of the engagement point P in the state where the bellows portion 58*a* is most expanded (the state of part (a) of FIG. 10 is indicated by a point Pa, and the region occupied by the bellows portion 58*a* in the Z-axis direction at that time is indicated by Q1. It is understood that the engagement point Pa is within the projection area Q1 of the bellows portion 58*a*, on the Z axis.

Further, the position of the engagement point in the state where the bellows portion 58*a* is most contracted (the state in part (b) of FIG. 10 is indicated by the point Pb. Further, in the state where the bellows portion 58*a* is most contracted (the state of part (b) of FIG. 10, the region occupied by the bellows portion 58*a* in the Z-axis direction is indicated by Q2. It is understood that the engagement point Pb is within the projection area Q2 of the bellows portion 58*a*, on the Z axis.

FIG. 27 is a developed view showing how the cam projection 61*a* of the link member 61 moves in the cam groove 60*a* of the cam gear 60. The cam projection 61*a* is restricted by the cam groove 60*a* and moves in the Z-axis direction with time (Time). At this time, since the engagement point P, which is the contact point between the cam projection 61*a* and the cam groove 60*a*, changes with time (Time), it is shown by a thick solid line instead of a point in FIG. 27.

Further, in FIG. 27, the range occupied by the bellows portion 58*a* in the Z-axis direction is shown by a thin solid line, and the range occupied by the bellows portion 58*a* in the extension/contraction direction in time (Time) is indicated by the double-head arrow Q. Here, the most expanded (elongated) state of the pump 58 shown in part (a) of FIG. 12 is the state of Time=Ta in FIG. 27, and the most contracted state of the pump 58 shown in part (b) of FIG. 12 is the state of Time=Tb in FIG. 27.

In this embodiment, the engagement point P at the time point of "Time=Tb", that is, at the timing when the pump 58 is most contracted, and the engagement point P is in the range Q2 in which a part of the pump 58 exists in the expansion/contraction direction (that is, on the Z axis). That is, the Z coordinate of the engagement point P is within the range Q1 occupied by the pump 58 in the Z axis coordinate.

Similarly, at the time of "Time=Ta", that is, at the timing when the pump 58 is most expanded, the engagement point P is inside the range Q1 where the pump 58 exists, in the expansion/contraction direction. That is, the Z coordinate of the engagement point P is within the range Q1 occupied by the pump 58 in the Z axis coordinate.

By doing so, the space required for the expansion/contraction motion and the reciprocating motion of the pump 58 and the space required for the movement of the engagement point P can be shared. That is, the space required for arranging the pump 58 and the drive conversion portion 68 can be kept small, and therefore, the cartridge 13 can be downsized.

In the state of "Time=Tc" in FIG. 27, in the process of switching from the contracted state to the expanded state of the pump 58, It is understood that the engagement point P is outside the range of the bellows portion 58*a* at that time in the Z-axis coordinates. The engagement point P may be outside the range Q occupied by the bellows portion 58*a* in the process of operation. Thus, it will suffice if at least in the Z-axis direction (the expansion/contraction direction of the pump), there is a moment (timing) in which the engagement point P is inside the range Q occupied by the bellows portion 58*a*.

In this embodiment, the engagement point P is inside the region Q occupied by the bellows portion 58*a*, except for a short time before and after “Time=Tc”. In particular, the engagement point P is always inside the region Q occupied by the bellows portion 58*a* in the process of change of the pump 58 from the most expanded state to the most contracted state.

In addition, the drive input gear 59 is disposed so as to overlap the bellows portion 58*a* of the pump 58 at least partially in the expansion/contraction direction of the pump 58. By this, the space required for expansion and contraction of the pump 58 and the space required for engagement of the drive input gear 59 can be shared, and the expansion and contraction amount of the pump 58 can be made larger in the limited space.

Referring to FIG. 13, the specific positional relationship between the drive input gear 59 and the bellows portion 58*a* will be described. Part (a) of FIG. 13 shows a state in which the pump is expanded, and part (b) of FIG. 13 shows a state in which the pump is contracted. Part (c) of FIG. 13 is a projection drawing in which the positional relationship between the drive input gear 59 and the bellows portion 58*a* is projected on the axis Z.

In part (a) of FIG. 13, the bellows portion 58*a* of the pump 58 is in an expanded state and occupies the range Q1 in the Z-axis direction. At this time, the width 59W including the drive receiving portion 59*a* and the gear portion 59*b* of the drive input gear 59 overlaps the range of the arrow Q1 in the Z-axis direction.

Further, in part (b) of FIG. 13, the bellows portion 58*a* of the pump 58 is in a contracted state and occupies the range Q2 in the Z-axis direction. At this time, the width 59W including the drive receiving portion 59*a* and the gear portion 59*b* of the drive input gear 59 overlaps the range Q2 in the Z-axis direction.

In this embodiment, the width 59W including the drive receiving portion 59*a* and the gear portion 59*b* of the drive input gear 59 in the Z-axis direction overlap the area occupied by the bellows portion 58*a*, in both the expanded state and the contracted state of the pump 58. It is desirable that the width 59W including the drive receiving portion 59*a* and the gear portion 59*b* is arranged so as to always overlap the range occupied by the bellows portion 58*a* in the Z-axis direction, as described above, but it is not always necessary. It will suffice if in the process of operation of the pump 58, there is at least a moment (timing) in which the width 59W including the drive receiving portion 59*a* and the gear portion 59*b* overlaps with the range occupied by the bellows portion 58*a* in the Z-axis direction. By doing so, the space required for expansion and contraction of the pump 58 and the space required for arranging the drive input gear 59 can be shared.

Further, The arrangement is such that when the pump 58 is in the contracted state, the connecting portion (expansion force receiving portion, pump driving force receiving portion) 58*b* of the link member 61 and the pump 58 overlaps the peak portion 60*b* of the cam gear 60 in the Z-axis direction. On the other hand, when the pump 58 is in the expanded state, the link member 61 also moves in the Z-axis direction, so that the peak portion 60*b* of the cam gear 60 and the link member 61 do not interfere with each other during operation. That is, in the Z-axis direction, the range in which the coupling portion 58*b* of the pump 58 operates and the range in which the engagement point P moves overlap at least partially. In other words, as can be seen in part (c) of FIG. 12, the moving range of the engaging point P in the Z-axis direction is between the point Pa and the point Pb. In the state where the bellows portion 58*a* is most contracted (the state of part (b) of FIG. 12, the connecting portion 58*b* is interposed between the point Pa and the point Pb on the Z axis. The arrangement relationship between the engagement point P and the coupling portion 58*b* also makes it possible to selected a larger amount of expansion and contraction of the pump 58 in a limited space, Thus, contributing to the space saving and to the stabilization of discharge.

Referring to Figure, the positional relationship between the cam gear 60 and the bellows portion 58*a* of the pump 58 will be described.

FIG. 14 is a sectional view around the pump. In FIG. 14, the link member 61 and the side cover 62 are not shown.

The pump 58 is provided with the bellows portion 58*a* and the connecting portion 58*c*. The bellows portion 58*a* is a movable portion structured to be deformable so as to expand and contract. The connecting portion 58*c* is a mounting portion (connecting portion) mounted to the casing (supply frame 50) of the toner cartridge 13.

Assuming that the thickness of the bellows portion 58*a* is ta and the thickness of the connecting portion 58*c* is tk, the relationship therebetween is ta<tk. The bellows portion 58*a* is easily expanded and contracted and has a small wall thickness, but the connecting portion 58*c* has a large wall thickness in order to assure the strength enough to connect to the supply frame 50.

Further, a diameter of the bellows portion 58*a* is larger than a diameter of the connecting portion 58*c*.

In this embodiment, as viewed along the expansion/contraction direction of the pump 58, the bellows portion 58*a* and the connecting portion 58*c* are both circular, and the centers of the bellows portion 58*a* and the connecting portion 58*c* are aligned with each other. However, the pump 58 does not necessarily have such a shape.

The gear portion 60*d* of the cam gear 60 is arranged so as to surround the coupling portion 58*c*, and as viewed along the Z-axis direction, the coupling portion 58*c* is inside the diameter Dc, and the gear portion 60*d* is on the outside (position of the diameter Dd).

In the Z1 direction, the region of the bellows portion 58*a* of the pump 58 is in Za, the region of the coupling portion 58*c* is in Zc, and the region of the gear portion 60*d* is in Zc.

By disposing the gear portion 60*d* in the space of the connecting portion 58*c* which does not move in the longitudinal direction of the pump 58, the longitudinal space can be efficiently used.

Regarding the relationship between the gear portion 60*d* of the cam gear 60 and the bellows portion 58*a* of the pump 58, as viewed along the Z-axis direction, the bellows portion 58*a* is within the diameter Da, and the gear portion 60*d* overlaps this diameter Da.

In FIG. 14, k1 and k2 are portions where the gear portion 60*d* overlaps the bellows portion 58*a*, and are an annular shape (donut-shaped) area provided when k1 and k2 are rotated about the axis Z, as viewed along the Z direction.

In this structure, the gear portion 60*d* can be made smaller as viewed along the Z-axis direction, and the bellows portion 58*a* of the pump 58 can be made larger, and therefore, the rotation speed of the gear portion 60*d* can be increased, and the variable volume of the pump can be increased.

(Discharge Opening, Pump, Drive Input Gear Arrangement).

Next, referring to FIGS. 1 and 15, the description will be made as to the arrangement relationship of the discharge opening 52, the pump 58, and the drive input gear 59 described above.

FIG. 1 (*a*), part (b) of FIG. 1, and part (c) of FIG. 1 are cross-sectional views as the cartridge 13 is viewed along the Z axis. That is, the plane along which the cross-sections shown in part (a) of FIG. 1-part (c) of FIG. 1 are taken corresponds to the XY plane perpendicular to the Z axis. Part (a) of FIG. 15 is a view of the rear portion of the cartridge 13 along the Z1 direction, and part (b) of FIG. 15 is a view of the lower portion (bottom portion) of the cartridge 13 along the Y1 direction. Part (a) of FIG. 15 corresponds to the XY plane perpendicular to the Z axis, and part (b) of FIG. 15 corresponds to the ZX plane perpendicular to the Y axis.

The discharge opening 52 is placed inside the supply frame 50 so as to be closer to one side (first side) in the X direction, that is, on the left side offset in the arrow X1 direction in FIG. 1. Similarly, the screw 54 is also placed offset in the X1 direction, together with the discharge opening 52. That is, the discharge opening 52 and the screw 52 are arranged in the neighborhood of the left side surface of the supply frame 50.

On the other hand, the stirring member 53 and the drive input gear 59 are placed on the other side (second side) in the X direction, that is, on the right side indicated by the arrow X2 in FIG. 1.

By doing so, the toner (developer) is fed from the stirring member 53 provided on the second side X2 in the X direction (right side in FIG. 1) to the screw 54 arranged on the first side X1 (left side in FIG. 1).

If, unlike this embodiment, the screw 54 and the discharge opening 52 are placed in the center of the supply frame 50 in the X direction, that is, in the left-right direction, it is necessary to provide the stirring member 53 on each of the first side X1 and the second side X2 of the supply frame 50. That is, it may be necessary to convey the toner (developer) from the two stirring members provided on both sides in the X direction toward the screw 54 provided in the center in the X direction, with the result that the structure of the cartridge may be complicated.

Therefore, in this embodiment, the number of stirring members 53 is reduced and the cartridge structure is simplified by arranging the discharge opening 52 and the screw 54 closer to one side X1 (left side in FIG. 1) in the X direction.

The arrangement of the pump 58 is as follows. In order to facilitate the action of the pump 58 on the discharge opening 52, it is desirable to dispose the pump 58 closer to the first side X1 where the discharge opening 52 is placed. Therefore, as shown in FIG. 15, the pump 58 is arranged so that the center of the pump is placed on the downstream side, in the X1 direction of the X direction, of the center of the supply frame 50. Since FIG. 1 and FIG. 15 (*a*) are in a left-right inverted relationship with each other, the downstream side in the X1 direction corresponds to the right side, and the downstream side in the X2 direction corresponds to the left side, in FIG. 15.

In this embodiment, the pump 58 is provided so as not to protrude beyond the side surface of the first side X1 of the supply frame 50. The toner cartridge is viewed along the Z axis, the entire pump 58 can be accommodated inside the supply frame 50. This is to assure a large volume of the supply frame 50 by utilizing the space for arranging the pump 58.

The center of the pump 58 is placed on the downstream side, in the X2 direction, of the central axis of the screw 54 and the discharge opening 52. In FIG. 15, the center position of the screw gear 64 is the center position of the screw 54.

That is, in the X direction (that is, in the left-right direction or the horizontal direction), the center of the pump 58 is on the downstream side, in the X1 direction, of the center of the supply frame 50, and on the downstream side, in the X2 direction, of the center (axis line) of the screw 54 and the discharge opening 52. This is because, as described above, the region of the pump 58 protruding beyond the supply frame 50 is reduced or eliminated. That is, in order to downsize the toner cartridge 13, the position of the discharge opening 52 and the position of the center of the pump 58 are intentionally shifted in the X-axis direction. The coupling portion 58*c* and the coupling portion 58*b* placed at the center of the pump 58 are closer to the discharge opening 52 in the X2 direction.

Finally, the arrangement of the drive input gear 59 is as follows. The drive input gear 59 is for transmitting the drive to the pump 58, and if the drive input gear 59 and the pump 58 are aligned with each other along the Z axis, the length of the developer supplying container 13 in the Z direction becomes longer. Therefore, it is desirable to shift (offset) the center of the drive input gear 59 from the center of the pump 58 in the X direction or the Y direction and to arrange the drive input gear and the pump 58 then.

In this embodiment, the center (axis) of the drive input gear 59 is shifted to the side in the X2 direction (left side in FIG. 15) with respect to the center of the pump 58. The axis of the drive input gear 59 is placed closer to the X2 direction than the coupling portion 58*c* and the coupling portion 58*b* of the pump 58.

This is because it is easy to assure a space for placing the drive input gear 59 on the downstream side in the X2 direction with respect to the pump 58. This is due to the following reasons.

As shown in FIG. 2, the process cartridge 1 is placed above each of the four toner cartridges 13 (on the downstream side in the arrow Y1 direction) inside the image forming apparatus main assembly. And, the four process cartridges 1 are arranged side by side in the X direction, and similarly, the four toner cartridges 13 are also arranged side by side in the X direction.

In such a layout of the image forming apparatus, the width of the toner cartridge 13 in the X direction can be expanded to the same extent as the width of the process cartridge 1. As a result, as shown in FIG. 15, the width of the toner cartridge 13 measured in the X direction can easily be made larger than the width of the pump 58. Further, since the pump 58 is placed closer to the X1 side of the toner cartridge 13, there is a room for placing the drive input gear 59 in the toner cartridge 13 particularly on the downstream side in the X2 direction with respect to the pump 58.

Therefore, the center (axis) of the drive input gear 59 is offset from the center of the pump 58 in the X2 direction of the X direction. In this embodiment, the drive input gear 59 is placed coaxially with the stirring member 53.

In the horizontal direction (X direction), the discharge opening 52 is placed on the first side (downstream side in the X1 direction) with respect to the center of the pump 58, and the axis of the drive input gear 59 is placed on the second side opposite to the first side with respect to the center of the pump 58 (that is, the downstream side in the X2 direction). In the X direction (horizontal direction), the discharge opening 52 and the axis of the drive input gear 59 are arranged on opposite sides of the center of the pump 58.

Here, the center of the pump 58 is the center of the area occupied by the pump 58 in the X direction. By arranging the discharge opening 52 on which the pump 58 acts and the drive input gear 59 acting on the pump 58 apart from each other, the space can be effectively utilized and the toner cartridge 13 can be downsized.

In this embodiment, the coupling portion 58*c* and the coupling portion 58*b* are at the center of the pump 58. Therefore, in the horizontal direction, the axis of the drive input gear 59 and the discharge opening 52 are arranged on the opposite sides with the coupling portion 58*c* or the coupling portion 58*b* of the pump 58 interposed therebetween.

In the horizontal direction (X-axis direction), the axis 54 of the screw is substantially at the same position as the discharge opening 52. Therefore, in the horizontal direction, the axis 54 of the screw is placed so as to be shifted in the X1 direction more than the center of the pump 58. In addition, the stirring member 53 is disposed coaxially with the drive input gear 59. Therefore, the axis of the stirring member 53 is placed so as to be shifted in the X2 direction more than the center of the pump 58 in the horizontal direction.

As the toner cartridge 13 is viewed along the Z axis, the drive input gear 59 is arranged so as not to protrude beyond the supply frame 50. The entire drive input gear 59 is accommodated inside the region occupied by the supply frame 50. By utilizing the space for disposing the drive input gear 59, it is possible to assure a large volume of the supply frame 50, and it is possible to increase the amount of the toner contained in the replenishment frame 50. Alternatively, since the space required for arranging the drive input gear 59 is effectively utilized, the toner cartridge can be downsized.

The toner cartridge is viewed along the Z axis as shown in FIG. 15, the pump 58 and the drive input gear 59 are placed so as to partially overlap each other. This is to assure a large volume of the pump 58 by utilizing a part of the space in which the drive input gear 59 is provided.

More specifically, a part of the gear portion 59*b* of the drive input gear 59 is placed so as to be sandwiched between the bellows portion 58*a* of the pump 58 and the supply frame body 50. On the other hand, the coupling portion 59*a* of the drive input gear 59 is arranged so as not to overlap with the pump 58. This is because the coupling portion 59*a* has to be exposed to the outside of the cartridge 13 in order to couple with the drive output member 100*a*.

In summary, as the cartridge 13 is viewed along the Z axis, the axis of the drive input gear 59 is between the side surface of the supply frame 50 on the second side (that is, the downstream side in the X2 direction) and the center of the pump 58. In particular, the coupling portion 59*a* of the drive input gear 59 is placed on the downstream side in the X2 direction with respect to the pump 58 so as not to overlap with the pump 58. On the other hand, the other parts of the drive input gear 59, more specifically, a part of the gear portion 59*b* of the drive input gear 59 is placed so as to overlap the pump 58.

Similarly, the pump 58 and the screw gear 64 are arranged so as to partially overlap each other. This is to effectively utilize the space and assure a large volume of the pump 58. On the other hand, the axis of the screw gear 64 is placed offset in the X1 direction from the center of the pump 58. This is because the screw 54, which is arranged coaxially with the screw gear 64, is placed in the neighborhood of the discharge opening 52.

From the standpoint of increasing the amount of the toner (developer) discharged by the operation of the pump 58, it is necessary to increase the number of expansions and contractions of the pump 58 with respect to the rotation speed of the drive input gear 59. In this embodiment, the pump 58 expands and contracts once or more when the drive input gear 59 makes one full rotation. The expansion/contraction operation (reciprocating motion) of the pump 58 is counted as one operation which is from the state of the pump 58 in the most contracted position through the state in the most expanded state and then back to the most contracted state.

Here, in order to increase the number of expansions and contractions of the pump, it is necessary to rotate faster the cam gear 60, which is provided around the pump 58 to cause the pump 58 to expand and contract.

Since the drive is transmitted to the cam gear 60 from the drive input gear 59, it is desirable that the gear portion of the drive input gear 59 is made larger, in order to appropriately select the gear ratios of the two gears and rotate the cam gear 60 faster.

In order to efficiently arrange the enlarged drive input gear 59, it is efficient to place the drive input gear 59 offset in the X2 from the center of the pump 58 as described above.

As described above, it is desirable that the drive input gear 59 is enlarged, whereas the screw gear 64 is preferably downsized.

In order to increase the amount of the toner (developer) fed by the screw 54, it is desirable to increase the rotation of the screw 54. That is, it is desirable to increase the rotation of the screw gear 64 connected to the screw 54.

Here, the driving force is transmitted to the screw gear 64 from the drive input gear 59 by way of the cam gear 60. In order to appropriately select the gear ratio of these gears and rotate the screw gear 64 at high speed, it is desirable to reduce the diameter of the screw gear 64.

From the standpoint of increasing the diameter of the gear portion 59*a* of the drive input gear and decreasing the diameter of the screw gear 64, the diameter of the gear portion 59*a* of the drive input gear 59 is selected to be larger than the diameter of the screw gear 64.

In this embodiment, when the pump 58 expands and contracts once, the screw 54 makes one or more full rotations. In addition, the rotation speed of the screw gear 64 is made higher than the rotation speed of the drive input gear 59.

The stirring member 53 does not need to have as many rotation speeds as the screw 54, from the standpoint of supplying the toner (developer) to the screw 54. Therefore, it is not particularly necessary to increase the rotation speed of the stirring member 53 as compared with the rotation speed of the drive input gear 59, and the drive input gear 59 is directly connected to the stirring member 53. This makes it possible to simplify the structure of the cartridge 13.

Further, in order to increase the size of the pump 58 and the drive input gear 59, it is desirable to reduce the number of idler gears in order to assure arrangement spaces for them. For this reason, the cam gear 60 which rotates around the pump 58 is used also as an idler gear for transmitting the drive from the drive input gear 59 to the screw gear 64.

The pump 58 is placed along the axis of the cam gear 60 and is surrounded by the cam gear 60. The axis of the cam gear 60 passes through the inside of the pump 58. In this embodiment, particularly the cam gear 60 and the pump 58 are aligned along the Z-axis direction so that centers thereof are substantially aligned with each other.

With such an arrangement relationship, the space for arranging the cam gear 60 and the space for arranging the pump 58 can be shared, and the size of the cartridge 13 can be reduced. More specifically, the inside of the cam gear 60 can be used as a space for disposing the pump 58.

Referring to FIGS. 16 and 17, the appearance of the cartridge 13 will be described. Part (a) of FIG. 16 is an overall perspective view as seen from the rear of the cartridge (13Y, 13M, 13C). Part (b) of FIG. 16 is a front view as seen from the rear of the developing cartridges (13Y, 13M, 13C). FIG. 17 is an overall perspective view as seen from the front of the cartridge (13Y, 13M, 13C).

As shown in part (a) of FIG. 16, the cartridge 13 is mounted t the main assembly of the image forming apparatus 100 in the direction of arrow J. The side cover 62, which is the rear surface (rear surface) of the cartridge 13, is provided with two engaging portions, namely, a first engaging portion 71 and a second engaging portion 72. When the cartridge 13 is mounted to the main assembly of the image forming apparatus 100, the two engaging portions 1071 and 1072 (see FIG. 18) provided in the image forming apparatus main assembly 100 are engaged with the first engaging portion 71 and the second engaging portion 72 which are provided in the cartridge 13, respectively. By this, the position of the cartridge 13 is determined inside the main assembly 100 of the image forming apparatus.

The first engaging portion 71 of the cartridge 13 has a cylindrical shape, and the second engaging portion 72 has a shape of oblong cylindrical hole. The position of the cartridge 13 is determined inside the main assembly of the image forming apparatus 100 by engaging and inserting the engaging portions 1071 and 1072 (FIG. 18) on the main assembly side into the inside of peripheral surfaces of these cylinders, respectively.

That is, the two engaging portions 1071 and 1072 (FIG. 18) on the main assembly side of the image forming apparatus 100 are both shafts (shafts, projections), and the two engaging portions 71 and 72 on the cartridge side have openings (round holes and oblong holes) for engaging with the shafts on the apparatus main assembly side, respectively. The engaging portions 71, 72, 1071 and 1072 are positioning portions for determining the position of the cartridge 13 inside the image forming apparatus main assembly. The engaging portions 71 and 72 are engaging portions (positioning portions) on the cartridge side, and the engaging portions 1071 and 1072 are engaging portions (positioning portions) on the apparatus main assembly 100 side.

Referring to FIG. 18, the mounting of the cartridge 13 to the image forming apparatus 100 will be described.

Part (a) of FIG. 18 is an overall perspective view when the cartridges (13Y, 13M, 13C) are mounted to the image forming apparatus 100.

Part (b) of FIG. 18 is an overall perspective view when the cartridges (13Y, 13M, 13C) have been mounted the image forming apparatus 100.

A storing element 70 having an electric contact contactable with the electrical contact 170 of the main assembly of the image forming apparatus 100 is provided on the side cover 62.

The storing element 70 is an element which stores information about the cartridge 13. Examples of the information include the driving status of the cartridge 13 and the color of the toner contained in the cartridge 13. In this embodiment, the storing element 70 is an IC chip (memory chip, semiconductor chip), and as described above, the storing element 70 has, on the surface thereof, a conductive contact (electrical contact) which is electrically contactable with a contact (electrical contact) 170 provided on the image forming apparatus main assembly 100 to establish electrical connection therebetween. The electrical contact 170 of the main assembly of the image forming apparatus 100 can be electrically connected to the storing element 70 to read the information therefrom. Further, the main assembly of the image forming apparatus 100 may write the usage status of the cartridge 13 or the like from the storing element 70. The main assembly of the image forming apparatus 100 can appropriately control the cartridge 13 on the basis of the information in the storing element 70.

As shown in part (a) of FIG. 18 in the process of mounting the cartridge 13 to the main assembly of the image forming apparatus 100 in the direction of arrow J, the surface of the storing element 70 abuts on the electrical contact of the main assembly of the image forming apparatus 100. By this, the state shown in part (b) of FIG. 18 is established, and the storing element 70 and the electrical contact 170 can be electrically connected.

As shown in FIG. 12 described above, the pump 58 is in contact with the supply frame 50 at the connecting portion 58*c* provided at the end in the Z1 direction, and is coupled (connected, joined) with the supply frame 50. As shown in part (b) of FIG. 16, a line connecting the center of the cylindrical shape of the first engaging portion 71 provided on the side cover 62 and the center of the oblong cylindrical shape of the second engaging portion 72 is referred to as line L1. A pump coupling portion 58*c* in which the pump 58 is in contact with the supply frame 50 is placed on one side of the line L1, and the electrical contact of the storing element 70 is placed on the opposite side. By this arrangement, the pump 58 and the storing element 70 are separated from each other, so that the vibration generated when the pump 58 is driven is suppressed from being transmitted to the storing element 70. That is, the storing element 70 is not easily moved due to vibration, and the contact state between the electrical contact provided in the main assembly of the image forming apparatus 100 and the storing element 70 is stably maintained.

Further, a coupling portion (screw) 73 for connecting the side cover 62 and the supply frame with each other is provided on the same side as the storing element 70 with respect to the L1. Since the storing element 70 and the coupling portion 73 are arranged on the same side, the storing element 70 can be more firmly fixed to the supply frame 50, and the storing element 70 can be positioned more accurately.

As shown in part (a) of FIG. 17, the front side of the cartridge 13, that is, in the neighborhood of the end of the replenishment frame 50 in the Z1 direction, a handle 74 is provided which serves as a grip for the user when inserting and removing the cartridge 13 into and from the main assembly of the image forming apparatus 100. The handle 74 is formed by a portion of a projection projecting from the upper surface of the supply frame 50 and a portion of a recess recessed from upper surface. The recessed portion of the handle 74 is placed offset in the Z2 direction from the recessed portion of the handle 74. That is, the recessed portion is placed closer to the rear of the cartridge than the projecting portion.

The handle 74 is not limited to the one having the structure of the projection and the recess formed on the upper surface of the supply frame 50 in this manner. For example, the handle 74 may be provided by only one of a projection and a recess. As another example, a portion of the cartridge 13 is anti-slip processed, such as a plurality of small pits and projections provided on the surface of the supply frame 50 or rubber provided on the surface of the supply frame 50, by which the portion processed in this manner may function as a handle (handle) 74. It is preferable that the handle 74 is placed in the front part of the cartridge, that is, on a downstream side in the Z1 direction of the cartridge.

Further, as shown in part (b) of FIG. 17, the toner discharge chamber 57 is provided with a discharge opening (supply frame opening) 52 in the lower surface in a normally used attitude (attitude at the time of use). Further, below the discharge opening 52, a shutter (opening/closing member) 41 provided with an opening 63 is supported so as to be movable in the front-rear direction.

The discharge opening 52 is closed by the shutter 41 when the cartridge 13 is not mounted in the main assembly of the image forming apparatus 100. The shutter 41 is structured to be movable to a predetermined position by being urged by the main assembly of the image forming apparatus 100 in interrelation with the mounting operation of the cartridge 13.

That is, as the cartridge 13 is mounted on the main assembly of the image forming apparatus 100, the shutter 41 moves relative to the supply frame 50. At this time, the discharge opening 52 and the opening (shutter opening) 63 of the shutter 41 are in fluid communication with each other, so that the toner can be discharged from the cartridge 13. That is, the shutter 41 moves from the closed position to the open position of the discharge opening 52.

In this embodiment, the cartridge 13 (replenishment frame 50) has a shape similar to that of a cube. With such a shape, the cartridge 13 can effectively utilize the space inside the main assembly of the image forming apparatus 100, and the cartridge 13 can accommodate a large amount of the toner.

However, the shape of the cartridge 13 is not limited to this, and other shapes such as a bottle shape (cylindrical shape) can be employed.

Further, the screw 54 and the stirring member 53 are used as a feed member (transport means) for feeding the toner from the toner accommodation chamber 49 to the toner discharge chamber 47. One of them may be referred to as a first feed member, and the other may be referred to as a second feed member. In addition, the screw gear 64 and the drive input gear 59 connected to the respective feed members (54, 53) may be referred to as feed members gear (see FIG. 7). Further, one of these gears 64 and 59 may be referred to as a first feed member gear, and the other may be referred to as a second feed member gear. Furthermore, the drive input gear 59 may be referred to as a stirring member gear.

In this embodiment, the stirring member 53 and the screw 54 move the toner in different directions. The stirring member 53 feeds the toner toward the screw 54. More specifically, the stirring member 53 feeds the toner in a direction crossing the toner feeding direction by the screw 54 (in this embodiment, a direction substantially perpendicular to each other). In this embodiment, the screw 54 feeds the toner in the Z direction. On the other hand, the stirring member 53 feeds the toner in the X direction which intersects the Z direction.

However, the stirring member 53 and the screw 54 may have different structures as the feed member. For example, a belt conveyor may be used as a feed member instead of the screw 54, and this may be provided inside the toner accommodation chamber 49 and the communication passage 48. Alternatively, a feed member which feeds the toner by reciprocating motion may be used and placed inside the toner accommodation chamber 49 and the communication passage 48. In the case that a feed member which performs reciprocating motion is used, a drive conversion unit (conveyor member drive mechanism) which converts the rotational force received by the drive input gear 59 into reciprocating motion may be provided in the cartridge 13 as in the case of the drive conversion portion 68 described above. Further, although two feed members are used in this embodiment, the number of feed members is not limited to two, and may be one or three or more. As described above, there are variations in the structure, operation, and number of feed members.

As an example, a structure using a belt conveyor (conveyor belt 154) as a feed member will be described hereinafter in Example 6 (FIG. 26).

On the other hand, this embodiment in which the screw 54 is provided as the feed member is suitable in the following points. That is, since the screw 54 is structured to feed the toner along the rotation axis, the space required for providing the screw 54 can be reduced. Therefore, the cross-section of the communication passage 48 for placing the screw 54 can be reduced. Further, In the case that the communication passage 48 is extending along the screw 54, the distance from the screw 54 to the communication passage 48 (that is, the size of the gap generated between the screw 54 and the communication passage 48) can be made substantially constant. As a result, the communication passage 48 can accurately limit the amount of the toner passing through the inside to a certain amount, and also can reduce the amount of the toner which moves (backflows) in the direction opposite to the normal direction of the communication passage 48.

In this embodiment, the internal space 51 of the supply frame 50 is divided into three chambers (regions) of the toner accommodation chamber 49, the communication passage 48, and the toner discharge chamber 57, the structure of the supply frame 50 is not limited to such an example. For example, it is possible to form another chamber other than the toner accommodation chamber 49, the communication passage 48, and the toner discharge chamber 57 inside the supply frame 50, and conversely, it is conceivable to reduce the number of chambers.

Further, in this embodiment The drive input gear 59 directly connected to the stirring member 53 is used, as the drive input member (drive input coupling member, input coupling) which couples with the drive output member (output coupling) 100*a* of the apparatus main assembly to receive the driving force.

Figure 6:
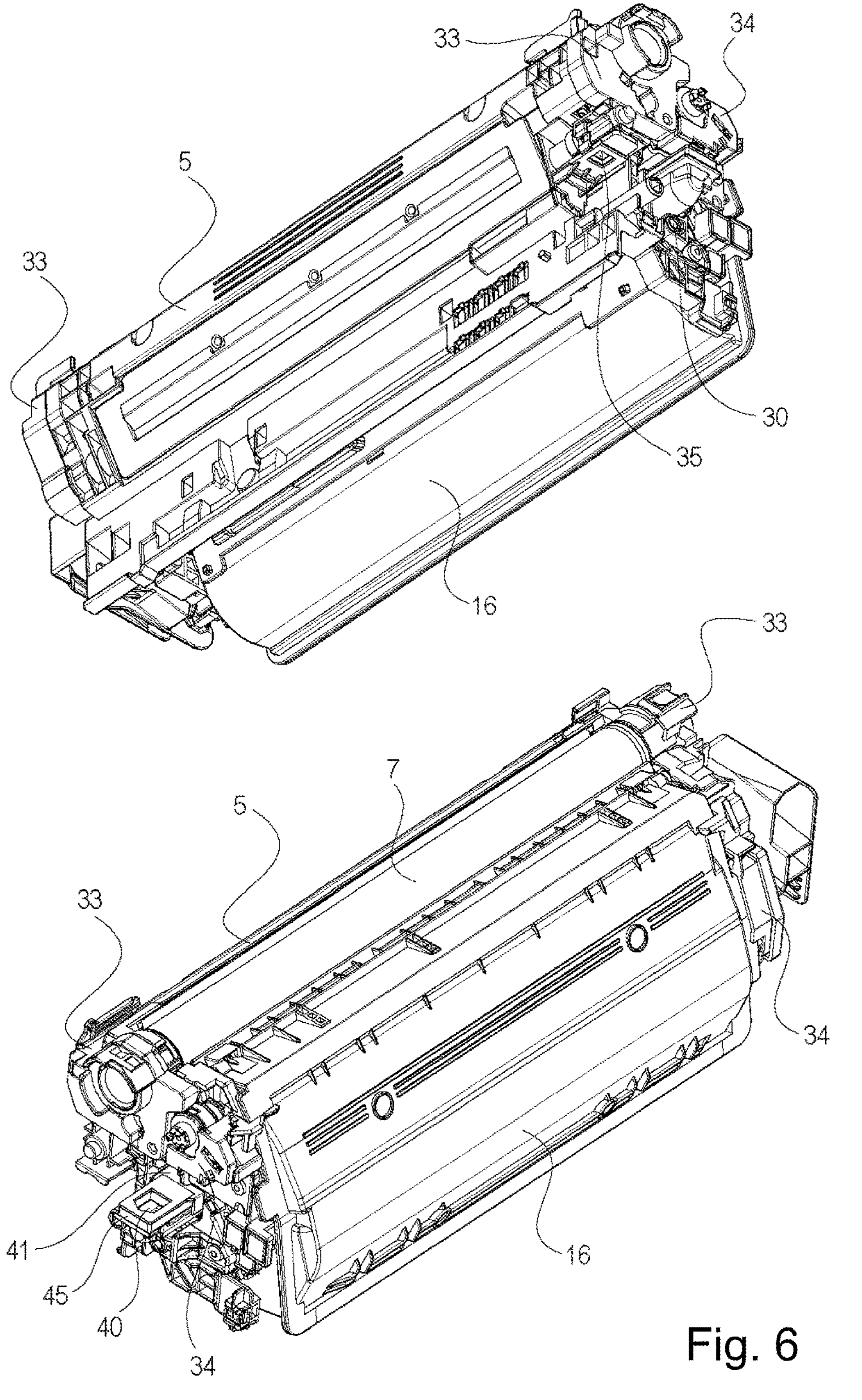
FIG. 6 is an overall perspective view of the process cartridge as viewed from rear side.

The drive input gear 59 is indirectly connected to the screw 54 by way of a gear train (gear portion 59*b* of the drive input gear 59, cam gear 60, and screw gear 64) (see FIGS. 6 and 9). Further, the drive input gear 59 is connected to the pump 58 by way of a gear train (gear portion 59*b* and cam gear 64 of the drive input gear 59) and a drive conversion portion 68 (cam gear and link arm 61) (see FIG. 10). By connecting the drive input gear 59 to each member in this manner, the driving force is transmitted to each of the stirring member 53, the screw 54, and the pump 58 by the rotation of the drive input gear 59.

However, the method of connecting the stirring member 53, the screw 54, and the pump 58 with the drive input gear 59 is not limited to this example. For example, the drive input gear 59 may be directly connected to the screw 54, and the drive force may be transmitted from the drive input gear 59 to the stirring member 53 and/or the cam gear 64 by way of a gear train. Similarly, a drive input member may be provided directly on the cam gear 64, and then a drive force may be transmitted from the cam gear to the stirring member 53 and/or the screw 54 by using a gear train. Further, instead of the gear train, another drive transmission member such as a belt may be used to transmit the driving force from the drive input gear 59 to the stirring member 53, the screw 54, and/or the drive conversion portion 68 of the pump.

That is, the drive input member (drive input gear 59) may be operatively connected to each member (stirring member 53, screw 54, and pump 58) of the cartridge 13 so as to be actable on them. That is, it will suffice if the drive input member (59) is connected to these members (53, 54, 58) so as to be able to transmit the driving force, and the connection method is not limited to a specific example. It may be a direct connection or an indirect connection by way of a gear or the like. The indirect connection method is not limited to the method using a gear, and a method using a drive transmission member (for example, a belt for drive transmission) different from the gear can also be employed.

Further, in this embodiment, the coupling portion 59*a* of the drive input gear 59 is coupled with the drive output member 100*a*, so that the drive input gear 59 receives a driving force from the drive output member 100*a* (see FIG. 9). That is, the drive input gear 59 is a coupling member on the cartridge side (cartridge side coupling, cartridge side coupler), and the drive output member 100*a* is a coupling member on the image forming apparatus main assembly side (main assembly side coupling, apparatus main assembly side coupler). The drive output member 100*a* is an output coupling (output coupler) on the side which outputs the driving force toward the cartridge, and the drive input gear 59 is a coupling on the inputted side (inputted coupler, inputted coupling) to which the driving force is inputted.

More specifically, an opening is formed inside the coupling portion 59*a*, and the space between the inner surface of the coupling portion 59*a* and the axis is open. The free end of the drive output member 100*a* can enter the inside of the opening (open space) of the coupling portion 59*a*. Here, in the neighborhood of the free end of the drive output member 100*a*, the circular outer peripheral surface of the drive output member 100*a* is recessed at three locations at 120° intervals. By this, pits and projections (namely, portion with pit and portion without pit) are formed on the outer peripheral surface of the drive output member 100*a*. Similarly, inside the coupling portion 59*a*, three projections projecting from the inner surface of the coupling portion 59*a* toward the axis of the coupling portion 59*a* are formed at intervals of 120 degrees (see part (a) of FIG. 15 and part (b) of FIG. 16). By this, pits and projections (namely, portion without projection and portion with projection) are also formed on the inner peripheral surface of the circular tubular portion of the coupling portion 59*a*.

The projection and the pit portion provided on the inner peripheral surface of the coupling portion 59*a* are engaged (engaged) with the pit and the projection provided on the outer peripheral surface of the drive output member 100*a*, by which the drive output member 100*a* and the coupling portion 59*a* connected (coupled) with each other. By this, the driving force can be transmitted from the drive output member 100*a* to the coupling portion 59*a*. The drive output member 100*a* and the coupling portion 59*a* rotate together in a substantially coaxial state. The drive input member 59 transmits the rotational force received from the drive output member 100*a* by the projection of the coupling portion 59*a* toward each driven portion of the toner cartridge 13, namely, the stirring member 53, the screw 54, the pump 58, and the like.

by the image forming apparatus main assembly and the toner cartridge 13 being connected by connecting the coupling members to each other in this manner, the driving force (rotational force) can be accurately and stably transmitted to the toner cartridge 13 and the driven portions thereof, and therefore, it is suitable. Further, it is possible to easily make the coupling members (59, 100*a*) connectable to each other, by inserting the cartridge 13 into the main assembly of the apparatus.

The shapes of the coupling members (59, 100*a*) of the image forming apparatus main assembly and the cartridge are not limited to above-described examples. For example, The shapes may be reversed such that the drive output member 100*a* has an opening, and the coupling portion 59*a* of the drive input gear 59 has a shaft portion capable of entering the opening of the drive output member 100*a*.

The method of transmitting the driving force from the apparatus main assembly to the cartridge is not limited to the coupling connection by such two coupling members (couplers). For example, it is conceivable that the connection method between the cartridge 13 and the main assembly of the apparatus is a method other than the coupling connection, and, for example, a connection using two gears may be employed. As an example, a structure is also conceivable in which a gear portion is provided on the drive output member 100*a*, and the drive input gear 59 is rotated by engaging the gear portion 59*b* of the drive input gear 59 with such a gear portion. In the case that the gear connection is employed in this manner, the coupling portion 59*a* is unnecessary for the drive input gear 59. When the coupling portion 59*a* is removed from the drive input gear 59 in this manner, the drive input member is a gear member, not a coupling member.

As a method for connecting the pump 58 to the drive input gear 59, a mechanism different from that of the drive conversion portion 68 (cam gear 64 and link arm 61) of this embodiment can be employed. As such a modification, a structure using a crank mechanism for the drive conversion unit will be described hereinafter in Embodiment 3 (FIG. 21), and a structure using a cam mechanism and a spring for the drive conversion portion will be described hereinafter in Example 4 (FIG. 23). Further, a structure using a magnet for the drive conversion portion will be described hereinafter in Example 5 (FIG. 25).

The pump 58 is a blower and an air flow generator for generating an air flow (gas flow, air flow) for discharging the toner. The pump 58 is a toner discharger and an air discharger which discharges the toner, air (gas) from the inside of the cartridge 13. The pump 58 is also an suction device which suctions air (gas) from the outside of the toner.

The pump 58 of this embodiment is a bellows pump (bellows pump), which is a positive displacement pump, and more specifically, a reciprocating pump. Other examples of reciprocating pumps include diaphragm pumps, piston pumps, and plunger pumps. The bellows pump (bellows pump) may be regarded as a type of diaphragm pump. These reciprocating pumps can periodically and intermittently discharge the toner from the discharge opening 52 by periodically changing the air pressure inside the supply frame 50 by the reciprocating movement of the movable portion.

However, with a structure in which the movable portion of the pump reciprocates by sliding movement as with the piston of a piston pump, a gap is formed between the movable portion and other members. The toner may enter the gap and affect the operation of the pump. In this respect, the bellows pump and the diaphragm pump have a structure in which the flexible movable portion is deformed and reciprocated, and no movable portion slides. Therefore, there is no such a portion as a gap between the moving portion of the pump and other members. It is possible to prevent the toner from affecting the operation of the moving parts of the pump. That is, a pump such as a bellows pump or a diaphragm pump is further preferable because the pump can operate stably.

In addition, the pump 58 of this embodiment performs both suction and exhaustion through the discharge opening 52. However, the present invention is not limited to such a structure. For example, in the modified example shown in FIG. 29, the toner accommodation chamber 49 is provided with an inlet port 86 in the toner accommodation chamber 49 in addition to the discharge opening 52. When the pump 58 is expanded, the pump 58 suctions the air not only through the discharge opening 52 but also through the inlet port 86.

The air suctioned through the inlet port 86 enters the inside of the toner discharge chamber 57 from the toner accommodation chamber 49 through the communication passage 46, and is used for discharging the toner when the pump 58 contracts. The inlet port 86 may be placed at a position other than the toner accommodation chamber 49. For example, the inlet port 86 can be placed in the toner discharge chamber 57, or the inlet port 86 can be directly connected to the pump 58. A plurality of inlet ports 86 may be provided in the cartridge 13.

It is preferable that the inlet port 86 is provided with a check valve **86*a* so as to prevent the toner from leaking out. The check valve 86*a* opens the inlet port 86 to allow the inlet port 86 to take in the air when the air pressure in the toner accommodating chamber drops. When the air pressure in the toner accommodating chamber rises, the inlet port 86 is kept closed to suppress the discharge of the air through the inlet port 86, and to suppress the discharge of the toner through the inlet port 86**.

In the modified example as shown in FIG. 29, the amount of air suctioned through the discharge opening 52 may be small or negligible as compared with the amount of the air suctioned through the inlet port 86. However, as in the structure shown in FIG. 8 and the like, if the structure is such that air is positively suctioned through the discharge opening 52, the toner around the discharge opening is stirred when the discharge opening 52 takes the air in. That is, it is easy to increase the fluidity of the toner inside the toner discharge chamber 51, and therefore, it is easy to smoothly discharge the toner through the discharge opening 52. In that respect, this embodiment (see FIG. 8 and the like) in which the suction opening is limited to the discharge opening 52 is preferable.

A structure using another type of pump is also conceivable. FIG. 30 is a schematic view of a modified example of the toner cartridge having a centrifugal pump 83 instead of the pump 58 which is a reciprocating pump (bellows pump).

The pump 83 has an impeller (impeller, rotatable member) which is driven to rotate, and is structured to blow the air by rotating the impeller. The pump 83 is a so-called fan, and more specifically, a centrifugal blower. In the modified example of FIG. 30, the pump 83 is placed at substantially the same position as the pump described above.

The driving force received by the drive input gear 59 is transmitted to rotate the impeller of the pump 83. The pump 83 uses centrifugal force to move the air Ar sucked through an inlet port 84 provided along the pump axis, from the center of the pump to the outside in the radial direction by the rotation of the impeller. In this process, the pressure of the air increases, and the size becomes suitable for toner transfer. In this manner, the air (gas) suctioned and pressurized by the pump 83 through the inlet port 84 is fed into the toner discharge chamber 57 and moves toward the toner discharge opening 52. As a result, the toner is discharged together with the air through the toner discharge opening 52.

Types of centrifugal pumps include centrifugal pumps and turbine pumps, and impellers usable with the pumps may have various shapes. The pump 83 may be called a turbo fan, a sirocco fan, or the like, depending on the shape of the impeller. In the modified example shown in FIG. 30, the direction of the air flow is fixed in the direction from the inlet port 84 to the discharge opening 51 and does not change.

As another example of the pump capable of taking in air from the inlet port 84 in this manner, in addition to the centrifugal pump which is an example of the non-displacement pump, an axial flow pump which is another example of the non-displacement pump and a rotary pump (rotary displacement pump), which is a kind of displacement pump, is also conceivable. A screw pump is an example of a rotary pump.

However, in particular, the centrifugal pump is easy to increase the pressure of the air in the process of feeding the air in the neighborhood of the rotation axis in the radial direction so as to keep it away from the axis, and to produce an air flow suitable for discharging the toner. As described above, even if the pump is such as a centrifugal pump, different from the reciprocating pump, the toner can be discharged together with the air through the discharge opening 52.

However, on the other hand, in the modified example of FIG. 30, in order to suction a sufficient amount of air through the inlet port 84, the inlet port 84 and the pump 83 need to have sufficient sizes. Further, it is necessary to rotate the impeller of the pump 83 at a sufficiently high speed, and a large gear train for speeding up may be required as a mechanism for transmitting the rotational force from the drive input gear 59 to the centrifugal pump 83, as the case may be. As the gear train for speeding up, those using planetary gears can be considered. This is to increase the rotation speed of the centrifugal pump 83 with respect to the rotation speed of the drive input gear 59.

Further, in the case that the toner cannot be sufficiently discharged only by the air flow generated by the pump 83, a stirring member for stirring the toner or transporting the toner toward the discharge opening 52 has to be additionally provided inside the toner discharge chamber 57, as the case may be. As such a stirring member, a sheet 85 mounted to the shaft of the screw 54 can be considered (see FIG. 29). The sheet 85 has a structure similar to that of the sheet of the stirring member 53, and stirs and conveys the toner by rotating together with the screw 54. The sheet 85 is structured to discharge the toner in the toner discharge chamber 57 through the discharge opening 52 together with the air fed by the pump 83 by its rotation. Depending on the rotation of the sheet 85, the amount of the toner or air discharged through the discharge opening 52 may change periodically, or the toner or air may be discharged intermittently. Although only one sheet 85 is shown in FIG. 29, a plurality of sheets 85 may be mounted to the screw 54.

In this manner, in the modified example in which another type of pump (centrifugal pump 83, for example) is used instead of the reciprocating pump 58, the toner cartridge may be large in the size, the number of parts mounted to the pump may increase, with the result that the cartridge structure becomes complicated.

On the other hand, if a reciprocating pump (a bellows pump, for example) is used, the toner can be easily discharged and stirred with a relatively simple structure. Therefore, a toner cartridge including such a reciprocating pump is more suitable because it is easy to suppress the upsizing and complication.

Embodiment 2

Next, referring to FIG. 19, a structure of the Embodiment 2 will be described. FIG. 19 is a sectional view of the neighborhood of the screw 54 of the cartridge (13Y, 13M, 13C) according to the Embodiment 2 as viewed along the lateral direction (X direction). That is, the cross-sectional plane of the view of FIG. 19 corresponds to the YZ plane perpendicular to the X-axis.

In this embodiment, only the structures of the communication opening 46 for venting the toner discharge chamber 57 and the toner accommodation chamber 49 are different from those of the above-described the first embodiment, and the other structures are almost the same as those in the Embodiment 1. Therefore, in this embodiment, detailed description will be omitted by assigning the same reference numerals to the corresponding structures in the Embodiment 1 described above.

In the Embodiment 1, the vent 46 (or the vent opening 69) is provided between the toner discharge chamber 57 and the toner accommodation chamber 49 to permit the movement of the air (vent) between the two chambers, thus preventing occurrence of a high pressure difference between them. On the other hand, in this embodiment, the toner discharge chamber 57 and the toner accommodation chamber 49 are provided with vents (vent passages, communication ports, communication passages) 201 and 202 which communicate with the outside of the supply frame 50, respectively.

(Toner Accommodation Chamber)

The toner accommodation chamber 49 is a space for accommodating the developer. The stirring member 53 is provided in the toner accommodation chamber 49.

The stirring member 53 is placed in parallel to the longitudinal direction of the cartridge 13 and is rotatably supported by the supply frame 50. Toner is fed to the screw 54 by the rotation of the stirring member 53 in the same manner as in the Embodiment 1. The toner accommodation chamber 49 is provided with, a communication opening 201 for vent with the outside of the developing supply cartridge 13.

(Toner Discharge Chamber)

The toner discharge chamber 57 is a space formed by the partition member 55 and the supply frame 50, and is provided downstream of the toner accommodation chamber and the communication passage 48 in the feed direction in which the screw 54 feeds the toner.

Further, in the neighborhood of the toner discharge chamber 57 (that is, in the neighborhood of the rear surface of the supply frame 50), a screw gear 64 capable of receiving a rotational force for rotating the screw 54 is provided. Further, the toner discharge chamber 57 is provided with the discharge opening 52 for discharging the toner from the internal space 51 thereof to the outside. Similarly to the Embodiment 1, the discharge opening 52 is arranged on the bottom surface of the supply frame 50 to discharge the toner downward.

The toner discharge chamber 57 is provided with a communication opening 202 for vent with the outside of the developing supply cartridge 13.

The preferred positions of the vents 201 and 202 are the same as the preferred positions of the vents 46 described in the foregoing. That is, in this embodiment, the lower end of the vent 202 is placed above the upper end of the communication passage 48 inside the toner discharge chamber 57. In addition, inside the toner accommodation chamber 49, the lower end of the vent 201 is placed above the upper end of the communication passage 48 and the upper end of the screw 54.

Further, the lower end of the vent 201 and the lower end of the vent 202 are placed above the upper end of the pump 58 and the upper end of the screw 54. Furthermore, the lower end of the vent 201 and the lower end of the vent 202 are placed above the upper level of the toner accommodated in the toner accommodation chamber 49.

In such a position, the toner is unlikely to leak to the outside of the cartridge 13 through the vents and 202. In addition, in this embodiment, filters are provided for both the vents 201 and 202 to further suppress toner leakage.

However, the structure is not limited to this example, and it is possible to change the presence or absence of a filter in the vents 201 and 202 and the arrangement of the vents 201 and 202 according to the structure and usage of the cartridge 13.

With the above-described structure, the internal pressure difference between the toner accommodation chamber 49 and the toner discharging chamber 57 can be kept small as the pump 58 expands and contracts, as with Embodiment 1. As a result, the discharge can be stabilized, when the internal pressure inside the supply frame 50 is changed by driving the pump 58 to discharge the toner through the discharge opening 52.

In the cartridge 13 of the Embodiment 1 shown in FIG. 8 and the like, only the discharge opening 52 performs suction and discharge in the toner discharge chamber 57, when the pump 58 is driven. On the other hand, in this embodiment, the vents 201 and 202 may also effect the suction and discharge in response to the drive of the pump 58.

One of the vents 201 and 202 may be referred to as a first vent (first vent path), and the other may be referred to as a second vent (vent path).

In addition, the vent 201, the vent 202, and the communication passage 48 may be referred to as first, second, and third communication passages (communication ports) with no particular order of them. The vent 201 and the vent 202 are communication passages (communication ports) which communicate the inside and the outside of the cartridge 13, whereas the communication passage 48 is a communication passage which communicates different chambers provided inside the cartridge 13 (communication port).

Further, the vent 201 and the vent 202 described in this embodiment may be employed in Embodiments 3 to 6 which will be described hereinafter.

Embodiment 3

Next, referring to FIGS. 20 and 22 the structure of the Embodiment 3 will be described. FIGS. 20 and 21 are partial perspective views of the rear end portion of the cartridge (13Y, 13M, 13C) according to the Embodiment 3, and the side cover 362 is shifted rearward for better illustration of the expansion/contraction operation of the pump 58. Part (a) of FIG. 20 shows an expanded state of the pump 58, and part (a) of FIG. 21 shows a contracted state of the pump 58. In addition, part (b) of FIG. 20 and FIG. 21 (*b*) show an intermediate state between the expanded state and the contracted state of the pump 58. FIG. 22 is a detailed perspective view around the crank gear 367.

In this embodiment, as compared with embodiment 1, only the structure (drive conversion unit, pump drive mechanism) for expanding and contracting the pump 58 is different, and the other structures are almost the same as those in the Embodiment 1. Therefore, in this embodiment, detailed description will be omitted by assigning the same reference numerals to the corresponding structures to those in the Embodiment 1 described above.

As shown in part (a) of FIG. 20, the drive train of the cartridge 13 of this embodiment includes a drive input gear 59, an idler gear 366, a crank gear 367, and a screw gear 64. The pump 58 extends along the axis of the idler gear 366. In particular, in this embodiment, the idler gear 366 and the pump 58 are aligned with each other along the Z-axis direction so that the centers thereof are substantially aligned with each other. The idler gear 366 is structured to rotate by receiving a driving force (rotational force) through engagement with the gear portion 59*b* of the drive input gear 59. The idler gear 366 meshes with the crank gear 367 and transmits a driving force from the drive input gear 59 to the crank gear 367. As shown in FIG. 22, the crank gear 367 is rotatably held by a shaft member 350*a* mounted to the supply frame 350 so that rotation axis thereof is perpendicular to the axis Z. The rotation axis of the crank gear 367 is parallel to the X axis.

The supply frame 350 is a member corresponding to the supply frame body 50 in the Embodiment 1, and has almost the same structure as the replenishment frame 50 except that it includes a shaft member 350*a*.

Further, the crank gear 367 has a plurality of gear teeth 367*a*. The gear teeth portion 367*a* are a plurality of projections arranged in a circle so as to surround the axis of the crank gear 367, and each of them projects in the axial direction of the crank gear 367, that is, in the X2 direction.

That is, the crank gear 367 is a kind of crown gear. In addition to the gear teeth portions 367*a*, the crank gear 367 has a boss 367*b* projecting in the X1 direction opposite to the gear tooth portion 367*a*. The boss 367*b* is placed at a position deviated from the rotation axis of the crank gear 367, and therefore, the rotation of the crank gear 367 causes the boss 367*b* to rotate around the rotation axis.

Further, as shown in part (a) of FIG. 20, the link member 361 includes an engaging boss 361*a* having a boss shape (projection shape). The link member 361 is supported by the side cover 362 so as not to be movable in the rotational direction around the axis Z but to be movable in the front-rear direction. In addition, the link member 361 and the pump 58 are connected with each other at the connecting portion 58*b* of the pump 58.

The crank gear 367 and the link member 361 are connected by a crank arm (arm member, handle member) 369. The crank arm 369 is provided with an engaging hole (engaging portion) 369*a* at its first end and an engaging hole (engaging portion) 369*b* at the second end opposite to the first end. The engagement hole 369*a* at the first end engages with the boss (engagement portion) 367*b* of the crank gear 367, and the engagement hole 369*b* at the second end engages with the engagement boss (engagement portion) 367*b* of the link member 361. By this, the crank arm 369 is connected with the link member 361 and the crank gear 367.

In this embodiment, the drive conversion portion (drive conversion mechanism, pump drive mechanism) 368 the crank gear 367 and the crank arm 369. The crank gear 367 is a rotating member in the drive conversion portion 368, and the crank arm 369 is a reciprocating member which reciprocates the second end of the crank arm 367 in response to the rotation of the crank gear 367. The drive conversion portion 368 of this embodiment is a crank (crank mechanism). That is, the first end of the crank arm 369, which is an arm (handle), is connected to the crank gear 367, which is a rotating member. As the crank gear 367 rotates, the second end (the other end) of the crank arm 369 reciprocates. By this, the drive conversion portion 368 converts the rotary motion into a reciprocating motion.

When the rotational drive is inputted from the drive output member 100*a* (FIG. 9) of the main assembly of the image forming apparatus 100, the drive receiving portion 59*a* of the drive input gear receives the rotational drive, and the gear portion 59*b* rotationally drives the pump idler gear 366. In addition, By the pump idler gear 366 engaging with the gear tooth portion 367*a*, the crank gear 367 receives a rotational drive from the pump idler gear 366, and the crank gear 367 rotates about the axis X in the direction of the arrow W.

When the crank gear 367 rotates in the direction of the arrow W in the state of part (a) of FIG. 20, the engagement hole 369*a* at the first end of the crank arm 369 also rotates in conjunction therewith in the W direction as shown in part (b) of FIG. 20. Further, in interrelation with this, the engagement hole 369*b* at the second end of the crank arm 369 also moves. Here, the link member 361 is supported so as to be movable in the front-rear direction. The crank arm 369 is connected to the link member 361 by way of an engaging hole 369*b* and an engaging boss 361*a*. Therefore, similarly to the link member 361, the moving direction of the engaging hole 369*b* provided at the second end of the link arm 369 is also limited to the front-rear direction (Z-axis direction).

In the process of shifting from the state shown in part (a) of FIG. 20 to the state shown in FIG. 20 (*b*), the second end of the crank arm 369 and the link member 361 move in the Z1 direction. By this, the pump 58 connected to the link member 361 is compressed.

Further, when the crank gear 367 rotates in the direction of the arrow W, the link member moves in the Z1 direction in which the pump 58 is compressed, as shown in FIG. 21 (*a*). In part (a) of FIG. 21, the pump 58 is in the most compressed state. Thereafter, the link member 361 moves in the direction of expanding the pump 58 as shown in part (b) of FIG. 21. Then, the link member 361 returns to the state shown in part (a) of FIG. 20 and further expands the pump 58. Part (a) of FIG. 20 shows the pump 58 in the most expanded state.

By repeating such an operation, the drive conversion portion 368 reciprocates the link member 361, By which the bellows portion 58*a* of the pump 58 expands and contracts.

Further, the rotational driving force is further transmitted from the idler gear 366 to the screw gear 64 to drive the screw 54 (see FIG. 1).

The point at which the crank gear 367 as a rotating member contacts the crank arm 369 as a reciprocating member is referred to as an engagement point P3. That is, the point where the boss 367*b* of the crank gear 367 and the engagement hole 369*a* of the crank arm contacts each other is defined as the engagement point P3. This engagement point P3 is a point corresponding to the engagement point P (see FIGS. 11, 12, 27, and so on) of the Embodiment 1.

The bellows portion 58*a* of the pump 58 and the engagement point P3 are selected to be so that a timing of overlapping in the expansion/contraction direction of the pump 58 exists. That is, in the coordinates in the Z-axis direction (Z-axis coordinates), which is the expansion/contraction direction of the pump 58, the timing at which the engagement point P3 is within the range of the bellows portion 58*a* exists. The timing is shown in part (a) of FIG. 20.

The relationship between the bellows portion 58*a* and the engagement point P3 is the same as or similar to the relationship between the bellows portion 58*a* and the engagement point P in Embodiment 1 (see FIGS. 11, 12, 27, and so on). By arranging the bellows portion 58*a* and the engagement point P3 in such an arrangement relationship, the space required for expansion and contraction of the pump 58 and the space required for the movement of the engagement point P3 can be made common, So that The expansion and contraction amount of the pump 58 can be made larger within the limited space.

The drive conversion portion 368 forms a crank (crank mechanism) by the crank gear 367 and the crank arm 369. The structure is such that the rotation of the crank gear 367 rotates the second end of the crank ring 369.

Embodiment 4

Next, referring to Figure, the structure of the Embodiment 4 will be described. FIG. 23 is a partial perspective view of the rear end portion of the cartridge (13Y, 13M, 13C) according to Embodiment 3, in a state where the side cover 62 is shifted rearward for better illustration of the expansion/contraction operation of the pump 58. Part (a) of FIG. 23 shows a state in which the pump 58 is expanded, and part (b) of FIG. 23 shows a state in which the pump 58 is contracted.

In this embodiment, only the structure for expanding and contracting the pump 58 described in the Embodiment 1 is different, and the other structures are almost the same as those in the Embodiment 1. Therefore, in this embodiment, detailed description will be omitted by assigning the same reference numerals to the corresponding structures to those in the Embodiment 1 described above.

As shown in FIG. 23, the drive train of this embodiment includes a drive input gear 59, a cam gear 460 as a rotating member, and a screw gear 64. The drive input gear 59 includes a drive receiving portion 59*a* and a gear portion 59*b*. The cam gear 460 is provided with a cam wall 460*a*. The cam wall 460*a* is provided with a peak portion 460*b* displaced to the rear side and a valley portion 460*c* displaced to the front side.

The link member 461 as a reciprocating member has a cam projection 461*a*, and the cam projection 461*a* is provided in a state of being engaged with the cam wall 460*a*. Further, the link member 461 is supported by the side cover 62 so as not to be movable in the rotational direction around the axis Z but to be movable in the front-rear direction. In addition, the link member 461 and the pump 58 are connected with each other at the coupling portion (force receiving portion) 58*b* of the pump 58.

Furthermore, a link spring 467 is mounted to the rear end of the link member. The link spring 467 is compressed between the side cover 62 and the link member 461 to urge the link member 461 forward (Z1 direction). In this embodiment, for the drive conversion unit 468 includes the cam gear 460, the link member 461, and the link spring 467.

When the rotational drive is inputted from the drive output member 100*a* provided in the main body of the image forming apparatus 100, the drive receiving portion 59*a* of the drive input gear 59 receives the rotational drive, and the gear portion 59*b* transmits the rotational drive to the cam gear 460. By the rotation of the cam gear 460, the cam projection 461*a* of the link member 461 alternately passes through the peak portion 460*b* and the valley portion 460*c*. At this time, since the link member 461 is urged forward (in the Z1 direction) by the elastic force of the link spring 467 with a force stronger than the restoring force of the pump 58, the cam projection 461*a* keeps in contact with the cam wall 460*a*. Therefore, the link member reciprocates along the peak portion 460*b* and the valley portion 460*c*, and repeats the state of part (a) of FIG. 23 and the state of part (b) of FIG. 23. Here, the point where the cam gear 460 as the rotating member contacts each other in order to reciprocate the link member 461 as the reciprocating member is referred to as an engagement point P4.

In interrelation with the reciprocating motion of the link member 461, the connecting portion (stretching force receiving portion) 58*b* connected to the link member 461 also reciprocates. Then, the bellows portion 58*a* of the pump 58 expands and contracts due to this reciprocating motion, so that the internal volume of the pump 58 changes periodically.

Further, the rotational driving force is further transmitted from the cam gear 460 to the screw gear 64 to drive the screw 54 (see FIG. 1).

Here, the pump 58 is placed inside the rotating cam gear 460 in the radial direction. Further, the bellows portion 58*a* of the pump 58 and the engagement point P4 overlap with each other in the expansion/contraction direction (that is, the Z-axis direction) of the pump 58, at a timing. Part (a) of FIG. 23 shows such a timing.

Such a relationship between the bellows portion 58*a* and the engagement point P4 is analogous to the relationship between the bellows portion 58*a* and the engagement point P in Embodiment 1 (see FIGS. 11, 12, 27, and so on) and the relation the between the bellows portion 58*a* and the points P3 (see FIGS. 20, 21, and so on) in Embodiment 3.

By arranging the bellows portion 58*a* and the engagement point P4 in such an arrangement relationship, the space required for expansion and contraction of the pump 58 and the space required for the movement of the engagement point P4 can be made common, So that the amount of expansion and contraction of the pump 58 can be made larger, within the limited space.

Further, when the pump 58 is in the contracted state, the coupling portion 58*b* of the link member 461 and the pump 58 is arranged so as to overlap the peak portion 460*b* of the cam gear 460 in the Z-axis direction. On the other hand, when the pump 58 is in the expanded state, the link member 461 also moves in the Z-axis direction, so that the portion 460*b* of the cam gear 460 and the link member 461 do not interfere with each other during operation. That is, in the Z-axis direction, that is, in the Z-axis coordinate, the range in which the coupling portion 58*b* of the pump 58 operates and the range in which the engagement point P4 moves are arranged so as to overlap each other. With this arrangement, the amount of expansion and contraction of the pump 58 can be selected to be larger within a limited space, which contributes to space saving and stabilization of discharge.

The drive conversion unit 468 utilizes the force of the link spring 467 to contract the pump as described above. That is, the pump 58 is contracted by utilizing the force applied by the link spring 467 to the link member 461. Therefore, when the pump 58 is contracted, the link member 461 does not need to receive a force from the cam gear 460. The drive conversion unit 468 is a cam (cam mechanism) provided with a spring (elastic member).

In Embodiments 1, 3 and 4 described heretofore, different structures (68, 368, 468) have been employed as the pump drive mechanism (drive conversion unit, drive conversion mechanism) for expanding and contracting the pump 58. However, the structure for expanding and contracting the pump 58 is not limited to these examples.

For example, a structure is conceivable in which a magnet is mounted to the pump 58 and a magnet is also mounted to the pump drive mechanism so as to correspond to the magnet. By moving one magnet using the rotational force received by the drive input gear 59, the attractive force or repulsive force generated between the two magnets is changed. A method of expanding and contracting the pump 58 by using this change in magnetic force can be considered. An example of the drive conversion mechanism 568 using such a magnet will be described in detail in Embodiment 5.

Embodiment 5

Next, referring to FIGS. 24 and 25, the structure of the Embodiment 5 will be described.

FIG. 24 is a partial perspective view of the rear end portion of the cartridge (13Y, 13M, 13C) according to the Embodiment 5, in a state where the side cover 62 is shifted rearward for better illustration of the expansion/contraction operation of the pump 58.

Part (a) of FIG. 25 shows a state in which the pump 58 is contracted, and part (b) of FIG. 25 shows a state in which the pump 58 is expanded.

In this embodiment, as compared with embodiment 1, only the structure for expanding and contracting the pump 58 are different, and the other structures are almost the same as those in the Embodiment 1. Therefore, in this embodiment, detailed description will be omitted by assigning the same reference numerals to the corresponding structures to those in the Embodiment 1 described above.

As shown in FIG. 24, the drive train of this embodiment includes a drive input gear 59, a gear as a rotating member, and a screw gear 64.

The drive input gear 59 includes a drive receiving portion 59*a* and a gear portion 59*b*. The gear 470 is provided with recesses 470*a* and 470*b* for holding magnets, and magnets 470*c* and 470*d* are mounted in the recesses.

Magnets 480*c* and 480*d* are also installed in the link member 480 as a reciprocating member.

The link member 480 is supported so as not to be movable in the rotational direction around the axis Z by the projections 50*c* and 50*d* on the supply frame 50 but so as to be movable in the front-rear direction.

Further, the link member 480 and the pump 58 are connected with each other at the coupling portion 58*b* of the pump 58.

Further, a link spring 490 is mounted to the rear end of the link member. The link spring 490 is compressed between the side cover 62 and the link member 480 to urge the link member 480 forward. In this embodiment, the drive conversion portion 568 includes the magnets 470*c*, 470*d*, 480*c*, 480*d*, the link member 480, and the link spring 490.

As shown in FIG. 25, the pump 58 is viewed in the Z-axis direction, which is the central axis of the pump 58. As shown in part (a) of FIG. 25, the phases of the magnets 470*c* and 470*d* of the gear 470 rotating in the arrow W direction and the magnets 480*c* and 480*d* provided on the link member 480 may be different from each other. In this case, the link member 480 receives an elastic force from the link spring 490 in the Z1 direction in the front-rear direction and moves, the pump 58 connected to the link member 480 also receives the force moving in the Z1 direction, so that the bellows (movable part) 58*a* of the pump 58 contracts.

As shown in part (b) of FIG. 25, the magnets 470*c* and 470*d* of the gear 470 rotating in the arrow W direction and the magnets 480*c* and 480*d* provided on the link member 480 may have the same phase. In such a case, the magnet 470*c* or 470*d* and the magnet 480*c* or 480*d* face each other. Here, the facing surfaces of the facing magnets have the same magnetic poles, and therefore, a repulsive force is produced between the facing magnets.

The force against the elastic force in the Z1 direction by the link spring 490 produced in the link member 480 described referring to FIG. 25, is produced by the repulsive force between the magnets, and therefore, the link member 480 moves in the Z2 direction. The pump 58 connected to the link member 480 also moves in the Z2 direction, so that, the bellows portion (movable portion) 58*a* of the pump 58 is expanded.

By repeating the states of part (a) of FIG. 25 and FIG. 25 (*b*), the pump 58 repeats the expansion/contraction operation in the Z-axis direction, which is the central axis of the pump 58.

Embodiment 6

Next, referring to Figure, the structure of Embodiment 6 will be described.

FIG. 26 is a cross-sectional view of the cartridge (13Y, 13M, 13C) according to embodiment 6, in the neighborhood of the supply toner feeding belt 154 in the lateral direction, that is, in the X-axis direction. That is, FIG. 26 is a sectional view parallel to the YZ plane.

In this embodiment, only a different feed member structure is employed instead of the feed screw 54 (screw 51), as compared with Embodiment 1, and the other structures are almost the same as those in the Embodiment 1.

Therefore, in this embodiment, detailed description will be omitted by assigning the same reference numerals to the corresponding structures to those in the Embodiment 1 described above.

The structure including the toner accommodation chamber (developer storage chamber) 49, the communication passage (toner passage, tunnel) 48, and the toner discharge chamber (developer discharge chamber) 57 formed in the internal space 51 of the supply frame 50 is similar to that in embodiment 1 described above.

In this embodiment, a supply toner feeding belt 154 (hereinafter, simply referred to as a belt 154) as a feeding member is provided in the communication passage 48.

The belt 154 is a movable member which is movable relative to the supply frame body 50. More specifically, the belt 154 rotates in an arrow P direction as rotating members 153*a* and 153*b* rotatably provided in the supply frame 50 rotate. The rotating members 153*a* and 153*b* can be regarded as gears structured to drive the belt through engagement with projections and recesses formed on the inner surface of the belt 154. The rotation axes of the rotating members 153*a* and 153*b* are parallel to the X-axis. The belt 154 conveys the toner in the Z-axis direction perpendicular to the axes of the rotating members 153*a* and 153*b*.

A part of the belt 154 is exposed to the toner accommodation chamber 49, and by rotating the belt 154, the toner in the toner accommodation chamber 49 is fed to the discharge chamber 57 through the communication passage 48. In this embodiment, the outer surface of the belt 154 is also provided with projections and recesses so that the toner around the belt 154 can be easily fed by the belt 154. More particularly, a plurality of projections projecting from the outer surface of the belt 154 correspond to the projection of the belt 154, and the other portion corresponds to the recess portion.

Although different structures of the cartridges 13 have been described in Embodiments 1 to 6, the features of the cartridges 13 of each embodiment may be combined and employed. For example, in Embodiment 1, a vent 69 with a filter has been described as a modification of the vent 46 (part (c) of FIG. 8). Such a vent 69 may be used in Embodiments 3 to 6. Alternatively, the vents 201, 202 (see FIG. 19) described in Embodiment 2 may be used in other embodiments. Alternatively, the belt 154 described in Embodiment 6 (see FIG. 6) may be used in other examples.

INDUSTRIAL APPLICABILITY

According to the present invention, an image forming apparatus such as an electrophotographic image forming apparatus and a toner cartridge used for them are provided.

The present invention is not limited to the above embodiments, and various modifications and modifications can be made without departing from the spirit and scope of the present invention. Therefore, the following claims are attached in order to publicize the scope of the present invention.

This application claims priority on the basis of Japanese Patent Application No. 2019-168214 submitted on Sep. 17, 2019 and Japanese Patent Application No. 2020-093285 submitted on May 28, 2020, and all of the contents thereof are incorporated herein.

The invention claimed is:

1. A toner cartridge comprising:

(i) a casing including (i-i) a toner accommodation chamber containing toner, (i-ii) a discharge opening through which toner can be discharged from the toner cartridge, (i-iii) a toner discharging chamber in fluid communication with the discharge opening such that toner in the toner discharging chamber can move to the discharge opening, and (i-iv) a communication passage for fluid communication between the toner accommodation chamber and the toner discharging chamber such that toner can move from the toner accommodation chamber to the toner discharging chamber;

(ii) a feeding member movable relative to the casing and configured to feed the toner from the toner accommodation chamber through the communication passage into the toner discharging chamber, with at least a part of the feeding member being positioned in the communication passage; and (iii) a pump configured to provide air for discharging the toner through the discharge opening, wherein, (a) in a first cross-sectional plane perpendicular to a toner feeding direction of the feeding member, a minimum cross-sectional area of the communication passage is Asmin, (b) in a second cross-sectional plane perpendicular to the toner feeding direction, the toner discharging chamber has a cross-sectional area Bs that is larger than Asmin, and (c) in a third cross-sectional plane perpendicular to the toner feeding direction, the toner accommodation chamber has a cross-sectional area Cs that is larger than Asmin.

2. A toner cartridge according to claim 1, wherein the feeding member is a screw.

3. A toner cartridge according to claim 1, wherein, in the toner feeding direction of the feeding member, the pump is positioned adjacent to a downstream end portion of the casing.

4. A toner cartridge according to claim 1, wherein the cross-sectional area Bs of the toner discharging chamber is at a position downstream of the communication passage in the toner feeding direction of the feeding member.

5. A toner cartridge according to claim 1, wherein the cross-sectional area Bs of the toner discharging chamber is adjacent to a position of the discharge opening, and, in a fourth cross-sectional plane perpendicular to the toner feeding direction of the feeding member, an area Csmax is a maximum cross-sectional area of the toner accommodation chamber that is larger than the area Asmin and larger than the area Bs.

6. A toner cartridge according to claim 1, wherein, in a fourth cross-sectional plane that is perpendicular to the toner feeding direction of the feeding member, an area Csmax is a maximum cross-sectional area of the toner accommodation chamber, and in a fifth cross-sectional plane that is perpendicular to the toner feeding direction of the feeding member, an area Bsmax is a maximum cross-sectional area of the toner discharging chamber that is smaller than the area Csmax.

7. A toner cartridge according to claim 1, wherein in a fourth cross-sectional plane that is perpendicular to the toner feeding direction of the feeding member, an area Csmax is a maximum cross-sectional area of the toner accommodation chamber that is more than 10 times larger than the area Asmin.

8. A toner cartridge according to claim 1, wherein a volume of the toner discharging chamber is less than a volume of the toner accommodation chamber.

9. A toner cartridge according to claim 1, wherein the casing includes a partition member separating the toner accommodation chamber and the toner discharging chamber, with the communication passage being formed in the partition member.

10. A toner cartridge according to claim 1, further comprising a suction opening, wherein the pump is configured to pump through the discharge opening air that is suctioned through the suction opening.

11. A toner cartridge according to claim 1, wherein the pump is configured to suction air into the toner discharging chamber through the discharge opening.

12. A toner cartridge according to claim 1, wherein the pump is a centrifugal pump.

13. A toner cartridge according to claim 1, further comprising:

a first engaging portion forming an opening;

a second engaging portion forming an opening; and a storing element provided with an electrical contact, wherein the pump is provided with a connecting portion connected to the casing, wherein the first engaging portion, the second engaging portion, the pump, and the storing element are positioned in a downstream part of the toner cartridge in the toner feeding direction of the feeding member, and wherein, as viewed in the toner feeding direction of the feeding member, the connecting portion of the pump and the electrical contact of the storing element are positioned on opposite sides of a line passing through the first engaging portion and the second engaging portion.

14. A toner cartridge according to claim 1, wherein the communication passage extends in the toner feeding direction of the feeding member.

15. A toner cartridge according to claim 1, wherein a part of the feeding member is inside the toner accommodation chamber.

16. A toner cartridge according to claim 1, wherein a part of the feeding member is inside the toner discharging chamber.

17. A toner cartridge according to claim 1, wherein, when the toner cartridge is oriented with discharge opening directed downward in the gravitational direction, (i) a part of the toner accommodation chamber and a part of the communication passage are arranged along a vertical direction, with the part of the toner accommodation chamber above the part the communication passage, and (ii) another part of the toner accommodation chamber and another part of the communication passage are arranged in a direction perpendicular to the vertical direction.

18. A toner cartridge according to claim 1, wherein, when the toner cartridge is oriented with discharge opening directed downward in the gravitational direction, the feeding member is configured to feed the toner in a direction perpendicular to a vertical direction.

19. A toner cartridge according to claim 1, wherein the feeding member is rotatable relative to the casing.

20. A toner cartridge according to claim 19, wherein the feeding member is rotatable about an axis thereof and is configured to feed the toner in a direction of the axis.

21. An image forming apparatus comprising:

a toner cartridge according to claim 1; and a main assembly configured such that the toner cartridge is mounted thereto, with the main assembly being configured to receive toner discharged from the toner cartridge.

22. An image forming apparatus according to claim 21, further comprising a second cartridge including a developing roller, wherein the main assembly is configured to supply the toner discharged from the toner cartridge into the second cartridge.

23. A toner cartridge according to claim 1, wherein the casing includes a vent provided at a position different than a position of the communication passage, the vent being configured to permit airflow between the toner discharging chamber and the toner accommodation chamber.

24. A toner cartridge according to claim 23, wherein, when the toner cartridge is oriented with the discharge opening directed downward in the gravitational direction, the vent is above an uppermost extent of the communication passage.

25. A toner cartridge according to claim 23, wherein, when the toner cartridge is oriented with the discharge opening directed downward in the gravitational direction and the toner cartridge is unused such that the toner contained in the toner accommodation chamber is at an initial level, the vent is above a top level of the toner contained in the toner accommodation chamber.

26. A toner cartridge according to claim 23, wherein, when the toner cartridge is oriented with the discharge opening directed downward in the gravitational direction and the toner cartridge is unused such that the toner contained in the toner accommodation chamber is at an initial lever, a top level of the toner contained in the toner accommodation chamber is above an uppermost extent of the pump and the vent is above the top level of the toner contained in the toner accommodation chamber.

27. A toner cartridge according to claim 23, wherein, when the toner cartridge is oriented with the discharge opening directed downward in the gravitational direction, the vent is above an uppermost extent of the pump.

28. A toner cartridge according to claim 23, wherein the vent is provided with a filter for suppressing passage of the toner through the vent.

29. A toner cartridge according to claim 1, further comprising a first vent configured to permit airflow between inside the toner accommodation chamber and outside the toner cartridge, and a second vent configured to permit airflow between inside the toner discharging chamber and outside the toner cartridge.

30. A toner cartridge according to claim 29, wherein, in a state that the toner cartridge is oriented with the discharge opening directed downward in the gravitational direction and the toner cartridge is unused such that the toner contained in the toner accommodation chamber is at an initial level, the second vent is above a top level of the toner contained in the toner accommodation chamber.

31. A toner cartridge according to claim 29, wherein, in a state that the toner cartridge is oriented with the discharge opening directed downward in the gravitational direction and the toner cartridge is unused such that the toner contained in the toner accommodation chamber is at an initial level, a top level of the toner contained in the toner accommodation chamber is above an uppermost extent of the pump and the second vent is above the top level of the toner contained in the toner accommodation chamber.

32. A toner cartridge according to claim 29, wherein at least one of the first vent and the second vent is provided with a filter for suppressing passage of the toner therethrough.

33. A toner cartridge according to claim 1, further comprising a drive input member configured to receive a rotational force for driving the feeding member and the pump.

34. A toner cartridge according to claim 33, wherein the drive input member and the pump are positioned in a downstream part of the toner cartridge in the toner feeding direction of the feeding member.

35. A toner cartridge according to claim 33, wherein the drive input member is a coupling member.

36. A toner cartridge according to claim 35, wherein the coupling member is rotatable about an axis thereof, the coupling member is provided with a projection projecting toward the axis of the coupling member, and the projection is configured to receive the rotational force for driving the feeding member and the pump.

37. A toner cartridge according to claim 36, wherein an open space is provided between the projection of the coupling member and the axis of the coupling member.

38. A toner cartridge according to claim 1, wherein the pump is a reciprocating pump.

39. A toner cartridge according to claim 38, wherein the pump includes a flexible movable portion, and a volume of the pump is changed by deformation of the movable portion.

40. A toner cartridge according to claim 38, further comprising a rotatable member and a reciprocation member that is engageable with the rotatable member to reciprocate by rotation of the rotatable member, wherein the pump is driven by reciprocating motion of the reciprocation member.

41. A toner cartridge according to claim 40, wherein the pump includes a movable portion that reciprocates in a moving direction by the reciprocation member, wherein the rotatable member and the reciprocation member are engaged with each other at an engagement point, and wherein, as viewed in a direction perpendicular to the moving direction, the rotatable member is rotatable to a position such that the engagement point overlaps the movable portion.

42. A toner cartridge according to claim 1, wherein the feeding member is a first feeding member, and the toner cartridge further comprising a second feeding member configured to feed the toner toward the first feeding member.

43. A toner cartridge according to claim 42, wherein the first feeding member and the second feeding member are configured to feed the toner in different directions.

44. A toner cartridge according to claim 42, wherein the second feeding member includes a sheet configured to feed the toner by rotation of the sheet.

45. A toner cartridge comprising:

(i) a casing including (i-i) a toner accommodation chamber containing toner, (i-ii) a discharge opening through which toner can be discharged from the toner cartridge, (i-iii) a toner discharging chamber in fluid communication with the discharge opening such that toner in the toner discharging chamber can move to the discharge opening, and (i-iv) a communication passage for fluid communication between the toner accommodation chamber and the toner discharging chamber such that toner can move from the toner accommodation chamber to the toner discharging chamber;

(ii) a feeding member movable relative to the casing and configured to feed the toner from the toner accommodation chamber through the communication passage into the toner discharging chamber, with at least a part of the feeding member being positioned in the communication passage;

(iii) a pump configured to provide air for discharging the toner through the discharge opening; and (iv) a coupling member configured to receive a rotational force for driving the feeding member and the pump, wherein, (a) in a first cross-sectional plane perpendicular to a rotational axis direction of the coupling member a minimum cross-sectional area of the communication passage is Asmin, (b) in a second cross-sectional plane perpendicular to the rotational axis direction of the coupling member, the toner discharging chamber has a cross-sectional area Bs that is larger than Asmin, and (c) in a third cross-sectional plane perpendicular to the rotational axis direction of the coupling member, the toner accommodation chamber has a cross-sectional area Cs that is larger than Asmin.

46. A toner cartridge according to claim 45, wherein the casing includes a vent provided at a position different than a position of the communication passage, the vent being configured to permit airflow between the toner discharging chamber and the toner accommodation chamber.

47. A toner cartridge according to claim 45, wherein in a fourth cross-sectional plane that is perpendicular to the toner feeding direction of the feeding member, an area Csmax is a maximum cross-sectional area of the toner accommodation chamber that is more than 10 times larger than the area Asmin.

48. A toner cartridge according to claim 45, further comprising a coupling member configured to receive a rotational force for driving the feeding member and the pump, and wherein the coupling member is provided with a projection projecting toward an axis of the coupling member, and the coupling member is configured to transmit the rotational force from the projection toward the pump and the feeding member.

49. A toner cartridge according to claim 48, wherein the coupling member and the pump are disposed in a downstream part of the toner cartridge in the toner feeding direction of the feeding member.

50. A toner cartridge according to claim 45, wherein the feeding member is a first feeding member, and the toner cartridge further comprising a second feeding member configured to feed the toner toward the first feeding member, and wherein the first feeding member and the second feeding member feed the toner in different directions.

51. A toner cartridge according to claim 50, wherein the second feeding member includes a sheet configured to feed the toner by rotation thereof.

* * * * *